US010702016B2

(12) United States Patent
Youngs

(10) Patent No.: US 10,702,016 B2
(45) Date of Patent: Jul. 7, 2020

(54) FLUID-FILLED CHAMBER FOR AN ARTICLE OF FOOTWEAR

(71) Applicant: NIKE, Inc., Beaverton, OR (US)

(72) Inventor: Bryan K. Youngs, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 128 days.

(21) Appl. No.: 15/894,076

(22) Filed: Feb. 12, 2018

(65) Prior Publication Data

US 2018/0160772 A1    Jun. 14, 2018

Related U.S. Application Data

(63) Continuation of application No. 14/863,753, filed on Sep. 24, 2015, now Pat. No. 9,907,357.

(51) Int. Cl.
*B32B 3/10* (2006.01)
*A43B 13/20* (2006.01)
(Continued)

(52) U.S. Cl.
CPC ............. *A43B 13/20* (2013.01); *A43B 13/18* (2013.01); *A43B 13/185* (2013.01); *A43B 13/189* (2013.01); *B29D 35/142* (2013.01); *B32B 3/04* (2013.01); *B32B 5/142* (2013.01); *B32B 5/18* (2013.01); *B32B 5/24* (2013.01); *B32B 5/245* (2013.01); *B32B 5/32* (2013.01); *B32B 7/08* (2013.01); *B32B 7/12* (2013.01); *B32B 9/025* (2013.01); *B32B 9/04* (2013.01); *B32B 9/046* (2013.01); *B32B 25/045* (2013.01); *B32B 27/065* (2013.01); *B32B 27/08* (2013.01);
(Continued)

(58) Field of Classification Search
None
See application file for complete search history.

(56) References Cited

U.S. PATENT DOCUMENTS

| 6,385,864 B1 | 5/2002 | Sell, Jr. et al. |
| 2007/0294832 A1 | 12/2007 | Shiao |

(Continued)

FOREIGN PATENT DOCUMENTS

| CN | 1383363 A | 12/2002 |
| CN | 101878104 A | 11/2010 |

(Continued)

OTHER PUBLICATIONS

United States Patent and Trademark Office, Office Action for Application No. 14/863,753, dated May 19, 2017.
(Continued)

*Primary Examiner* — Christopher M Polley
(74) *Attorney, Agent, or Firm* — Honigman LLP; Matthew H. Szalach; Jonathan P. O'Brien

(57) ABSTRACT

A fluid-filled chamber is provided and includes a first barrier layer, a second barrier layer, a foam structure, and a tensile member. The second barrier layer is secured to the first barrier layer to define an interior void between the first barrier layer and the second barrier layer. The interior void contains a predetermined volume of fluid. The foam structure and the tensile member are disposed within the interior void, whereby the tensile member includes a plurality of fibers extending in a first direction between the first barrier layer and the second barrier layer.

20 Claims, 56 Drawing Sheets

(51) Int. Cl.

| | | |
|---|---|---|
| *B32B 27/08* | (2006.01) | |
| *B32B 9/04* | (2006.01) | |
| *B32B 5/24* | (2006.01) | |
| *B32B 3/04* | (2006.01) | |
| *B32B 9/02* | (2006.01) | |
| *B32B 7/08* | (2019.01) | |
| *B32B 27/12* | (2006.01) | |
| *B32B 25/04* | (2006.01) | |
| *B32B 27/06* | (2006.01) | |
| *A43B 13/18* | (2006.01) | |
| *B32B 7/12* | (2006.01) | |
| *B32B 5/32* | (2006.01) | |
| *B29D 35/14* | (2010.01) | |
| *B32B 5/14* | (2006.01) | |
| *B32B 5/18* | (2006.01) | |
| *B32B 27/30* | (2006.01) | |
| *B32B 27/40* | (2006.01) | |
| *B32B 38/08* | (2006.01) | |
| *B32B 38/18* | (2006.01) | |
| *B29K 675/00* | (2006.01) | |

(52) U.S. Cl.
CPC ............ *B32B 27/12* (2013.01); *B32B 27/306* (2013.01); *B32B 27/40* (2013.01); *B32B 38/08* (2013.01); *B32B 38/1808* (2013.01); *B29K 2675/00* (2013.01); *B29K 2715/00* (2013.01); *B32B 2260/02* (2013.01); *B32B 2266/0221* (2013.01); *B32B 2266/0278* (2013.01); *B32B 2307/50* (2013.01); *B32B 2307/546* (2013.01); *B32B 2307/554* (2013.01); *B32B 2307/724* (2013.01); *B32B 2375/00* (2013.01); *B32B 2437/02* (2013.01)

(56) References Cited

U.S. PATENT DOCUMENTS

| | | | |
|---|---|---|---|
| 2012/0102782 A1* | 5/2012 | Swigart | ............... A43B 13/20 36/83 |
| 2014/0053427 A1 | 2/2014 | Patton | |
| 2014/0173938 A1 | 6/2014 | Beye et al. | |

FOREIGN PATENT DOCUMENTS

| | | |
|---|---|---|
| CN | 103025187 A | 4/2013 |
| CN | 103327843 A | 9/2013 |
| WO | WO-2009143000 A1 | 11/2009 |

OTHER PUBLICATIONS

European Patent Office, International Search Report and Written Opinion for Application No. PCT/US2016/053290, dated Dec. 15, 2016.
European Patent Office, International Preliminary Report on Patentability for Application No. PCT/US2016/053290, dated Mar. 27, 2018.
China National Intellectual Property Administration, Office Action for CN Application No. 201680062205.X, dated Feb. 19, 2020.
European Patent Office, Extended European Search Report for EP Application No. 19213149.8, dated Apr. 20, 2020.

\* cited by examiner

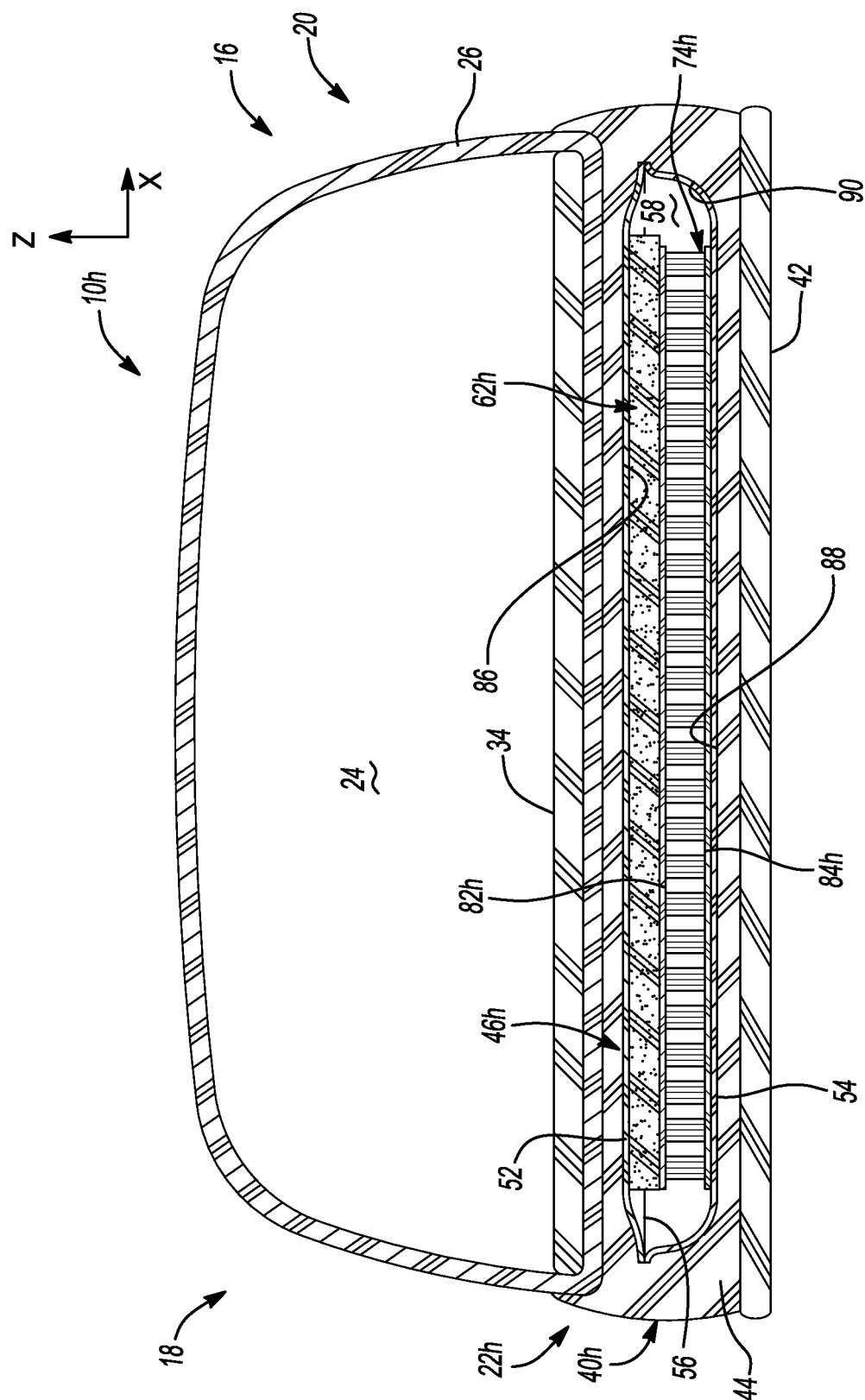

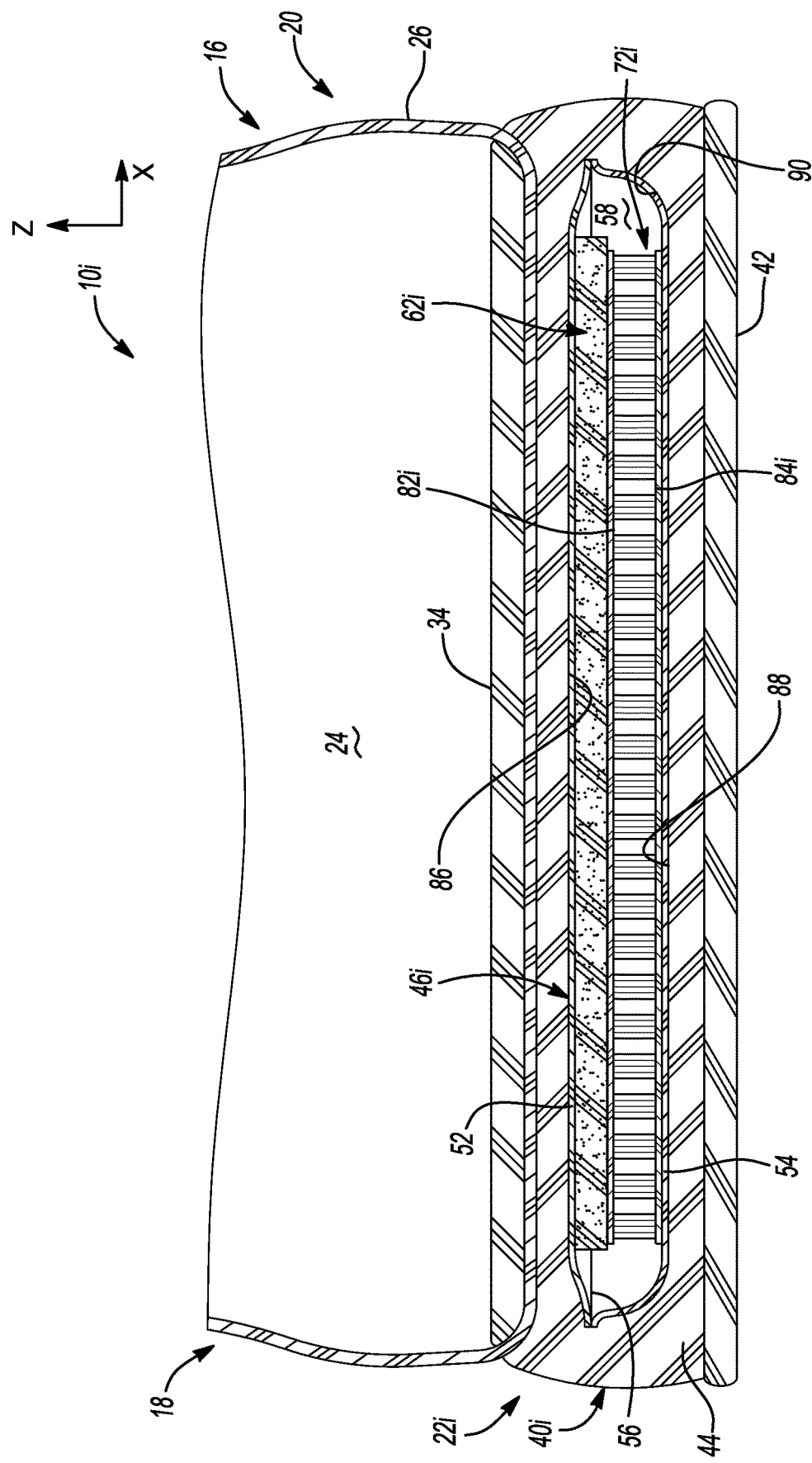

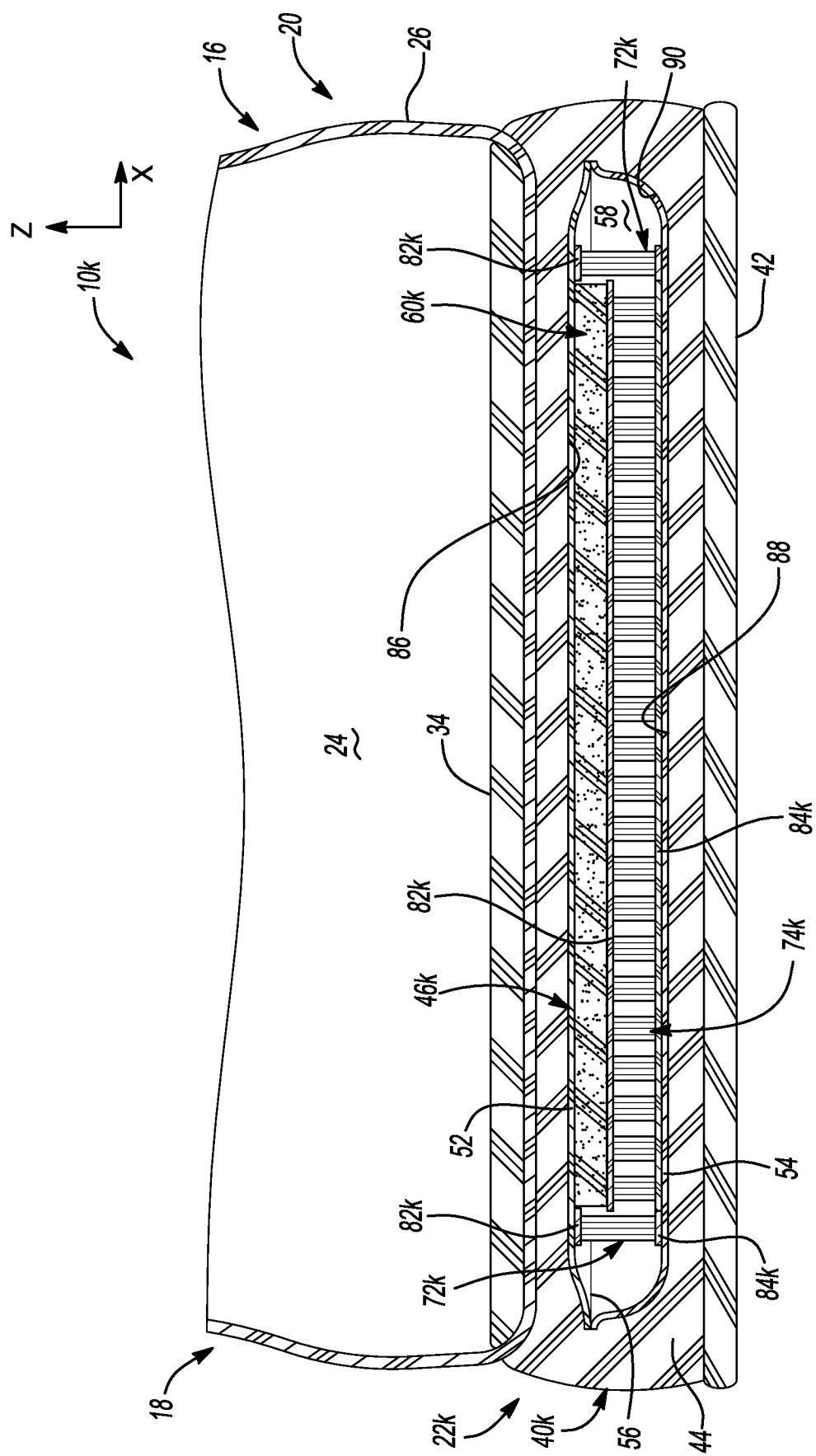

US 10,702,016 B2

FLUID-FILLED CHAMBER FOR AN ARTICLE OF FOOTWEAR

CROSS REFERENCE AND RELATED

This application is a continuation of U.S. patent application Ser. No. 14/863,753, filed Sep. 24, 2015, the disclosure of which is hereby incorporated by reference in its entirety.

TECHNICAL FIELD

The present disclosure relates generally to articles of footwear and more specifically to a fluid-filled chamber for use with an article of footwear and a method for making a fluid-filled chamber.

BACKGROUND

This section provides background information related to the present disclosure and is not necessarily prior art.

Articles of footwear typically include a sole structure that provides a layer between the foot on which the article of footwear is worn and a ground surface. The sole structure prevents the foot from contacting the ground surface and provides a degree of cushioning to the foot during use. The sole structure typically includes an outsole that contacts the ground surface and a midsole that supports, stabilizes, and cushions the foot. A polymer foam material may form the midsole to provide a level of cushioning that minimizes the forces felt by the foot when the outsole strikes the ground surface.

While traditional midsole materials, such as polymer foam materials, provide a degree of comfort and stability, such polymer foam materials are typically tailored to provide a specific type of cushioning and are generally limited in that regard. For example, stiffer foam materials provide a more responsive feel during use but are less capable of absorbing impacts. Conversely, softer materials are less responsive but provide a greater degree of cushioning and are therefore better suited than stiffer materials for applications that favor impact absorption over responsiveness. Accordingly, providing a sole structure with more than one type of cushioning system provides an article of footwear with both a responsive feel and the ability to absorb impacts during use.

In an effort to balance responsiveness and cushioning, footwear manufacturers typically provide a sole structure with more than one type of cushioning. For example, a midsole may be formed from a polymer foam material that is used in conjunction with rubber posts or resilient members. The posts provide a responsive feel during use while the polymer foam provides cushioning. While rubber posts or other resilient members may be used in conjunction with polymer foam, other cushioning systems such as fluid-filled bladders may alternatively be used in conjunction with polymer foam depending on the particular application.

While sole structures of conventional articles of footwear may include more than one type of cushioning system, such systems are typically separate and independent from one another. Accordingly, these systems separately provide the article of footwear with responsiveness and cushioning and only cooperate with one another once assembled into the sole structure.

DRAWINGS

The drawings described herein are for illustrative purposes only of selected configurations and are not intended to limit the scope of the present disclosure.

FIG. 10D is a cross-sectional view of the article of footwear of FIG. 10A taken along the line 10D-10D of FIG. 10A;

FIG. 11C is a partial cross-sectional view of the article of footwear of FIG. 11A taken along the line 11C-11C of FIG. 11A;

FIG. 13C is a partial cross-sectional view of the article of footwear of FIG. 13A taken along the line 13C-13C of FIG. 13A;

Corresponding reference numerals indicate corresponding parts throughout the drawings.

DETAILED DESCRIPTION

Figure 1A:
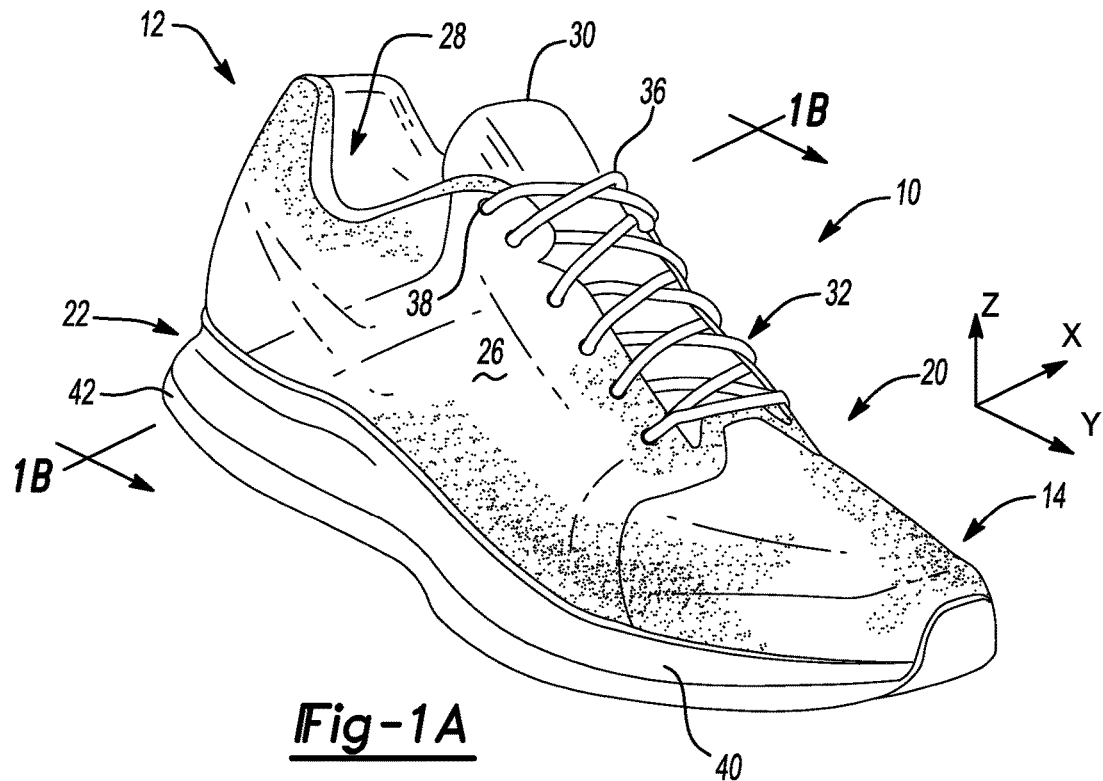
FIG. 1A is a top perspective view of an article of footwear in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In one configuration, a fluid-filled chamber is provided and includes a first barrier layer, a second barrier layer, a foam structure, and a tensile member. The second barrier layer is secured to the first barrier layer to define an interior void between the first barrier layer and the second barrier layer. The interior void contains a predetermined volume of fluid. The foam structure and the tensile member are disposed within the interior void, whereby the tensile member includes a plurality of fibers extending in a first direction between the first barrier layer and the second barrier layer.

Implementations of the disclosure may include one or more of the following optional features. In some implementations, the tensile member is disposed between the foam structure and one of the first barrier layer and the second barrier layer. In some examples, the tensile member is attached to one of the first barrier layer and the second barrier layer, the foam structure is attached to the other of the first barrier layer and the second barrier layer, and/or the tensile member is attached to the foam structure.

The foam structure may be attached to the tensile member at an attachment location that is spaced apart from the first barrier layer and the second barrier layer.

In some configurations, the foam structure includes a first foam layer and a second foam layer. The first foam layer may be attached to the first barrier layer and the second foam layer may be attached to the second barrier layer. In some implementations, the tensile member may be disposed between the first foam layer and the second foam layer.

Additionally or alternatively, the tensile member may include a first substrate and a second substrate. The plurality of fibers may extend between and may be attached to the first substrate and the second substrate. In some examples, the first substrate may be attached to one of the first barrier layer and the second barrier layer and the second substrate may be attached to the foam layer.

A method is also provided and includes forming a first barrier layer, forming a second barrier layer, and securing the first barrier layer to the second barrier layer to define an interior void disposed between the first barrier layer and the second barrier layer. The method additionally includes positioning a foam structure within the interior void, positioning a tensile member having a first substrate, a second substrate, and a plurality of fibers extending between the first substrate and the second substrate within the interior void and between the foam structure and one of the first barrier layer and the second barrier layer, and providing the interior void with a predetermined volume of fluid.

In one configuration, positioning the tensile member between the foam structure and one of the first barrier layer and the second barrier layer includes attaching one of the first substrate and the second substrate to the foam structure.

The method may additionally include attaching one of the first substrate and the second substrate to the one of the first barrier layer and the second barrier layer and attaching the foam structure to the other of the first barrier layer and the second barrier layer.

The tensile member may be attached to the foam structure. Further, the foam structure may be attached to the tensile member at an attachment location. Attaching the foam structure to the tensile member at an attachment location may include attaching the foam structure to the tensile member at an attachment location that is spaced apart from the first barrier layer and the second barrier layer.

Positioning the foam structure may include positioning a first foam layer and positioning a second foam layer. The method may additionally include attaching the first foam layer to the first barrier layer and attaching the second foam layer to the second barrier layer, wherein positioning the tensile member includes positioning the tensile member between the first foam layer and the second foam layer. The method may also include attaching one of the first substrate and the second substrate to the first foam layer and attaching the other of the first substrate and the second substrate to the second foam layer.

In one configuration, the method may include providing the foam structure with an arcuate surface and, further, may include attaching the arcuate surface to one of the first barrier layer and the second barrier layer.

Figure 1B:
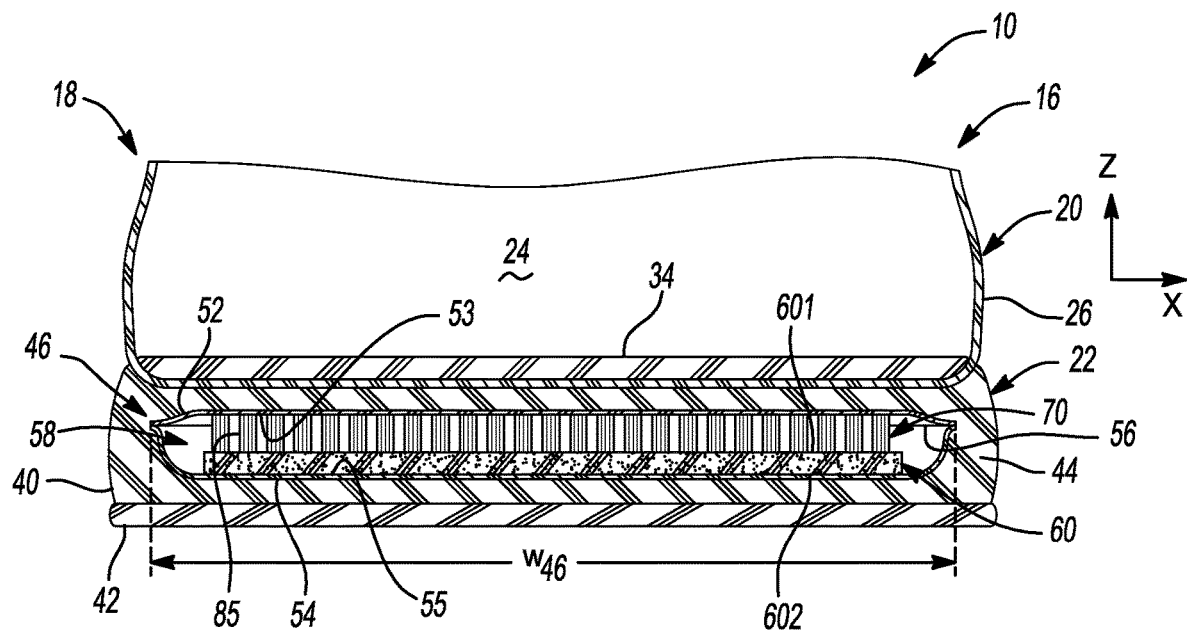
FIG. 1B is a partial cross-sectional view of the article of footwear of FIG. 1A taken along the line 1B-1B of FIG. 1A.

Referring to FIGS. 1A-1B, an article of footwear 10 is provided and may include an upper 20 and a sole structure 22. The sole structure 22 may be attached to the upper 20 and positioned between the upper 20 and a ground surface in a manner that prevents the upper 20 from contacting the ground surface during normal use of the article of footwear 10.

The upper 20 and the sole structure 22 may extend from a heel end 12 to a forefoot end 14 along a Y-axis, and from a lateral side 16 to a medial side 18 along an X-axis. The heel end 12 may correspond with rear portions of a foot, including a calcaneus bone. The forefoot end 14 may correspond with toes and joints connecting metatarsal bones with phalanx bones of the foot. The lateral and medial sides 16, 18, respectively, may correspond with opposite sides of the footwear 10 extending from the heel end 12 to the forefoot end 14.

The upper 20 may include a body 26, a tongue 30, a fastening system 32, and a sockliner 34. Different materials may form the body 26 of the upper 20, including one or more of foam, textiles, leather, and synthetic leather that connect together to form a shape of the upper 20. In this regard, the body 26 may be formed from one or more materials that are stitched or adhesively bonded together to form a footwear cavity 24 that receives and secures a foot for support on the sole structure 22. Suitable materials for the body 26 may include, but are not limited to, textiles, foam, leather, and synthetic leather. The materials may be selected and located to impart properties of durability, air-permeability, wear-resistance, flexibility, and comfort to the foot while disposed within the footwear cavity 24.

The body 26 of the upper 20 may be formed to define a foot-receiving opening 28 in the heel end 12 of the upper 20. The foot-receiving opening 28 may provide access to the footwear cavity 24. For example, the foot-receiving opening 28 may receive a foot to secure the foot within the footwear cavity 24 and facilitate entry and removal of the foot from and to the footwear cavity 24. The body 26 and the foot-receiving opening 28 may vary from what is illustrated in FIGS. 1A-1B without departing from the scope of the present disclosure. For example, in some configurations, the body 26 may constitute less material and the foot-receiving opening 28 may be larger and/or of a different shape.

The tongue 30 may extend between the footwear cavity 24 and the fastening system 32. Similar to the body 26 of the upper 20, the tongue 30 may consist of different materials connected together. In this regard, the tongue 30 may be formed separately from, but attached to, the body 26 in a manner that allows a user of the article of footwear 10 to modify the dimensions of the foot-receiving opening 28. For example, the user of the article of footwear 10 may manipulate the position of the tongue 30 to allow his or her foot to easily enter into or exit from the footwear cavity 24 through the foot-receiving opening 28.

The fastening system 32 may include one or more fasteners (e.g., lace 36) extending along the upper 20. In some configurations, the upper 20 may include apertures such as apertures 38 and/or other engagement features such as fabric or mesh loops that receive the fasteners. A user of the article of footwear 10 may tighten or loosen the fasteners through the plurality of apertures 38 in order to tighten or loosen the body 26 and tongue 30 of the upper 20 around the user's foot or to allow his or her foot to enter into or exit from the footwear cavity 24. While the fasteners are generally shown and described herein as the lace 36, it will be appreciated that the fasteners may include straps, cords, hook-and-loop, or any other suitable type of fastener, within the scope of the present disclosure.

The sockliner 34 may be located within the footwear cavity 24 along a portion of the body 26 of the upper 20. In some configurations, the sockliner 34 resides in a location within the footwear cavity 24 to contact a plantar surface of the user's foot in order to enhance the comfort of the article of footwear 10.

While the article of footwear 10 is shown and described herein as including the tongue 30, the fastening system 32, and the sockliner 34, it will be appreciated that the tongue 30, the fastening system 32, and the sockliner 34 are optional features of the article of footwear 10. Moreover, the size, shape, location, and other characteristics of each may vary greatly between different implementations of the article of footwear 10.

The sole structure 22 may include different layers, such as an outsole 42, a midsole 40, and an insole or sockliner 34, for example. Each layer may serve a particular function. For example, the insole or sockliner 34 may be designed to contact the foot and to provide enhanced comfort to the foot, as described above. In this regard, the insole 34 may include a layer formed into the sole structure 22 such that the insole 34 is disposed between the midsole 40 and the upper 20 in an assembled configuration.

The outsole 42 is generally positioned on a bottom surface of the article of footwear 10. In particular, the outsole 42 may include a layer coupled to the midsole 40, such that the outsole 42 contacts the ground surface during normal use. In this regard, the outsole 42 may provide a degree of cushioning to the foot during use of the article of footwear 10. Further, the outsole 42 may be formed from an abrasive-resistant material such as rubber to protect the article of footwear 10 and provide the article of footwear 10 with the ability to positively grip the ground surface during use.

The midsole 40 may include a body 44 and one or more fluid-filled chambers 46, and may be disposed between the outsole 42 and the upper 20 and/or the insole 34. In some configurations, the midsole 40 may extend between the heel end 12 and the forefoot end 14 along the Y-axis and between the lateral side 16 and the medial side 18 along the X-axis in order to improve various performance-related characteristics of the article of footwear 10. For example, the midsole 40 may provide both stability and a cushioning system for the user's foot.

Figure 3A:
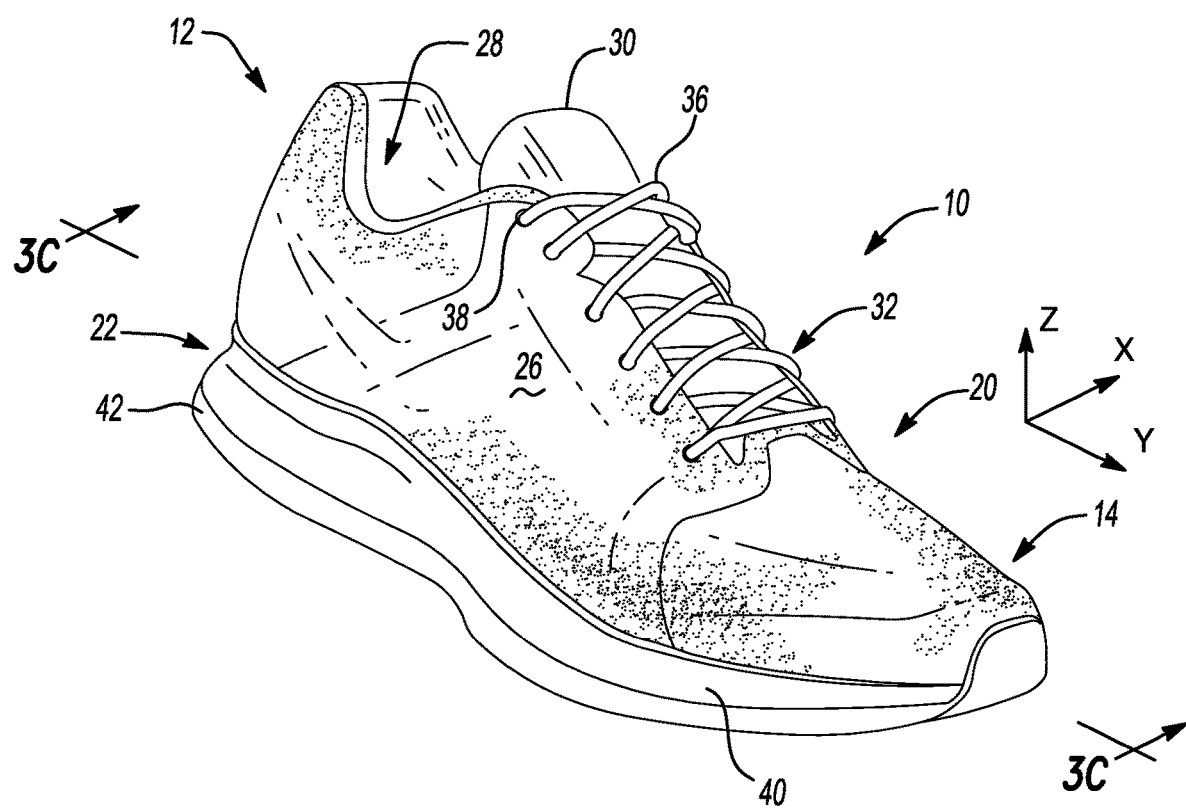
FIG. 3A is a top perspective view of an article of footwear in accordance with principles of the present disclosure.
Figure 3B:
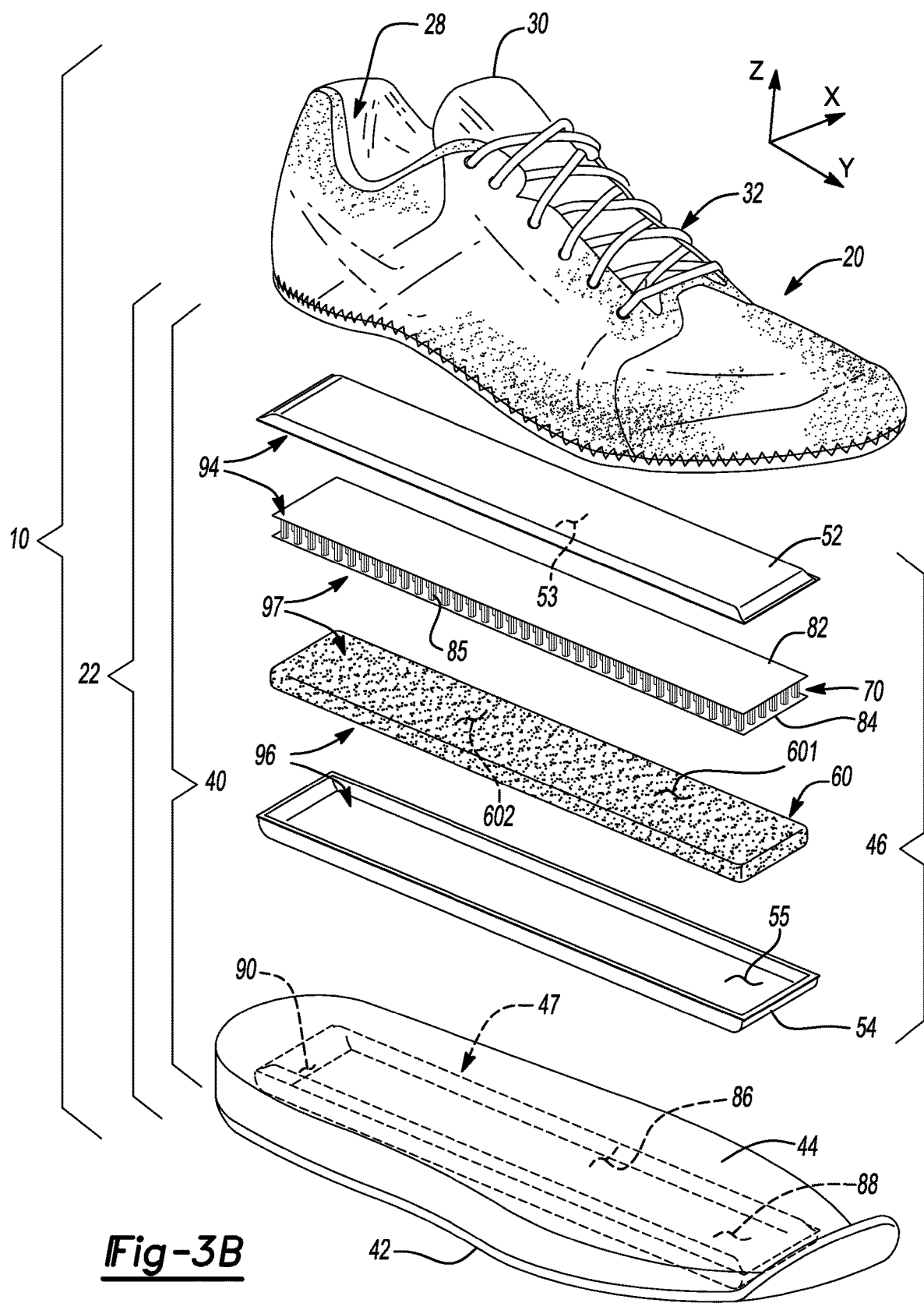
FIG. 3B is an exploded view of the article of footwear of FIG. 3A.
Figure 3C:
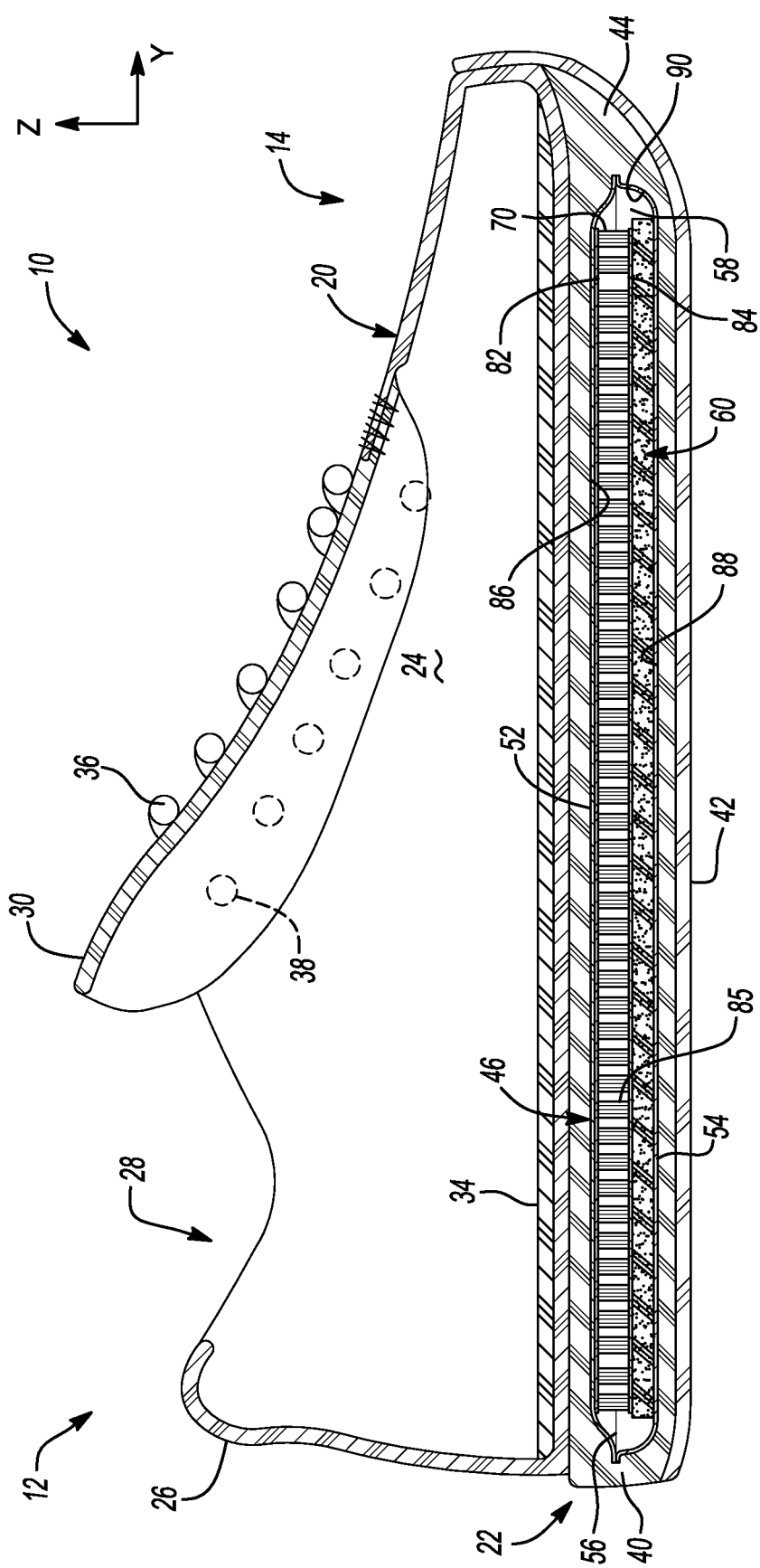
FIG. 3C is a cross-sectional view of the article of footwear of FIG. 3A taken along the line 3C-3C of FIG. 3A.

The body 44 of the midsole 40 may be formed at least in part from a foam polymer material, such as polyurethane, ethylvinylacetate, or another material, and may include a cavity 47 (FIG. 3B) defined at least in part by a first (e.g., upper) chamber contact surface 86, a second (e.g., lower) chamber contact surface 88, and a third (e.g., side or peripheral) chamber contact surface 90 (each shown, for example, in FIGS. 3B and 3C).

The fluid-filled chamber 46 may be disposed within the cavity 47 of the body 44 and may include a first barrier layer 52, a second barrier layer 54, a foam structure (e.g., layer) 60, and a tensile member 70. The first barrier layer 52 may be coupled to the second barrier layer 54 at a seam 56. In some configurations, the first barrier layer 52 is sealed to the second barrier layer 54 at the seam 56 such that the first and second barrier layers 52, 54 collectively define an interior void 58. The interior void 58 may include one or more fluids. For example, air, nitrogen, hexafluorethane, sulfur hexafluoroide, other gases, other fluids, or a mixture thereof, may fill the fluid-filled chamber 46. The first and second barrier layers 52, 54, including the sealed seam 56 therebetween, may maintain the fluid within the interior void 58 at ambient pressure or, alternatively, may maintain the fluid within the interior void 58 at a pressure that is greater than ambient pressure. The fluid-filled chamber 46, including the pressure thereof, provides improved cushioning properties by absorbing impact forces created when the outsole 42 strikes the ground surface during use.

In some configurations, the fluid-filled chamber 46 may extend along the X-axis by a width $W_{46}$ and be substantially centered within the body 44 of the midsole 40 along both the Z and X-axes. The width $W_{46}$ of the fluid-filled chamber 46 may extend across a majority (e.g., greater than 50% and less than 100%) of the midsole 40 along the X-axis. In this regard, it will be appreciated that the width $W_{46}$ of the fluid-filled chamber 46 may be greater or less than the width $W_{46}$ shown in FIG. 1B without departing from the scope of this disclosure.

Figure 2A:
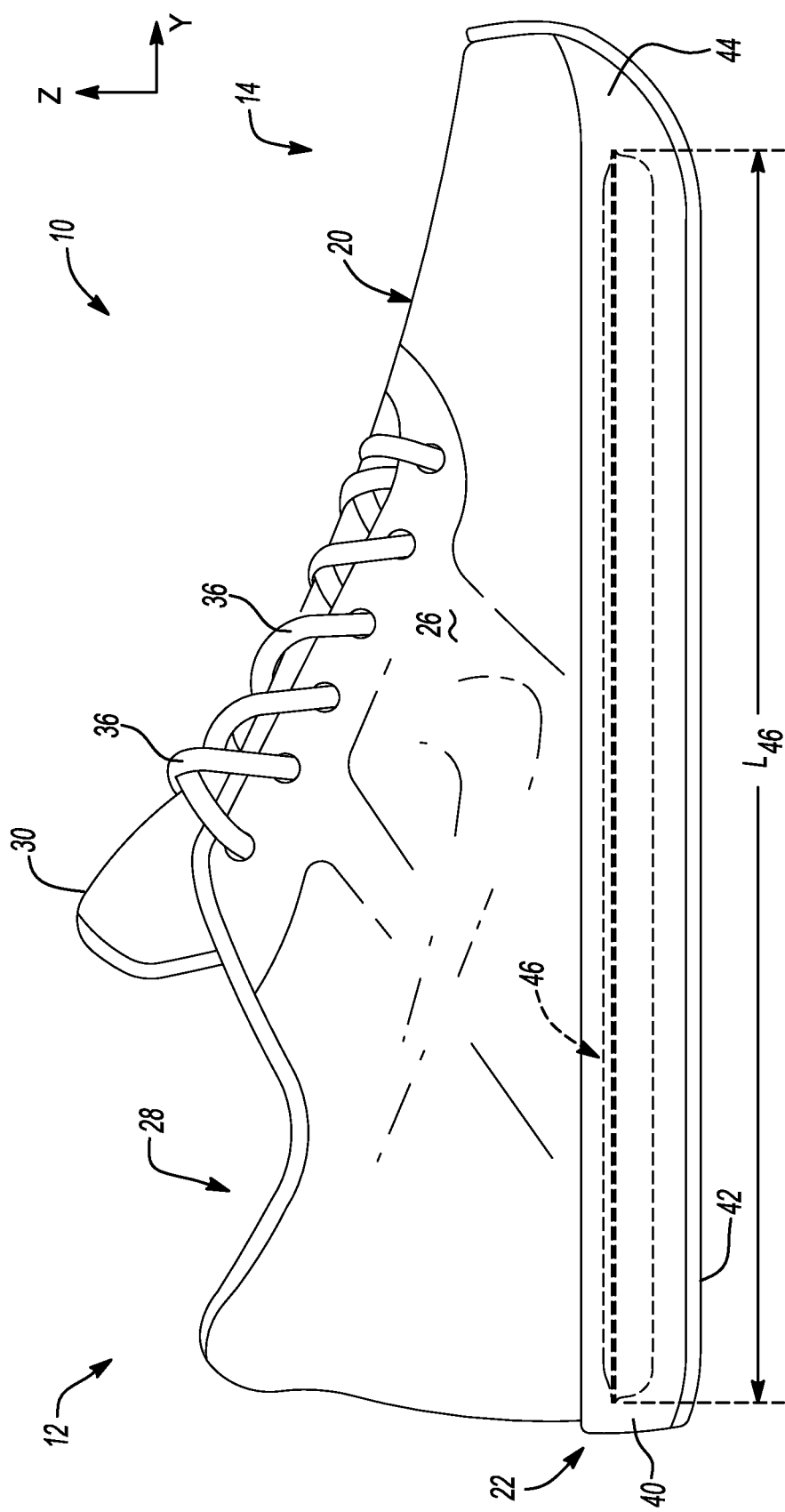
FIG. 2A is a side elevation view of the article of footwear of FIG. 1A.

The configuration (e.g., size, position, and/or quantity) of the fluid-filled chamber 46 within the body 44 of the midsole 40 may vary from the position illustrated in FIGS. 1B and 2A without departing from the scope of this disclosure. For example, the fluid-filled chamber 46 may be positioned off-center relative to the body 44 along the X, Y, and/or Z-axes. Additionally, the midsole 40 may incorporate more than one fluid-filled chamber 46 having differing designs within the scope of the present disclosure. As illustrated in FIG. 2A, in some configurations, the fluid-filled chamber 46 includes a length $L_{46}$ that spans from the heel end 12 to the forefoot end 14 along the Y-axis of the article of footwear 10.

Figure 2B:
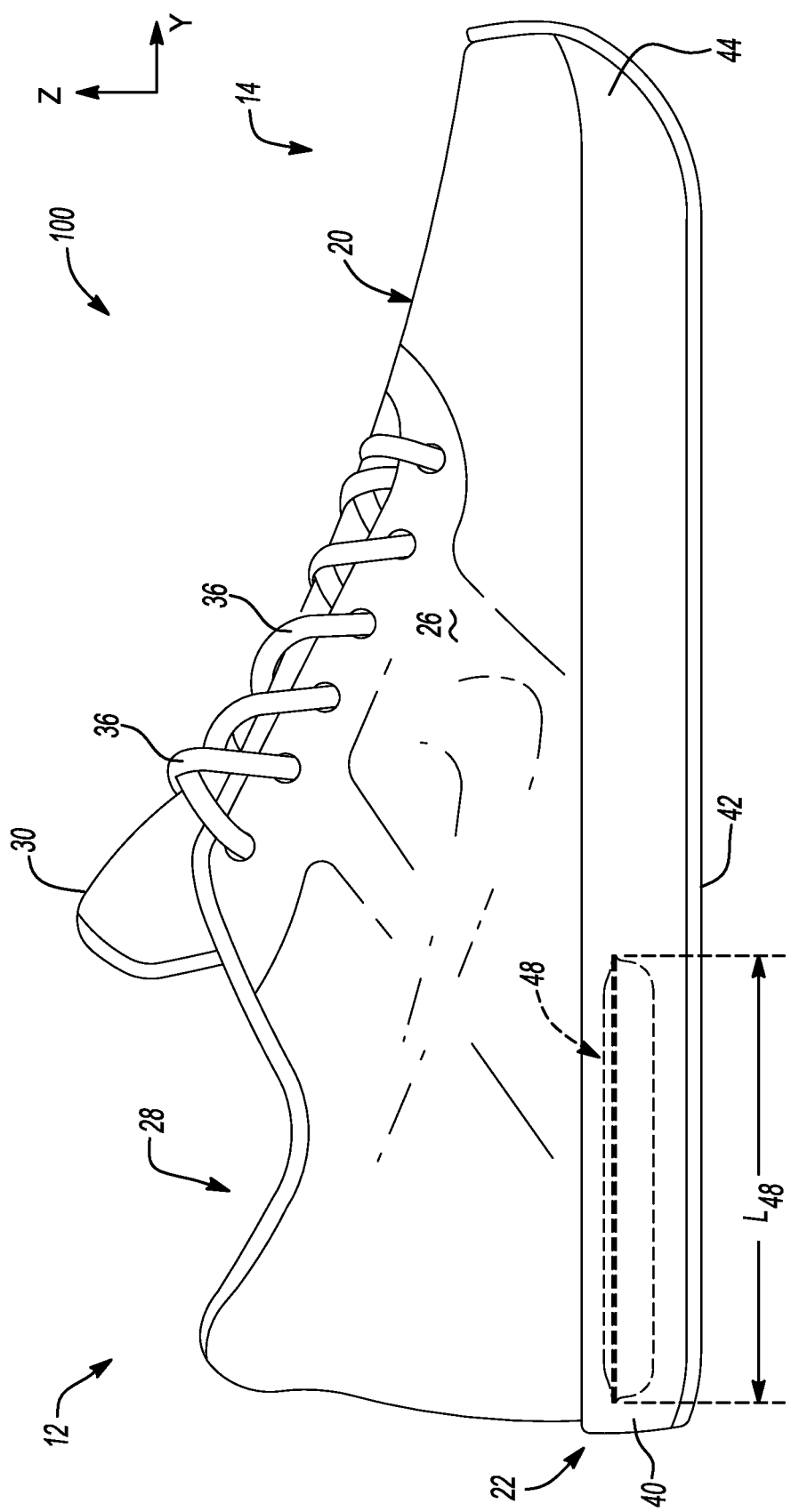
FIG. 2B is a side elevation view of another article of footwear in accordance with the principles of the present disclosure.

As illustrated in FIG. 2B, an article of footwear 100 is provided and includes a fluid-filled chamber 48. The article of footwear 100 and the fluid-filled chamber 48 may be substantially similar to the article of footwear 10 and the fluid filled chamber 46, respectively, except as otherwise shown or described herein. The fluid-filled chamber 48 may be disposed within the heel end 12 of the article of footwear 100 and may have a length $L_{48}$ that spans only a portion of the distance between the heel and forefoot ends 12, 14 along the Y-axis.

Figure 2C:
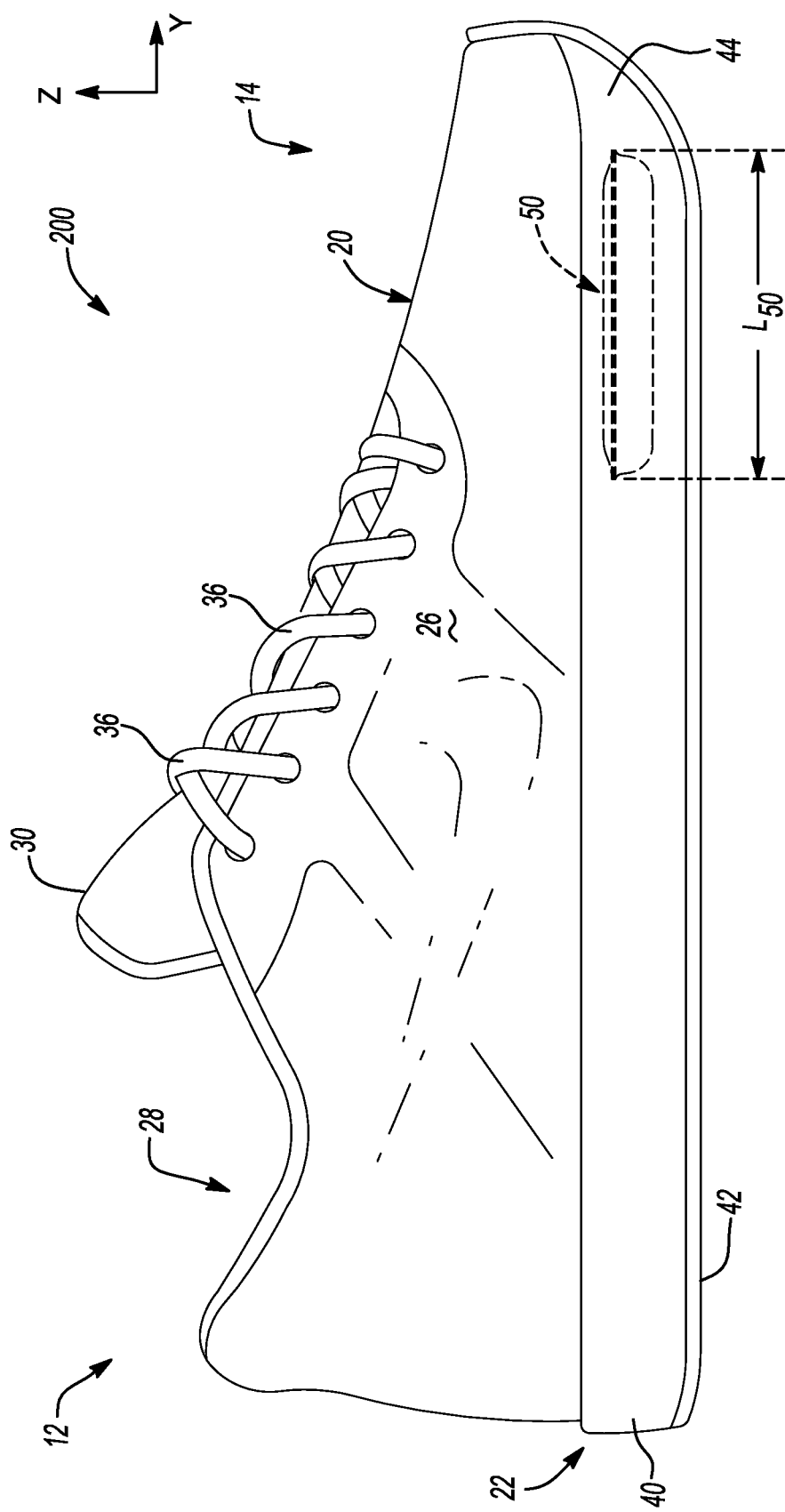
FIG. 2C is a side elevation view of another article of footwear in accordance with the principles of the present disclosure.

As illustrated in FIG. 2C, an article of footwear 200 is provided and includes a fluid-filled chamber 50. The article of footwear 200 and the fluid-filled chamber 50 may be substantially similar to the article of footwear 10 and the fluid filled chamber 46, respectively, except as otherwise shown or described herein. The fluid-filled chamber 50 may be disposed within the forefoot end 14 of the article of footwear 200 and may have a length $L_{50}$ that spans only a portion of the distance between the heel and forefoot ends 12, 14 along the Y-axis.

Figure 2D:
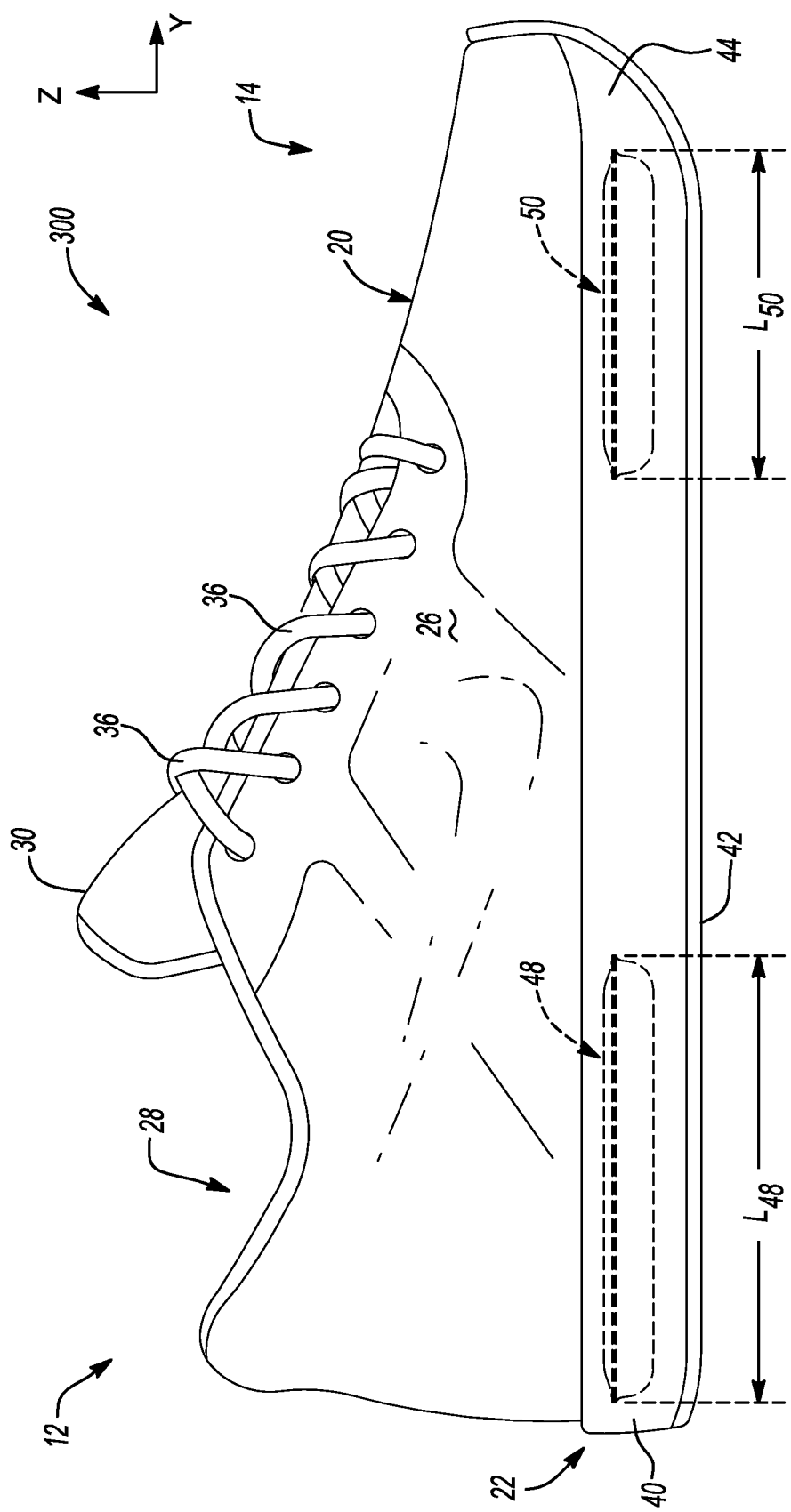
FIG. 2D is a side elevation view of another article of footwear in accordance with the principles of the present disclosure.

As illustrated in FIG. 2D, an article of footwear 300 is provided and includes the fluid-filled chamber 48 and the fluid-filled chamber 50. The article of footwear 300 may be substantially similar to the article of footwear 10 except as otherwise shown or described herein. While the articles of footwear 10, 100, 200, 300 are shown and described herein as having one or two fluid-filled chambers 46, 48, and/or 50, it will be appreciated that an article of footwear may include more than two fluid-filled chambers 46, 48, and/or 50 within the scope of the present disclosure.

The foam structure 60 may be disposed within the interior void 58 of the fluid-filled chamber 46. As illustrated in FIG. 1B, in some configurations, the foam structure 60 may be disposed adjacent to the second barrier layer 54 such that a first (e.g., lower) surface 602 of the foam structure 60 engages a first (e.g., upper) surface 55 of the second barrier layer 54 at a first attachment 96. The foam structure 60 may be formed from an open-cell foam core, such as the open-cell foam core disclosed in U.S. Pat. Nos. 4,874,640 and 5,235,715, the disclosures of which are fully incorporated herein by reference. Alternatively, the foam structure 60 may be formed from one or more flexible materials such as a mesh material, a nylon material, ethylene-vinyl acetate copolymer, or any other suitable material that provides cushioning and can be shaped into the shape of the foam structure 60. The material of the foam structure 60 provides improved cushioning properties by absorbing the impact forces created when the outsole 42 strikes the ground surface during use. Utilization of high density foam may increase the strength of the foam structure 60 and increase the length of time over which the impact forces are spread when the outsole 42 strikes the ground surface. Further, combining the foam structure 60 with the fluid-filled chamber 46 provides the article of footwear 10 with both responsive-type cushioning due to the foam structure 60 and soft-type cushioning due to the fluid contained within the chamber 46. These components advantageously can be installed in the article of footwear 10 at the same time once the fluid-filled chamber 46 is formed.

With reference to FIG. 3C, the tensile member 70 may be disposed within the interior void 58 of the fluid-filled chamber 46 and may include a first (e.g., upper) substrate 82, a second (e.g., lower) substrate 84, and a plurality of individual tensile fibers 85 extending between the first substrate 82 and the second substrate 84. As illustrated in FIGS. 1B and 3B, in some configurations, the tensile member 70 is disposed between the foam structure 60 and the first barrier layer 52 relative to the Z-axis such that (i) the first substrate 82 engages a second (e.g., lower) surface 53 of the first barrier layer 52 at a second attachment 94 and (ii) the second substrate 84 engages a second (e.g., upper) surface 601 of the foam structure 60 at a third attachment 97. The first and second substrates 82, 84 may include a substantially planar configuration. Accordingly, the attachment 94 between the tensile member 70 (at the first substrate 82) and the first barrier layer 52, as well as the attachment 97 between the tensile member 70 (at the second substrate 84) and the foam structure 60, may be formed in a manner such that substantially all of the first and second substrates 82, 84 contact the second surface 53 of the first barrier layer 52 and the second surface 601 of the foam structure 60, respectively.

The plurality of individual tensile fibers 85, which may deflect easily when a compressive force is applied to the tensile member 70, may include various sizes (e.g., diameter, length along the Z-axis), cross-sectional shapes (e.g., circular, rectangular, or other polygon), and/or materials. For example, as illustrated throughout the figures, a distance along the Z-axis between the first and second substrates 82, 84 may vary such that the length of the tensile fibers 85, as measured along the Z-axis, may also vary from one tensile fiber 85 to another tensile fiber 85 and/or from one configuration of the fluid-filled chamber 46 to another configuration of the fluid-filled chamber 46. When the fluid-filled chamber 46 and/or the tensile member 70 is in a neutral state (i.e., no external force is applied to the fluid-filled chamber 46 and/or the tensile member 70), one or more of the plurality of individual tensile fibers 85 may experience a tensile force in order to maintain a desired shape (e.g., FIG. 1B) of the fluid-filled chamber 46 by preventing or inhibiting the first barrier layer 52 from moving away from the second barrier layer 54 along the Z-axis. The tensile fibers 85 are placed under tension due to the fluid contained within the fluid-filled chamber 46. Additional details of tensile fibers 85 are described in U.S. Pat. Nos. 4,906,502, 5,083,361, and 6,385,864, the disclosures of which are fully incorporated herein by reference.

With further reference to FIGS. 3A-3C, a method of manufacturing the article of footwear 10 will now be described. The first and/or second barrier layers 52, 54 may be formed from a polymer (e.g., thermoplastic polyurethane) using various manufacturing techniques (e.g., injection molding). The first barrier layer 52 may be sealingly engaged with the second barrier layer 54 at the seam 56 such that the first and second barrier layers 52, 54 collectively define an interior void 58. In particular, the first barrier layer 52 may be attached to the second barrier layer 54 using various fastening techniques, such as applying heat and/or pressure or applying an adhesive, for example. The foam structure 60 and the tensile member 70 may be positioned within the interior void 58 such that the plurality of fibers 85 extend in a first direction (e.g., along the Z-axis) between the first barrier layer 52 and the second barrier layer 54. In this regard, the foam structure 60 may be attached to the second barrier layer 52 at the first attachment 96. In addition, the first substrate 82 may be attached to the first barrier layer 52 at the second attachment 94, and the second substrate 84 may be attached to the foam structure 60 at the third attachment 97. A predetermined volume of fluid, such as air, nitrogen, hexafluorethane, sulfur hexafluoride, or a mixture thereof, for example, may be injected into the interior void 58 in order to place the fibers 85 in tension. The fluid-filled chamber 46 may be placed and secured within the body 44 of the midsole 22. In particular, the fluid-filled chamber 46 may be secured within the cavity 47 using various techniques, such as overmolding or adhesive bonding, for example.

Figure 4A:
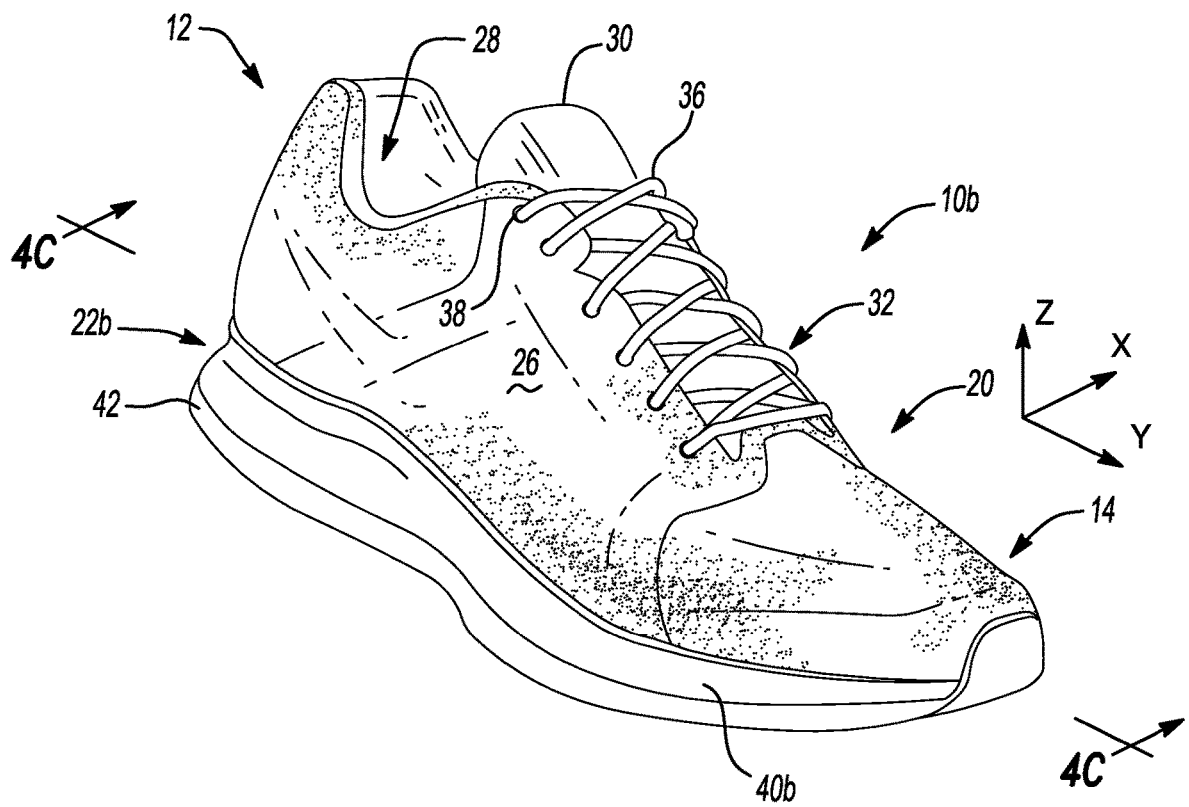
FIG. 4A is a top perspective view of an article of footwear in accordance with principles of the present disclosure.
Figure 4B:
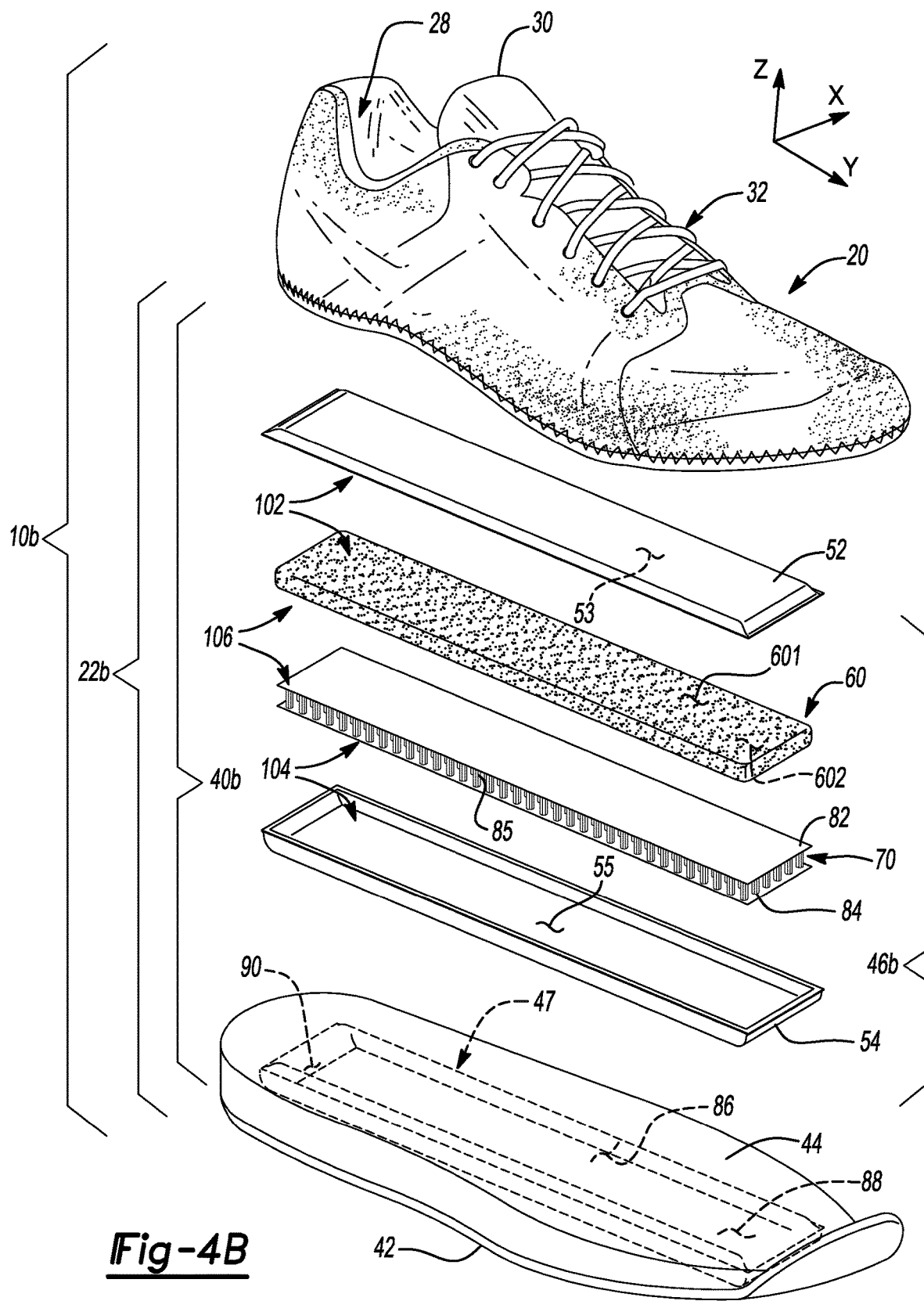
FIG. 4B is an exploded view of the article of footwear of FIG. 4A.
Figure 4C:
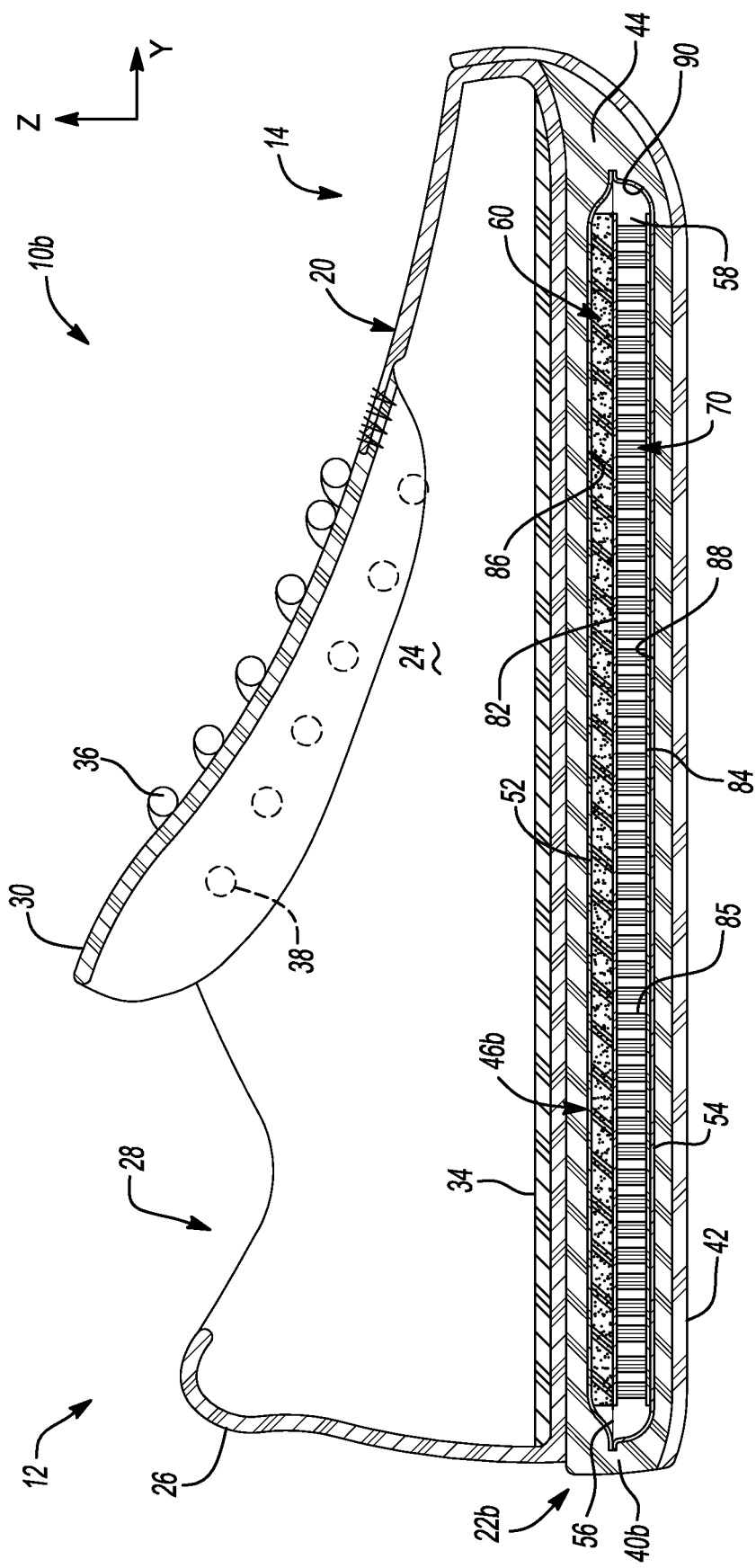
FIG. 4C is a cross-sectional view of the article of footwear of FIG. 4A taken along the line 4C-4C of FIG. 4A.

With reference to FIGS. 4A-4C, another article of footwear 10b is shown. Except as otherwise provided herein, the structure and function of the article of footwear 10b may be substantially similar to the structure and function of the article of footwear 10. In view of the substantial similarity in structure and function of the components associated with the article of footwear 10b with respect to the article of footwear 10, like reference numerals are used hereinafter and in the drawings to identify like components, while like reference numerals containing letter extensions are used to identify those components that have been modified.

The article of footwear 10b may include the upper 20 and a sole structure 22b. The sole structure 22b may include a midsole 40b and the outsole 42. The midsole 40b may include a fluid-filled chamber 46b residing within the body 44.

The fluid-filled chamber 46b may be located within the article of footwear 10b in any of the positions and orientations shown in FIGS. 2A-2D, and may include the first barrier layer 52, the second barrier layer 54, the foam structure 60, and the tensile member 70. The foam structure 60 may be disposed adjacent to the first barrier layer 52 such that the second surface 601 of the foam structure 60 engages the second surface 53 of the first barrier layer 52 at a fourth attachment 102. The tensile member 70 may be disposed between the foam structure 60 and the second barrier layer 54 relative to the Z-axis such that (i) the second substrate 84 engages the first surface 55 of the second barrier layer 54 at a fifth attachment 104 and (ii) the first substrate 82 engages the first surface 602 of the foam structure 60 at a sixth attachment 106. The first and second substrates 82, 84 may include a substantially planar configuration. Accordingly, the attachment 106 between the tensile member 70 (at the first substrate 82) and the foam structure 60, as well as the attachment 104 between the tensile member 70 (at the second substrate 84) and the second barrier layer 54, may be formed in a manner such that substantially all of the first and second substrates 82, 84 contact the first surface 602 of the foam structure 60 and the first surface 55 of the second barrier layer 54, respectively. Additionally, the attachment 102 may be such that substantially all of the first surface 601 of the foam structure 60 contacts the surface 53 of the first barrier layer 52.

With further reference to FIGS. 4A-4C, a method of manufacturing the article of footwear 10b will now be described. In view of the substantial similarities in the method of manufacturing the article of footwear 10b and the method of manufacturing the article of footwear 10, only the differences will be discussed herein. During the method of manufacturing the article of footwear 10b, the foam structure 60 may be attached to the first barrier layer 52 at the fourth attachment 102, the first substrate 82 may be attached to the foam structure 60 at the sixth attachment 106, and the second substrate 84 may be attached to the second barrier layer 54 at the fifth attachment 104. Once attached, the fluid-filled chamber 46b may be provided with a predetermined fluid to place the fibers 85 of the tensile member 70 under tension.

Figure 5A:
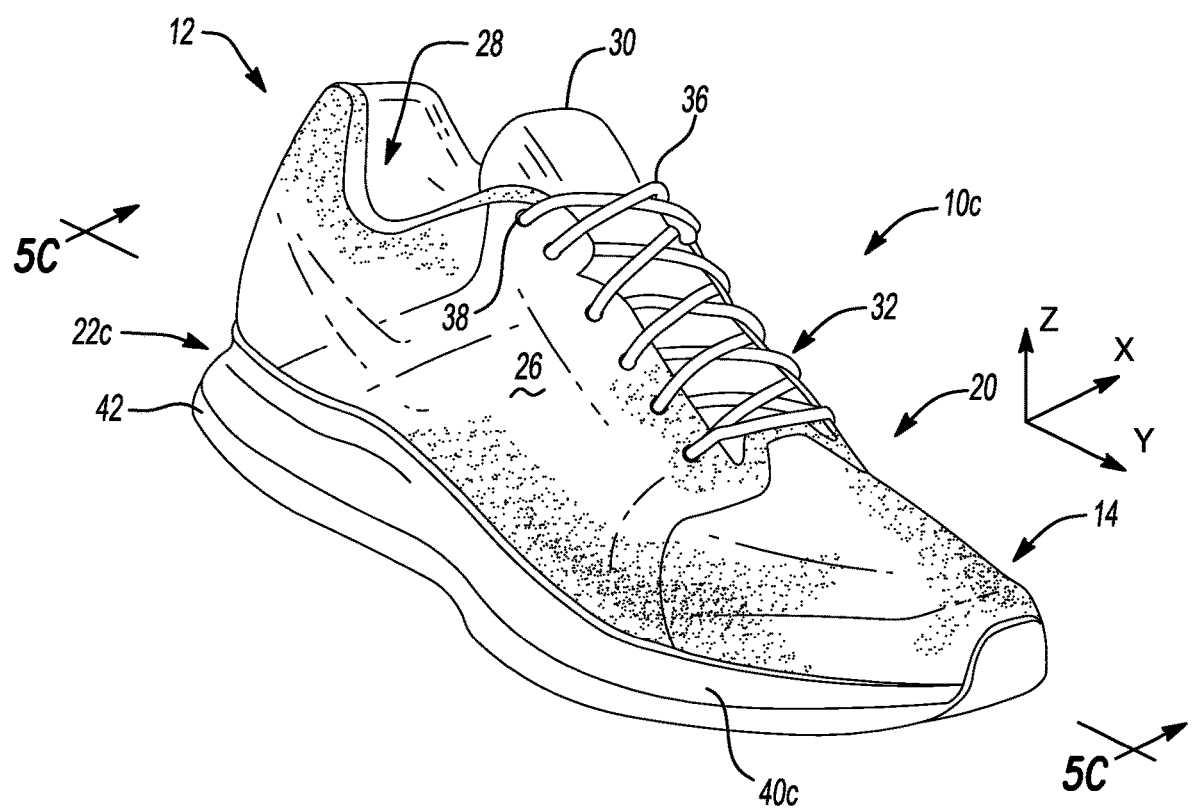
FIG. 5A is a top perspective view of an article of footwear in accordance with principles of the present disclosure.
Figure 5B:
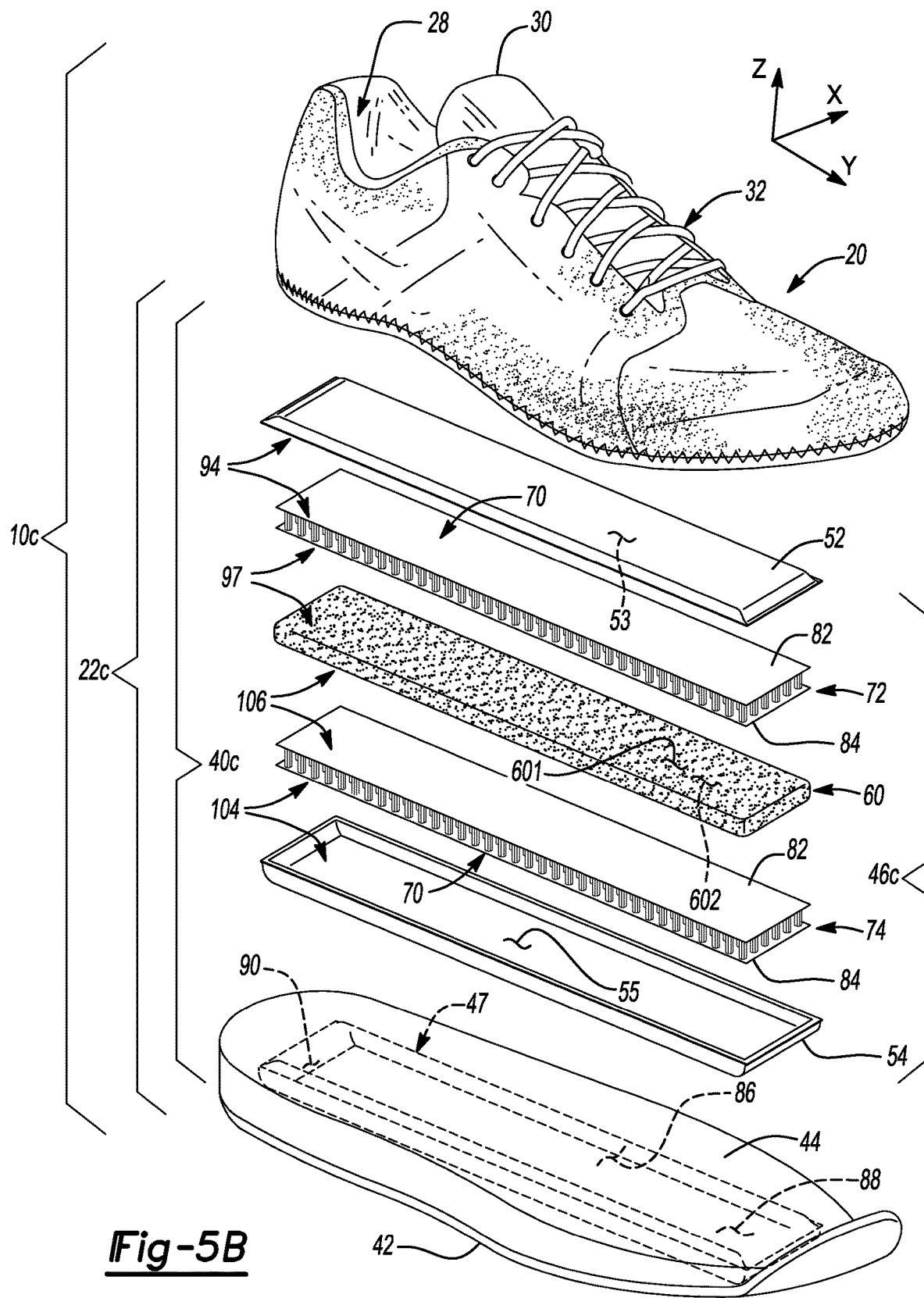
FIG. 5B is an exploded view of the article of footwear of FIG. 5A.
Figure 5C:
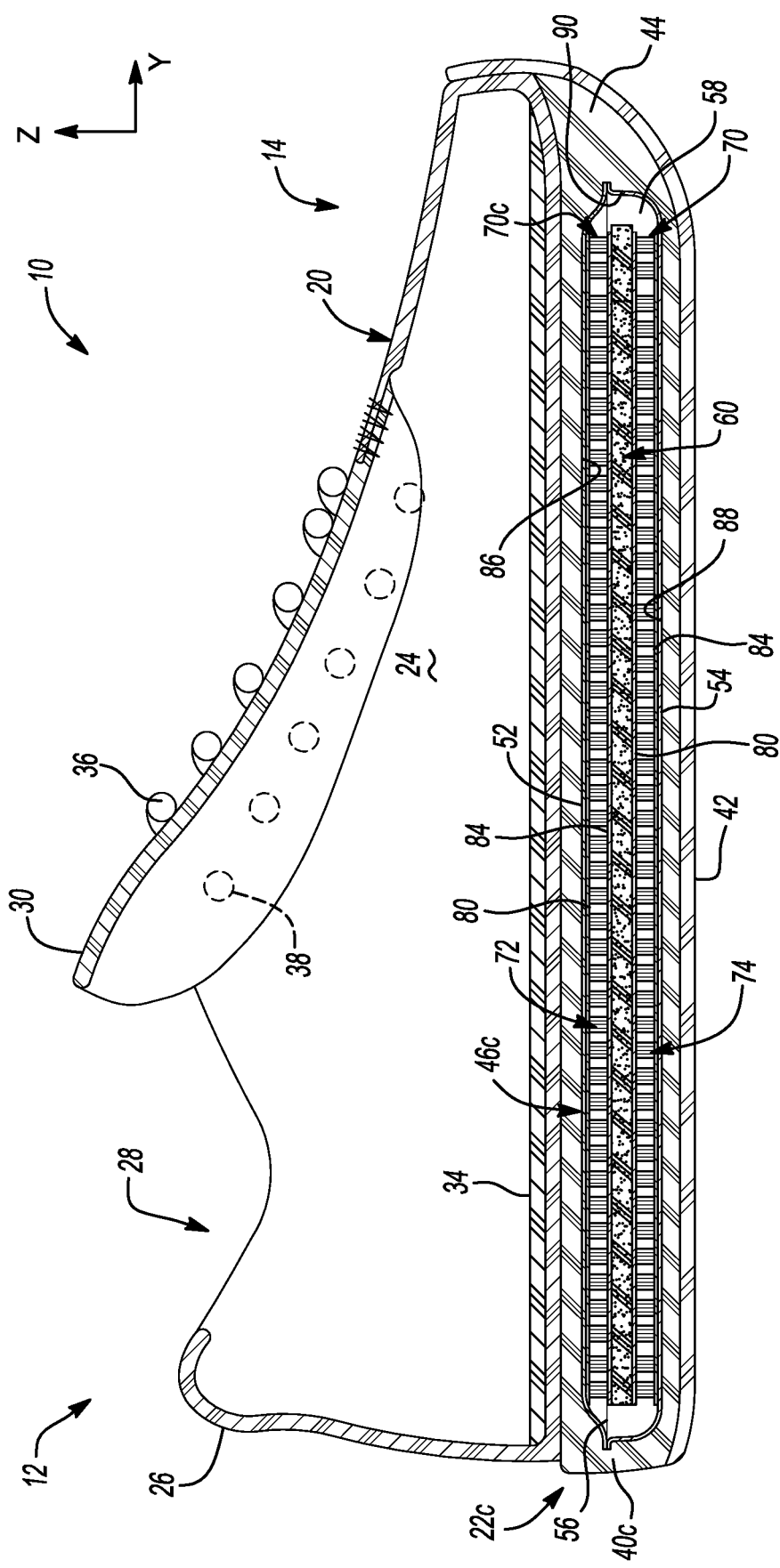
FIG. 5C is a cross-sectional view of the article of footwear of FIG. 5A taken along the line 5C-5C of FIG. 5A.

With reference to FIGS. 5A-5C, another article of footwear 10c is shown. Except as otherwise provided herein, the structure and function of the article of footwear 10c may be substantially similar to the structure and function of the article of footwear 10. In view of the substantial similarity in structure and function of the components associated with the article of footwear 10c with respect to the article of footwear 10, like reference numerals are used hereinafter and in the drawings to identify like components, while like reference numerals containing letter extensions are used to identify those components that have been modified.

The article of footwear 10c may include the upper 20 and a sole structure 22c. The sole structure 22c may include a midsole 40c and the outsole 42. The midsole 40c may include a fluid-filled chamber 46c residing within the body 44.

The fluid-filled chamber 46c may be located within the article of footwear 10c in any of the positions and orientations shown in FIGS. 2A-2D, and may include the first barrier layer 52, the second barrier layer 54, the foam structure 60, and one or more tensile members 70. As illustrated in FIG. 5B, in some configurations, the fluid-filled chamber 46c includes two tensile members 70. A first (e.g., upper) tensile member 72 of the tensile members 70 may be disposed between the foam structure 60 and the first barrier layer 52 relative to the Z-axis such that (i) the first substrate 82 engages the second surface 53 of the first barrier layer 52 at the second attachment 94 and (ii) the second substrate 84 engages the second surface 601 of the foam structure 60 at the third attachment 97. A second (e.g., lower) tensile member 74 of the tensile members 70 may be disposed between the foam structure 60 and the second barrier layer 54 relative to the Z-axis such that (i) the second substrate 84 engages the first surface 55 of the second barrier layer 54 at the fifth attachment 104 and (ii) the first substrate 82 engages the first surface 602 of the foam structure 60 at the sixth attachment 106. Accordingly, as illustrated in FIGS. 5B and 5C, the foam structure 60 may be disposed between the first and second tensile members 72, 74 such that the second surface 601 engages the second substrate 84 of the first tensile member 72 and the first surface 602 engages the first substrate 82 of the second tensile member 74.

With further reference to FIGS. 5A-5C, a method of manufacturing the article of footwear 10c will now be described. In view of the substantial similarities in the method of manufacturing the article of footwear 10c and the method of manufacturing the article of footwear 10, only the differences will be discussed herein. During the method of manufacturing the article of footwear 10c, the foam structure 60 may be positioned between, and attached to, the first and second tensile members 72, 74. Specifically, the second substrate 84 of the first tensile member 72 may be attached to the second surface 601 of the foam structure 60 at the third attachment 97, and the first substrate 82 of the second tensile member 74 may be attached to the first surface 602 of the foam structure 60 at the sixth attachment 106. Additionally, the first substrate 82 of the first tensile member 72 may be attached to the first barrier layer 52 at the second attachment 94, and the second substrate 84 of the second tensile member 74 may be attached to the second barrier layer 54 at the fifth attachment 104.

Figure 6A:
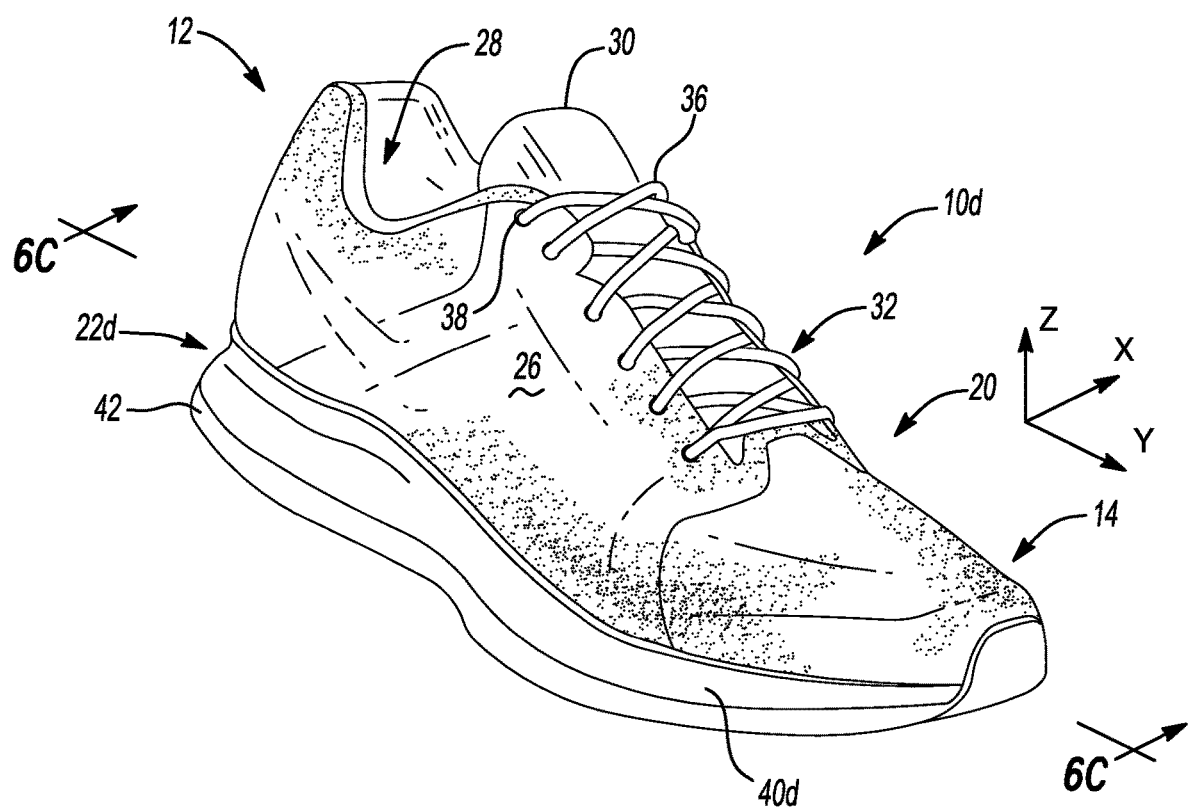
FIG. 6A is a top perspective view of an article of footwear in accordance with principles of the present disclosure.
Figure 6B:
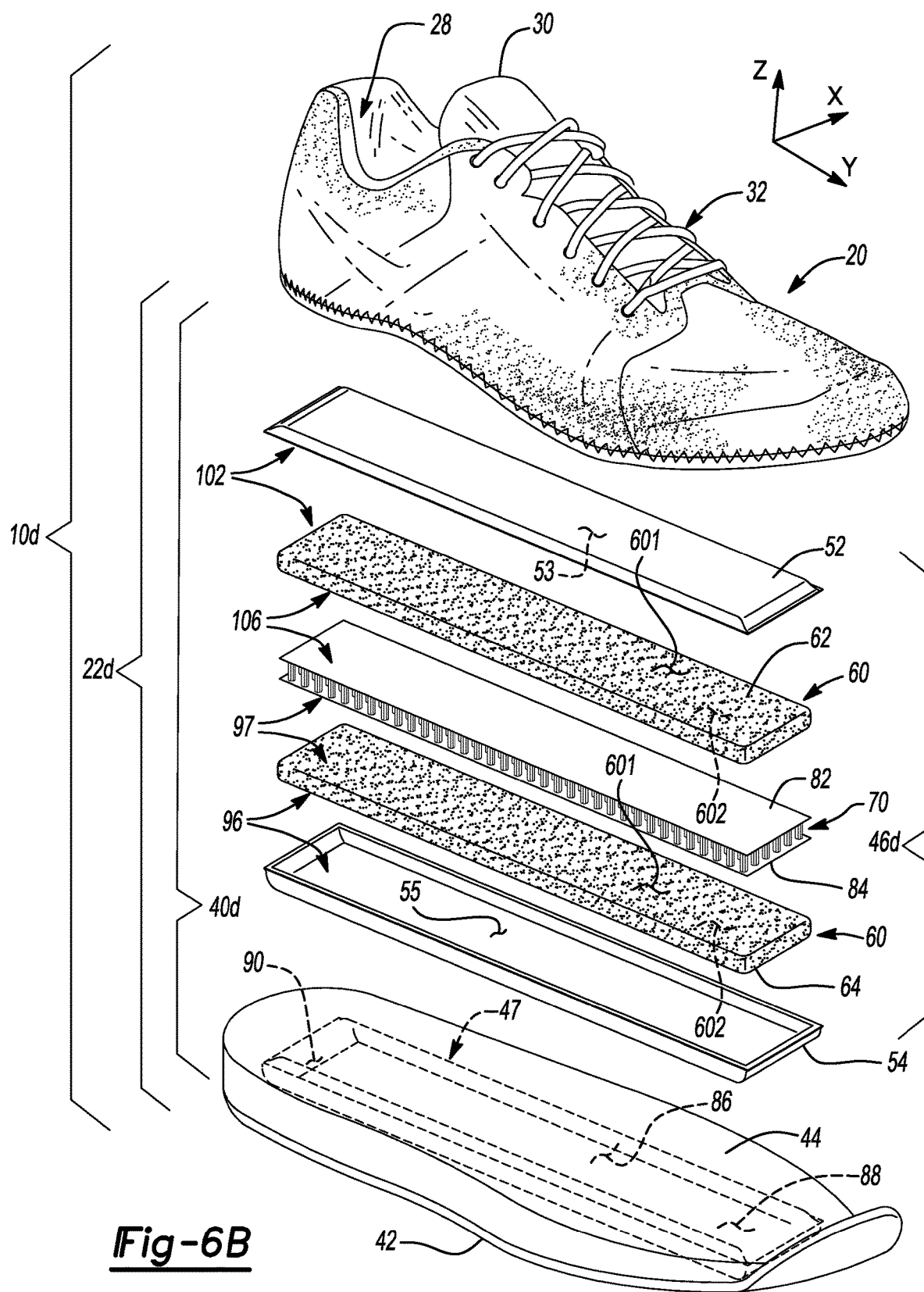
FIG. 6B is an exploded view of the article of footwear of FIG. 6A.
Figure 6C:
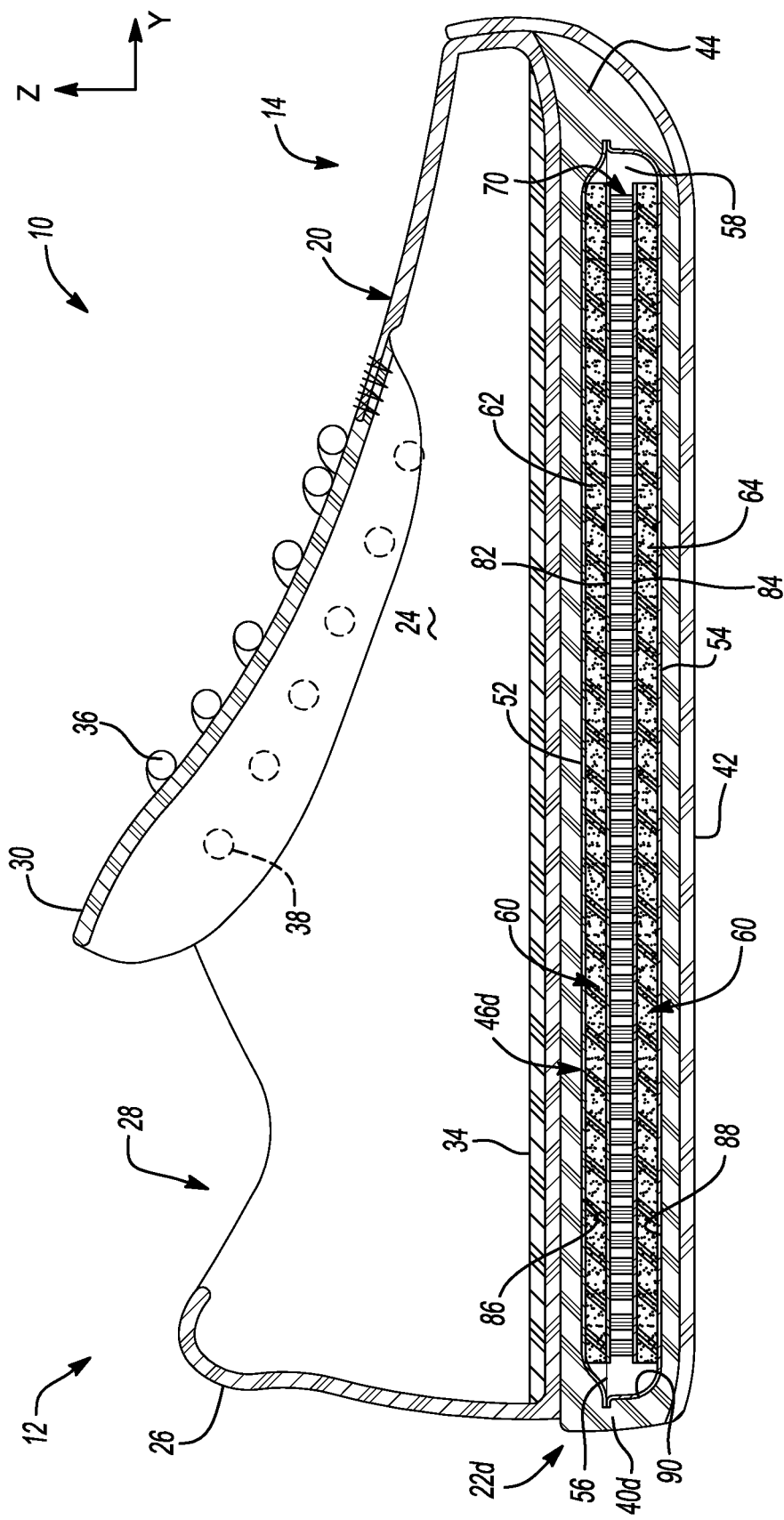
FIG. 6C is a cross-sectional view of the article of footwear of FIG. 6A taken along the line 6C-6C of FIG. 6A.

With reference to FIGS. 6A-6C, another article of footwear 10d is shown. Except as otherwise provided herein, the structure and function of the article of footwear 10d may be substantially similar to the structure and function of the article of footwear 10. In view of the substantial similarity in structure and function of the components associated with the article of footwear 10d with respect to the article of footwear 10, like reference numerals are used hereinafter and in the drawings to identify like components, while like reference numerals containing letter extensions are used to identify those components that have been modified.

The article of footwear 10d may include the upper 20 and a sole structure 22d. The sole structure 22d may include a midsole 40d and the outsole 42. The midsole 40d may include a fluid-filled chamber 46d residing within the body 44.

The fluid-filled chamber 46d may be located within the article of footwear 10d in any of the positions and orientations shown in FIGS. 2A-2D, and may include the first barrier layer 52, the second barrier layer 54, one or more foam structures 60, and the tensile member 70. As illustrated in FIG. 6B, in some configurations, the fluid-filled chamber 46d includes two foam structures 60. A first (e.g., upper) foam structure 62 of the foam structures 60 may be disposed adjacent to the first barrier layer 52 such that the second surface 601 of the foam structure 60 engages the second surface 53 of the first barrier layer 52 at the fourth attachment 102. A second (e.g., lower) foam structure 64 of the foam structures 60 may be disposed adjacent to the second barrier layer 54 such that the first surface 602 of the foam structure 60 engages the first surface 55 of the second barrier layer 54 at the first attachment 96. Accordingly, as illustrated in FIGS. 6B and 6C, the tensile member 70 may be disposed between the first and second foam structures 66, 64, such that the first substrate 82 engages the first surface 602 of the first foam structure 62 and the second substrate 84 engages the second surface 601 of the second foam structure 64.

With further reference to FIGS. 6A-6C, a method of manufacturing the article of footwear 10d will now be described. In view of the substantial similarities in the method of manufacturing the article of footwear 10d and the method of manufacturing the article of footwear 10, only the differences will be discussed herein. During the method of manufacturing the article of footwear 10d, the tensile member 70 may be positioned between, and attached to, the first and second foam structures 62, 64. Specifically, the second substrate 84 of the tensile member 70 may be attached to the second surface 601 of the second foam structure 64 at the third attachment 97, and the first substrate 82 of the tensile member 70 may be attached to the first surface 602 of the first foam structure 62 at the sixth attachment 106. Additionally, the first surface 602 of the second foam structure 64 may be attached to the second barrier layer 54 at the first attachment 96, and the second surface 601 of the first foam structure 62 may be attached to the first barrier layer 52 at the fourth attachment 102.

With reference to FIGS. 7A-7D, another article of footwear 10e is shown. Except as otherwise provided herein, the structure and function of the article of footwear 10e may be substantially similar to the structure and function of the article of footwear 10. In view of the substantial similarity in structure and function of the components associated with the article of footwear 10e with respect to the article of footwear 10, like reference numerals are used hereinafter and in the drawings to identify like components, while like reference numerals containing letter extensions are used to identify those components that have been modified.

Figure 7A:
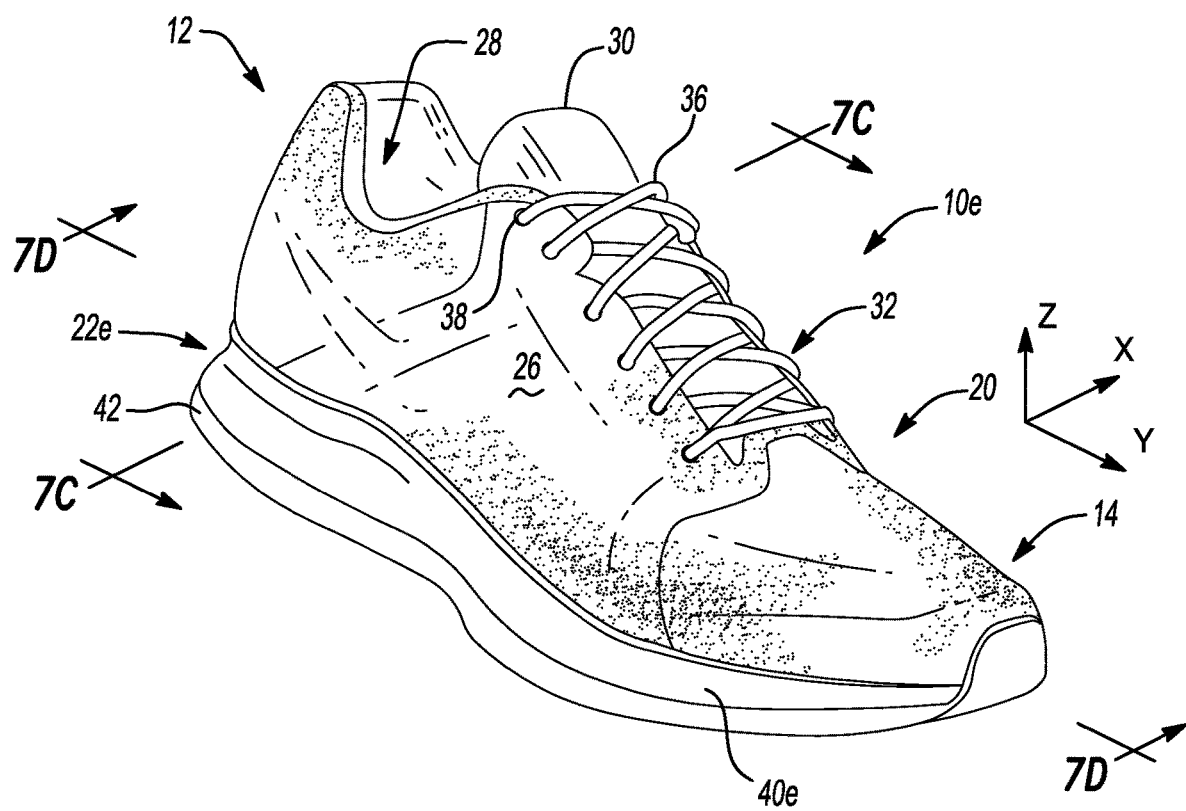
FIG. 7A is a top perspective view of an article of footwear in accordance with principles of the present disclosure.
Figure 7B:
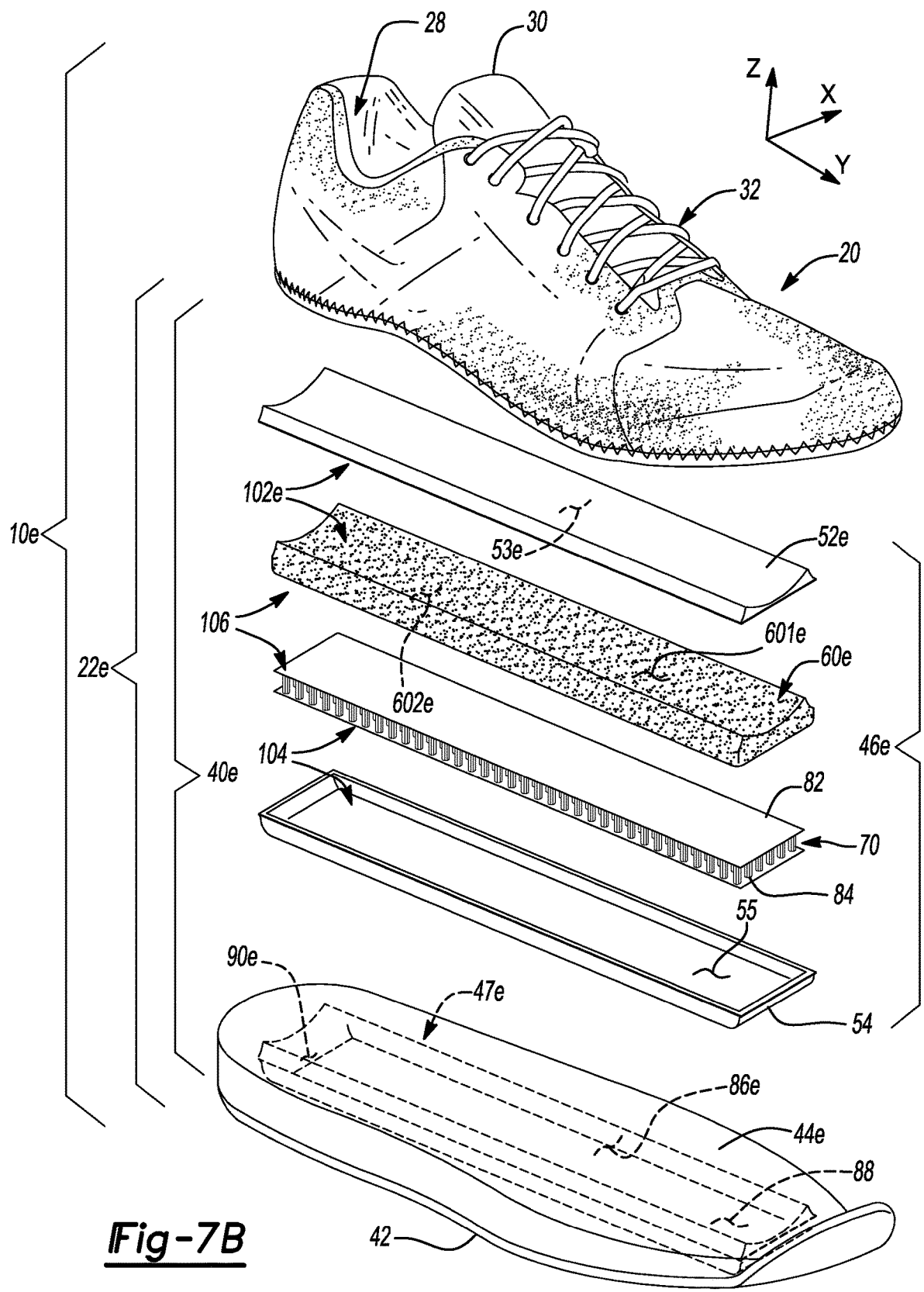
FIG. 7B is an exploded view of the article of footwear of FIG. 7A.
Figure 7C:
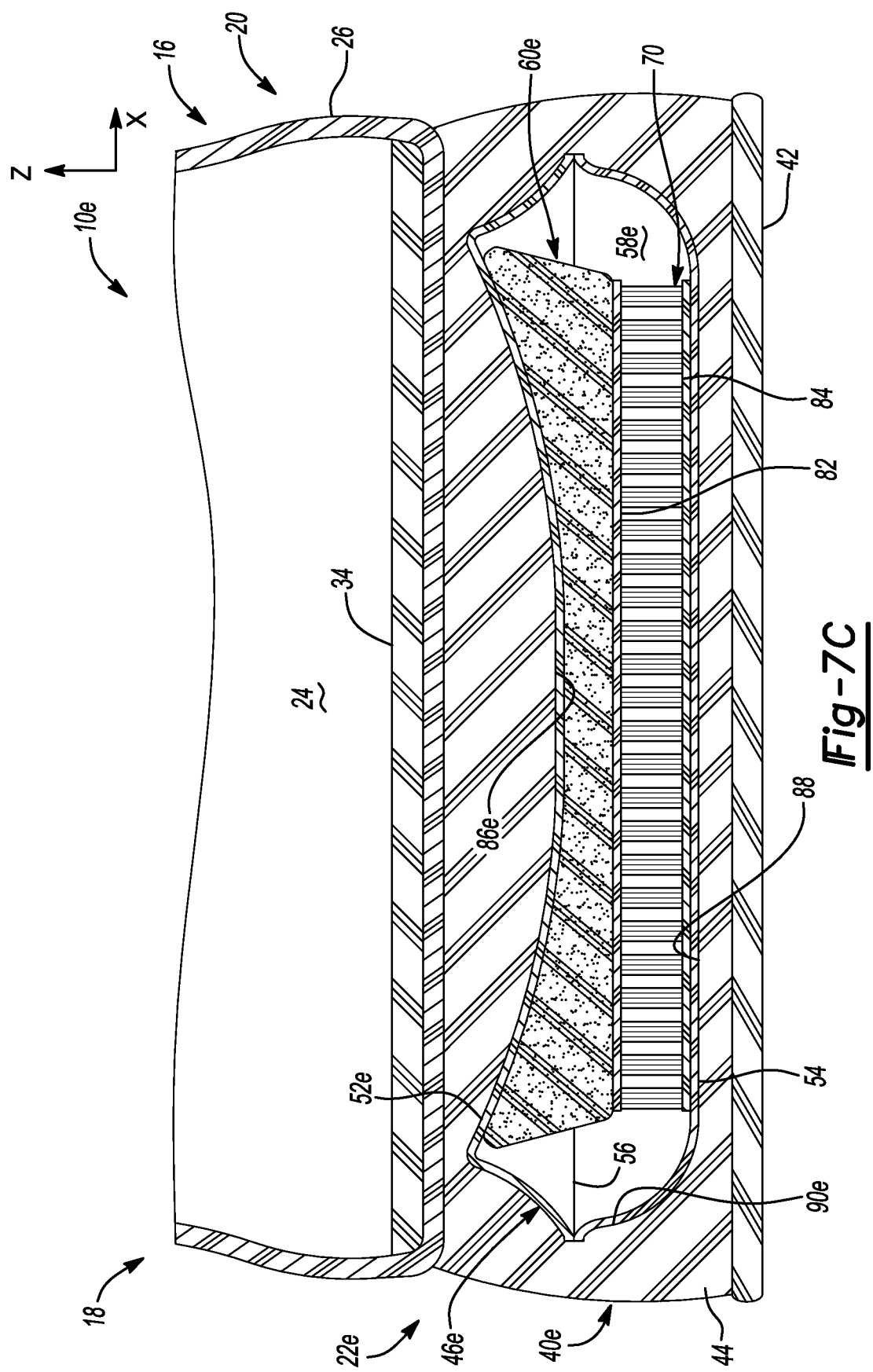
FIG. 7C is a partial cross-sectional view of the article of footwear of FIG. 7A taken along the line 7C-7C of FIG. 7A.
Figure 7D:
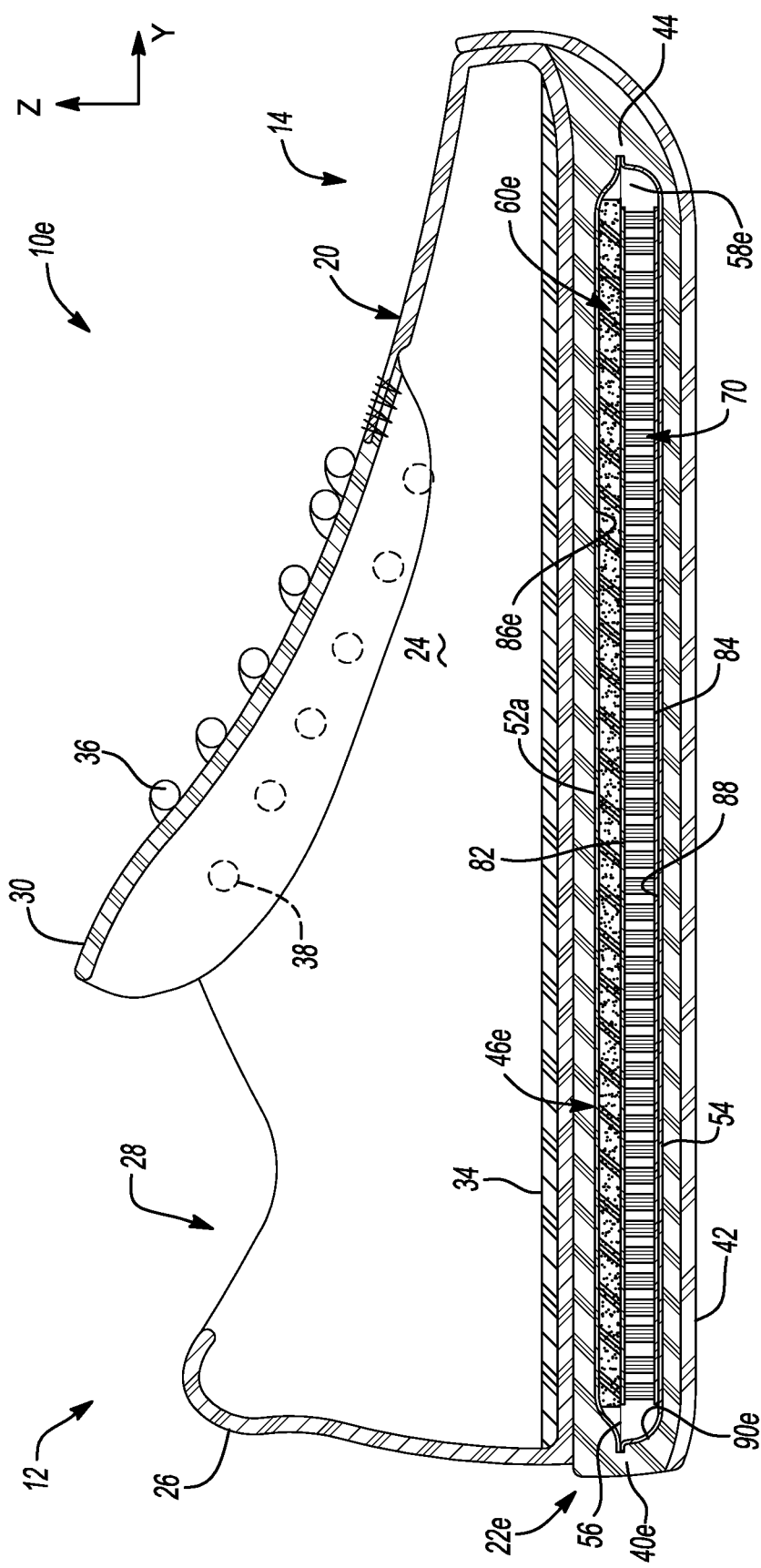
FIG. 7D is a cross-sectional view of the article of footwear of FIG. 7A taken along the line 7D-7D of FIG. 7A.

The article of footwear 10e may include the upper 20 and a sole structure 22e. The sole structure 22e may include a midsole 40e and the outsole 42. The midsole 40e may include a fluid-filled chamber 46e residing within a body 44e. As illustrated in FIGS. 7B-7D, the body 44e may include a cavity 47e defined at least in part by a first (e.g., upper) chamber contact surface 86e, the second chamber contact surface 88, and the third chamber contact surface 90. The first chamber contact surface 86e may be substantially convex in a direction extending alone the X-axis, and substantially planar in a direction extending along the Y-axis.

The fluid-filled chamber 46e may be located within the article of footwear 10e in any of the positions and orientations shown in FIGS. 2A-2D, and may include a first barrier layer 52g, the second barrier layer 54, a foam structure 60e, and the tensile member 70. A second surface 53e of the first barrier layer 52e may be substantially convex in a direction extending alone the X-axis, and substantially planar in a direction extending alone the Y-axis. A surface of the first barrier layer 52e opposite the second surface 53e may be substantially concave in a direction extending alone the X-axis, and substantially planar in a direction extending alone the Y-axis. In this regard, the concavity of the surface opposite the second surface 53e may be equal to, and match, the convexity of the first chamber contact surface 86e of the body 44e.

The foam structure 60e may be disposed within the interior void 58e of the fluid-filled chamber 46e. As illustrated in FIGS. 7B and 7C, in some configurations, the foam structure 60e is disposed adjacent to the first barrier layer 52e such that a second surface 601e of the foam structure 60e engages the second surface 53e of the first barrier layer 52e at a fourth attachment 102e. The second surface 601e of the foam structure 60e may be substantially concave in a direction extending alone the X-axis. In this regard, the concavity of the second surface 601e may be equal to, and match, the convexity of the second surface 53e of the first barrier layer 52e. Accordingly, the fourth attachment 102e may be such that substantially the entire first surface 601e of the foam structure 60e contacts the surface 53e of the first barrier layer 52e. The tensile member 70 may be disposed between the foam structure 60e and the second barrier layer 54 relative to the Z-axis such that (i) the second substrate 84 engages the first surface 55 of the second barrier layer 54 at the fifth attachment 104 and (ii) the first substrate 82 engages the first surface 602 of the foam structure 60e at the sixth attachment 106.

With reference to FIGS. 8A-8D, another article of footwear 10f is shown. Except as otherwise provided herein, the structure and function of the article of footwear 10f may be substantially similar to the structure and function of the article of footwear 10. In view of the substantial similarity in structure and function of the components associated with the article of footwear 10f with respect to the article of footwear 10, like reference numerals are used hereinafter and in the drawings to identify like components, while like reference numerals containing letter extensions are used to identify those components that have been modified.

Figure 8A:
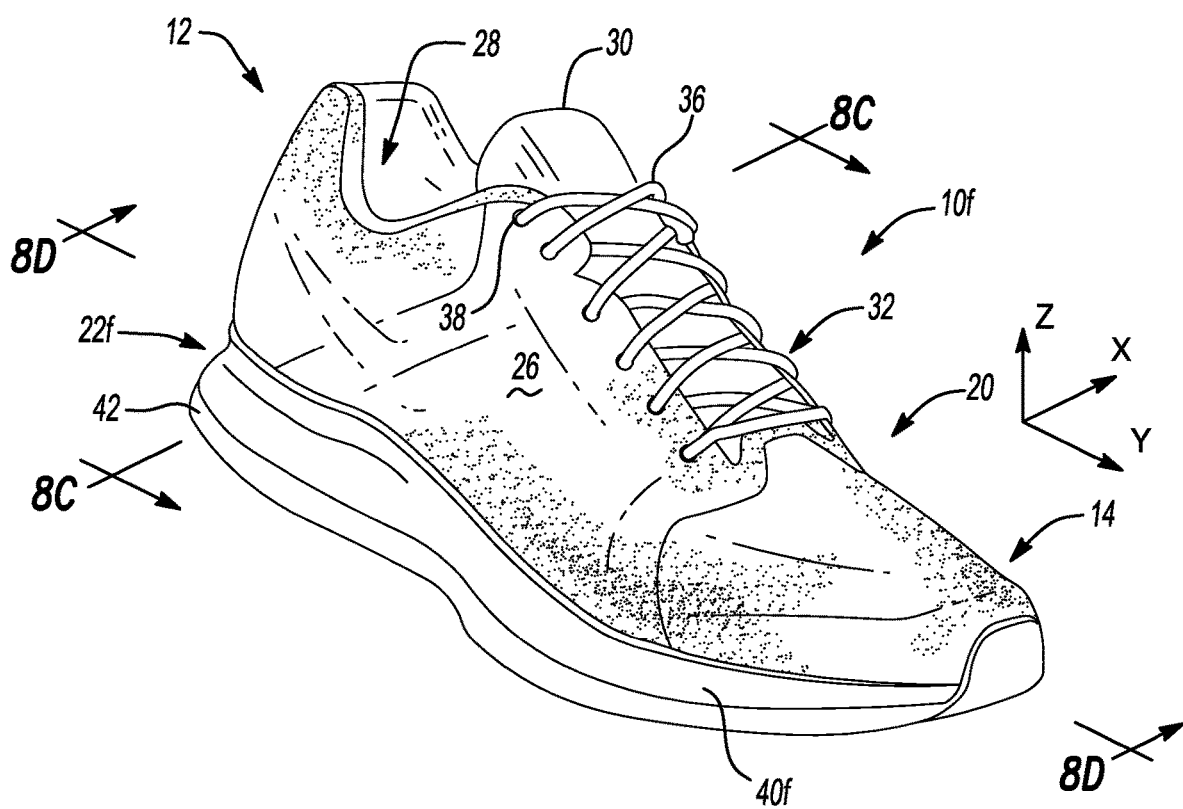
FIG. 8A is a top perspective view of an article of footwear in accordance with principles of the present disclosure.
Figure 8B:
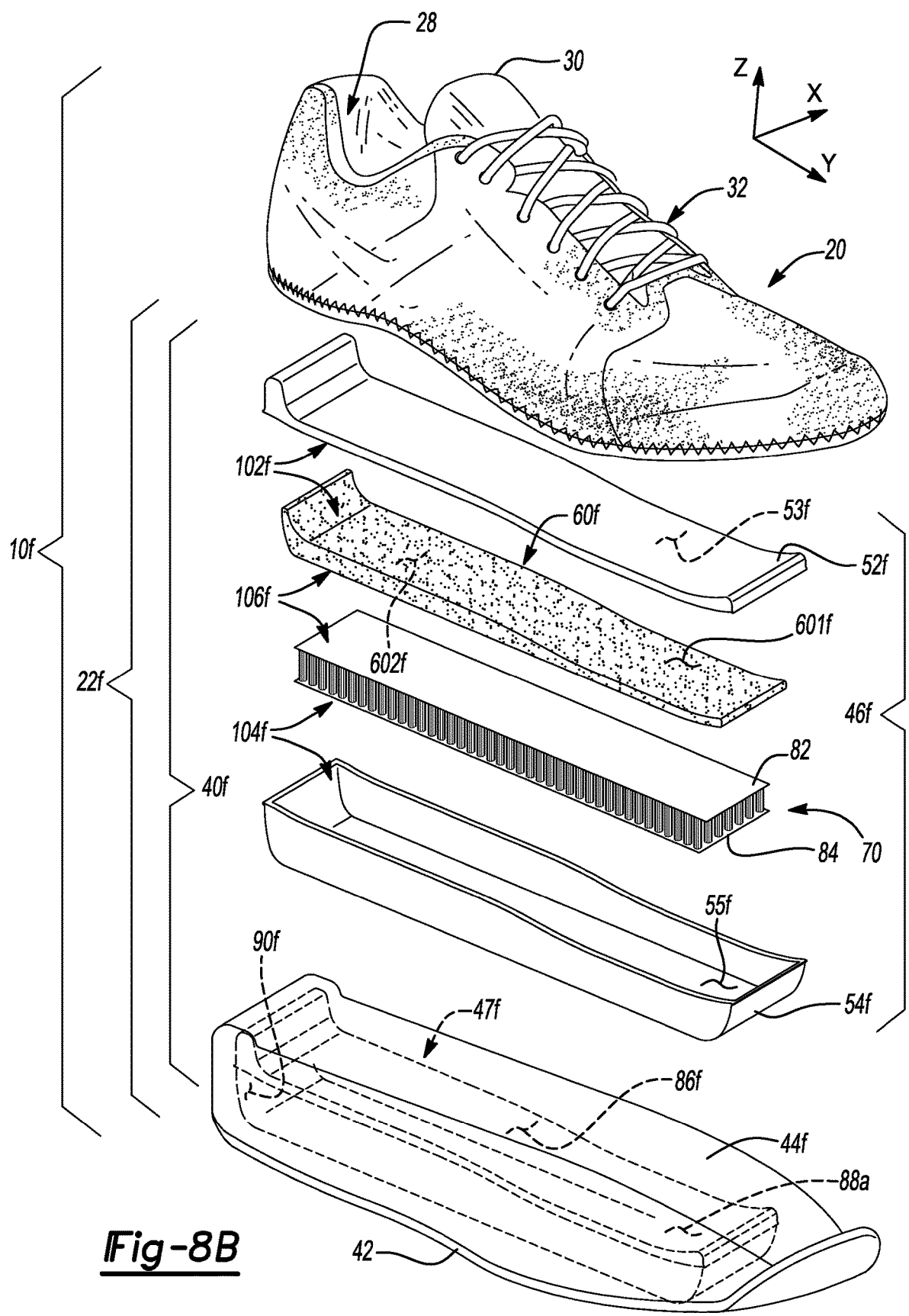
FIG. 8B is an exploded view of the article of footwear of FIG. 8A.
Figure 8C:
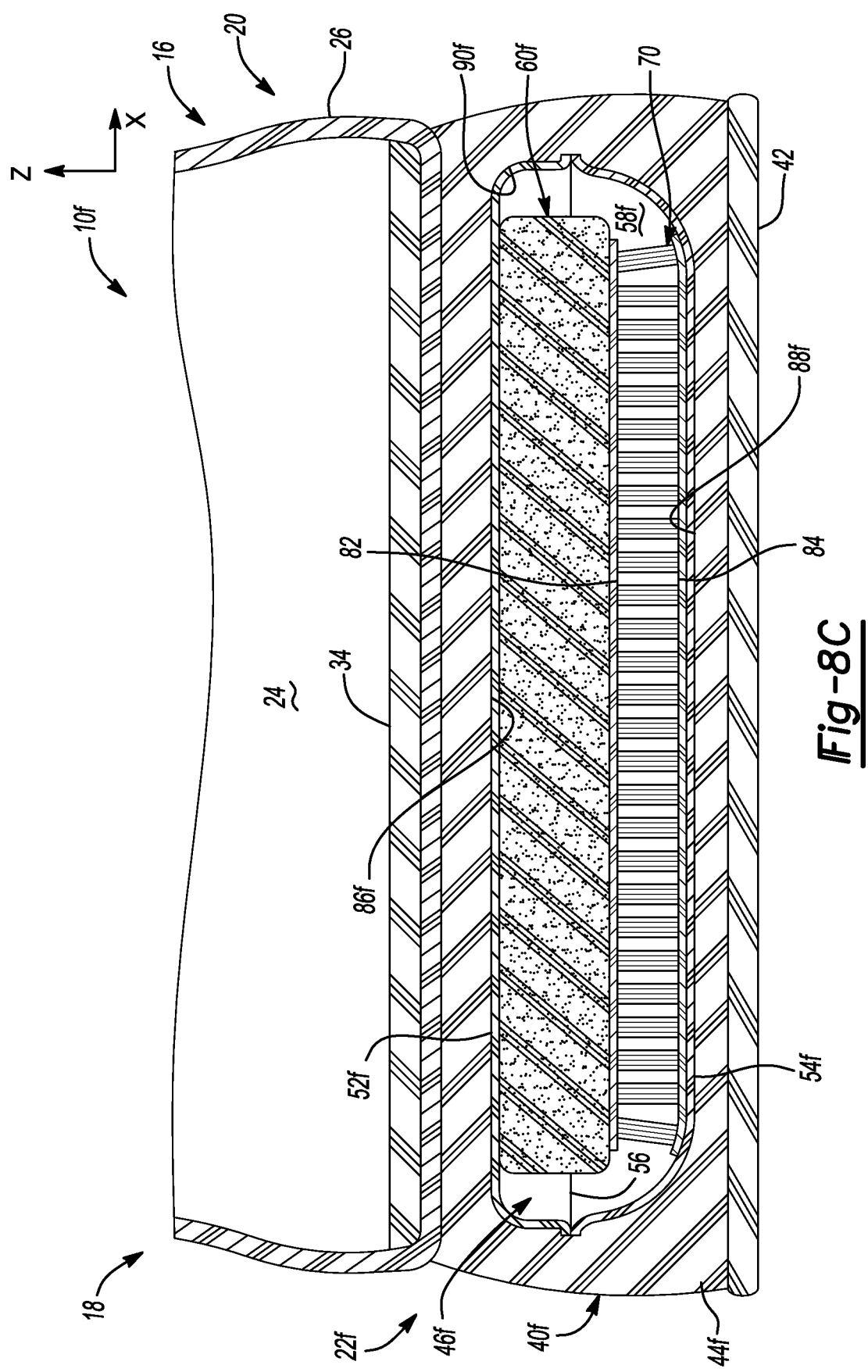
FIG. 8C is a partial cross-sectional view of the article of footwear of FIG. 8A taken along the line 8C-8C of FIG. 8A.
Figure 8D:
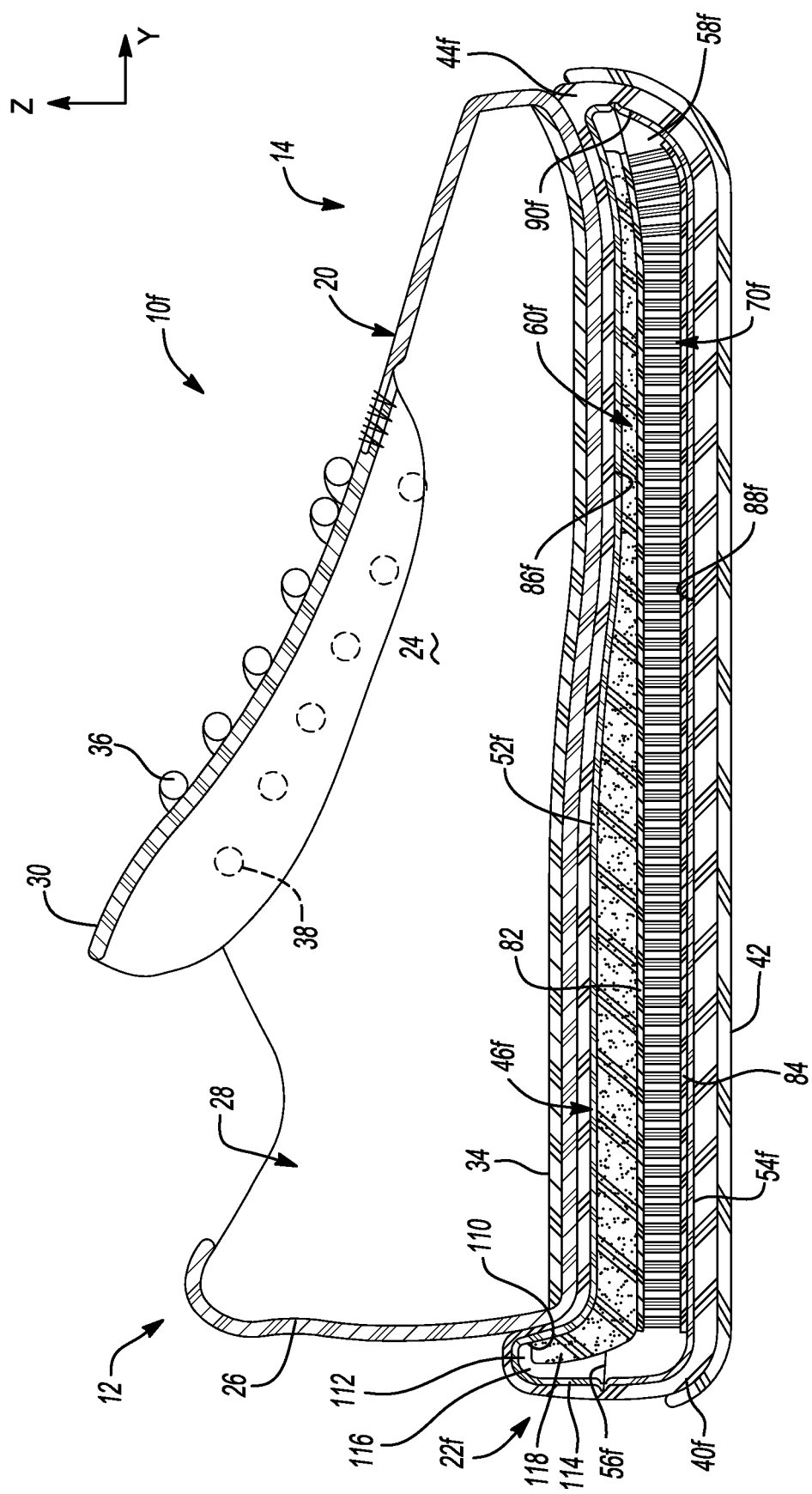
FIG. 8D is a cross-sectional view of the article of footwear of FIG. 8A taken along the line 8D-8D of FIG. 8A.

The article of footwear 10f may include the upper 20 and a sole structure 22f. The sole structure 22f may include a midsole 40f and the outsole 42. The midsole 40f may include a fluid-filled chamber 46f residing within a body 44f. As illustrated in FIG. 7B, the body 44g may include a cavity 47f defined at least in part by a first (e.g., upper) chamber contact surface 86f, a second (e.g., lower) chamber contact surface 88f, and a third (e.g., peripheral) chamber contact surface 90f. The first chamber contact surface 86f may be substantially planar and include a transversely extending portion 110 (FIG. 8D) proximate the heel end 12 of the article of footwear 10f. In some configurations, the first chamber contact surface 86f may extend toward the second chamber contact surface 88f from the heel end 12 to the forefoot end 14 along the Y-axis. For example, in some configurations the first chamber contact surface 86f may be inclined toward the second chamber contact surface 88f. In other configurations, the first chamber contact surface 86f may include a concave shape extending toward the second chamber contact surface 88f. As illustrated in FIG. 8D, the transversely extending portion 110 may extend away from the second chamber contact surface 88f in a direction generally parallel to the Z-axis. The second chamber contact surface 88f may be substantially planar. The third chamber contact surface 90f may extend from and between the first and second chamber contact surfaces 86f, 88f. In this regard, the third chamber contact surface 90f may extend away from the second chamber contact surface 88f by a greater distance at the heel end 12 than at the forefoot end 14. Accordingly, the third chamber contact surface 90f and the transversely extending portion 110 of the first chamber contact surface 86f may define a transversely extending portion 112 of the cavity 47f.

The fluid-filled chamber 46f may be located within the article of footwear 10f in any of the positions and orientations shown in FIGS. 2A-2D, and may include a first barrier layer 52f, a second barrier layer 54f, a foam structure 60f, and the tensile member 70. A second surface 53f of the first barrier layer 52f may include a size and shape that corresponds to, and matches, the size and shape of the first and third chamber contact surfaces 86f, 90f of the body 44f. In this regard, as illustrated in FIG. 8D, the first barrier layer 52f may include a U-shaped portion 114 that is disposed within the transversely extending portion 112 of the cavity 47f in the assembled configuration, such that the interior void 58f includes a transversely extending portion 116.

The foam structure 60f may be disposed within the interior void 58f of the fluid-filled chamber 46f. As illustrated in FIGS. 8B and 8C, in some configurations, the foam structure 60ƒ is disposed adjacent to the first barrier layer 52ƒ such that a second surface 601ƒ of the foam structure 60ƒ engages the second surface 53ƒ of the first barrier layer 52ƒ at a fourth attachment 102ƒ. The second surface 601ƒ of the foam structure 60ƒ may include a size and shape that corresponds to, and matches, the size and shape of the second surface 53ƒ of the first barrier layer 52ƒ. In this regard, as illustrated in FIGS. 8B and 8D, the second surface 601ƒ may extend upwardly along the Z-axis to define in part a flange portion 118 of the foam structure 60ƒ. In the assembled configuration, the flange portion 118 may be disposed within the transversely extending portion 116 of the interior void 58ƒ. The tensile member 70 may be disposed between the foam structure 60ƒ and the second barrier layer 54ƒ relative to the Z-axis such that (i) the second substrate 84 engages the first surface 55ƒ of the second barrier layer 54ƒ at a fifth attachment 104ƒ and (ii) the first substrate 82 engages the first surface 602ƒ of the foam structure 60ƒ at a sixth attachment 106ƒ.

With reference to FIGS. 9A-9E, another article of footwear 10g is shown. Except as otherwise provided herein, the structure and function of the article of footwear 10g may be substantially similar to the structure and function of the article of footwear 10. In view of the substantial similarity in structure and function of the components associated with the article of footwear 10g with respect to the article of footwear 10, like reference numerals are used hereinafter and in the drawings to identify like components, while like reference numerals containing letter extensions are used to identify those components that have been modified.

The article of footwear 10g may include the upper 20 and a sole structure 22g. The sole structure 22g may include a midsole 40g and the outsole 42. The midsole 40g may include a fluid-filled chamber 46g residing within the body 44.

Figure 9A:
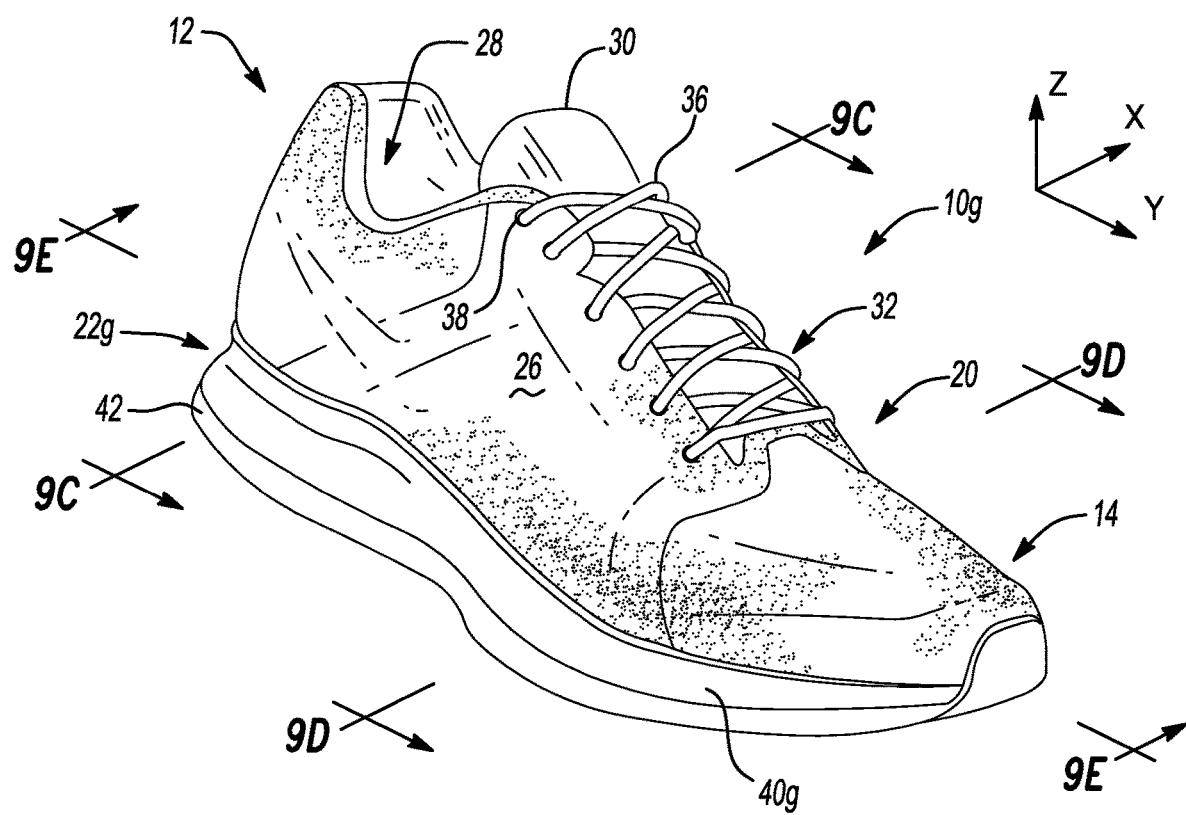
FIG. 9A is a top perspective view of an article of footwear in accordance with principles of the present disclosure.
Figure 9B:
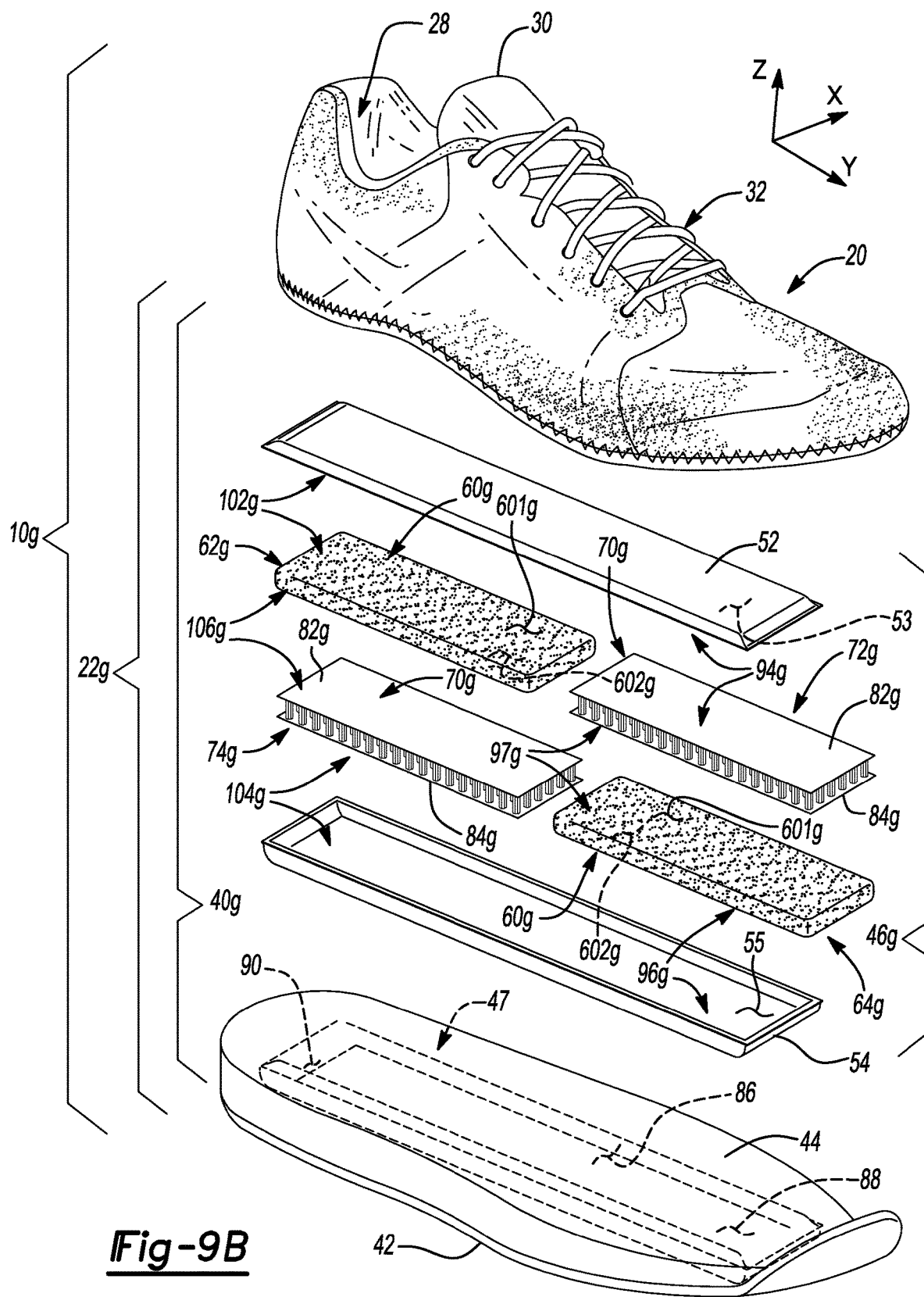
FIG. 9B is an exploded view of the article of footwear of FIG. 9A.
Figure 9C:
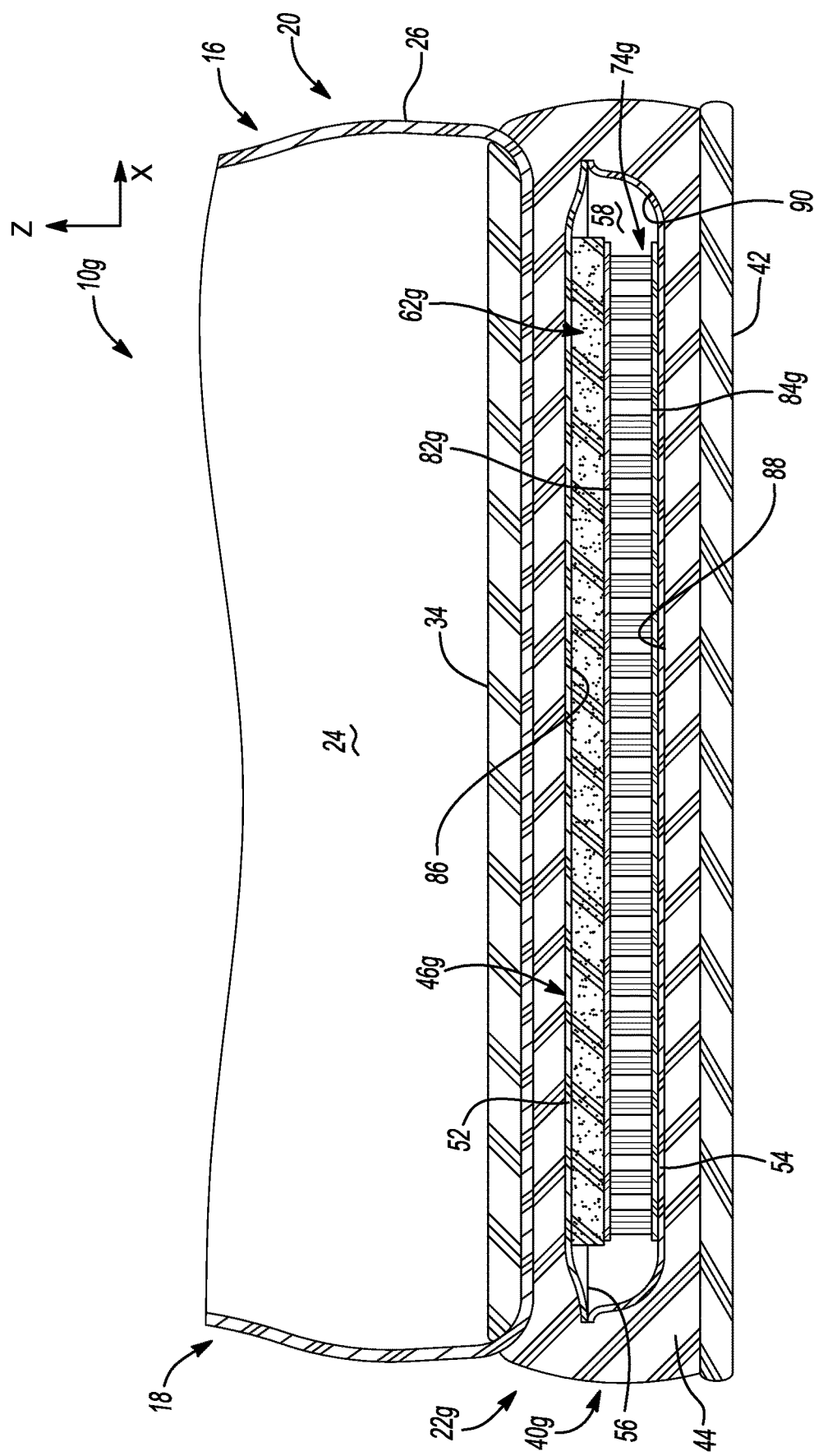
FIG. 9C is a partial cross-sectional view of the article of footwear of FIG. 9A taken along the line 9C-9C of FIG. 9A.
Figure 9D:
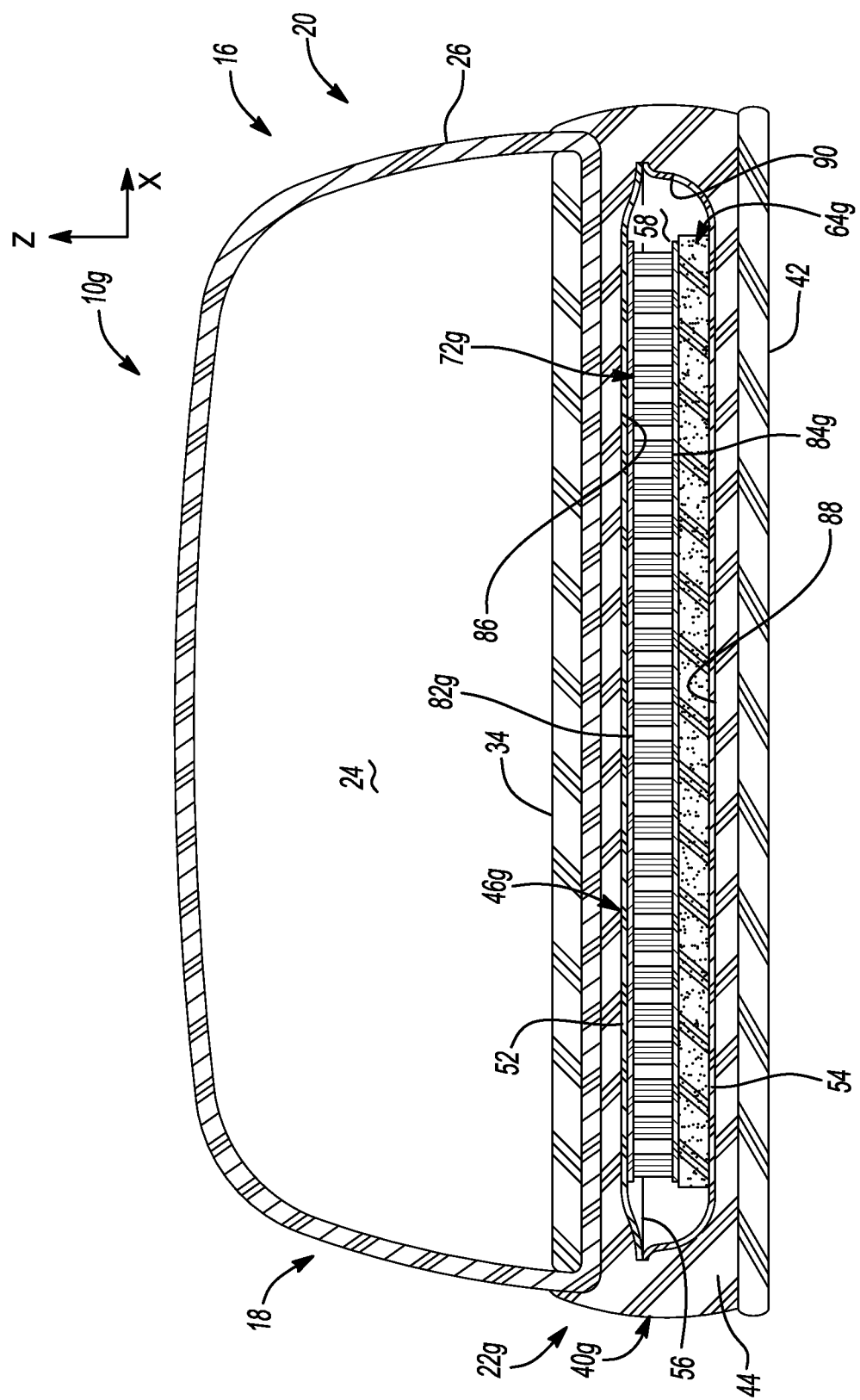
FIG. 9D is a cross-sectional view of the article of footwear of FIG. 9A taken along the line 9D-9D of FIG. 9A.
Figure 9E:
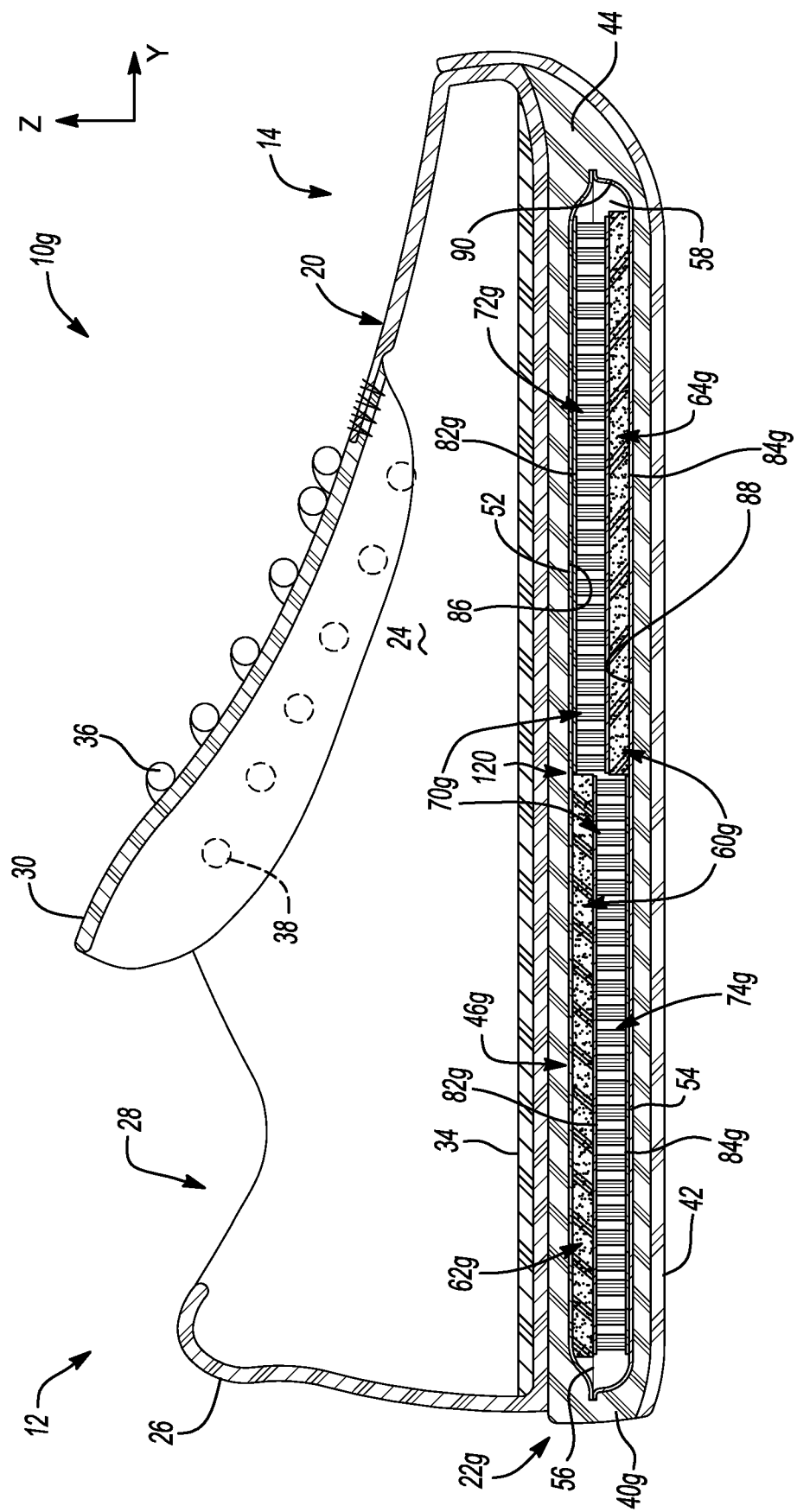
FIG. 9E is a cross-sectional view of the article of footwear of FIG. 9A taken along the line 9E-9E of FIG. 9A.

The fluid-filled chamber 46g may be located within the article of footwear 10g in any of the positions and orientations shown in FIGS. 2A-2D, and may include the first barrier layer 52, the second barrier layer 54, one or more foam structures 60g, and one or more tensile members 70g. The first and second foam structures 62g, 64g of the foam structures 60g may be disposed within the interior void 58g of the fluid-filled chamber 46g. As illustrated in FIG. 9E, the first foam structure 62g may be disposed adjacent to the first barrier layer 52 such that a second surface 601g of the first foam structure 62g engages the second surface 53 of the first barrier layer 52 at a fourth attachment 102g. The second foam structure 64g may be disposed adjacent to the second barrier layer 54 such that a first surface 602g of the second foam structure 62g engages the first surface 55 of the second barrier layer 54 at a first attachment 96g.

The first and second tensile members 72g, 74g of the tensile members 70g may be disposed within the interior void 58g of the fluid-filled chamber 46g. The first tensile member 72g may be disposed between the second foam structure 64g and the first barrier layer 52 relative to the Z-axis such that (i) the first substrate 82g engages the second surface 53 of the first barrier layer 52 at a second attachment 94g and (ii) the second substrate 84g engages the second surface 601g of the second foam structure 64g at a third attachment 97g. The second tensile member 74g may be disposed between the first foam structure 62g and the first barrier layer 52 relative to the Z-axis such that (i) the second substrate 84 engages the first surface 55 of the second barrier layer 54 at a fifth attachment 104g and (ii) the first substrate 82g engages the first surface 602g of the first foam structure 62g at a sixth attachment 106g.

As illustrated in FIG. 9E, the first foam structure 62g and the second tensile member 74g may extend from the heel end 12 to an intermediate location 120 disposed between the heel and forefoot ends 12, 14, along the Y-axis. The second foam structure 64g and the first tensile member 72g may extend from the forefoot end 14 to the intermediate location 120 along the Y-axis. Accordingly, as illustrated, the first foam structure 62g may abut and/or oppose the first tensile member 72g at the intermediate location 120, and the second foam structure 64g may abut and/or oppose the second tensile member 74g at the intermediate location 120. If the first foam structure 62g abuts the first tensile member 72g, these elements 62g, 72g may be attached to one another. Similarly, if the second foam structure 64g abuts the second tensile member 74g, these elements 64g, 74g may be attached to one another.

In some configurations, the intermediate location 120 may be centrally located within the fluid-filled chamber 46g along the Y-axis, such that the lengths of the first and second foam structures 62g, 64g and the first and second tensile members 72g, 74g along the Y-axis are substantially equal to one another. In other configurations, the intermediate location 120 may be offset from the center of the fluid-filled chamber 46g along the Y-axis such that the lengths of one or more of the first and second foam structures 62g, 64g and the first and second tensile members 72g, 74g along the Y-axis is different than one or more of the others of the first and second foam structures 62g, 64g and the first and second tensile members 72g, 74g.

With reference to FIGS. 10A-10E, another article of footwear 10h is shown. Except as otherwise provided herein, the structure and function of the article of footwear 10h may be substantially similar to the structure and function of the article of footwear 10. In view of the substantial similarity in structure and function of the components associated with the article of footwear 10h with respect to the article of footwear 10, like reference numerals are used hereinafter and in the drawings to identify like components, while like reference numerals containing letter extensions are used to identify those components that have been modified.

The article of footwear 10h may include the upper 20 and a sole structure 22h. The sole structure 22h may include a midsole 40h and the outsole 42. The midsole 40h may include a fluid-filled chamber 46h residing within the body 44.

Figure 10A:
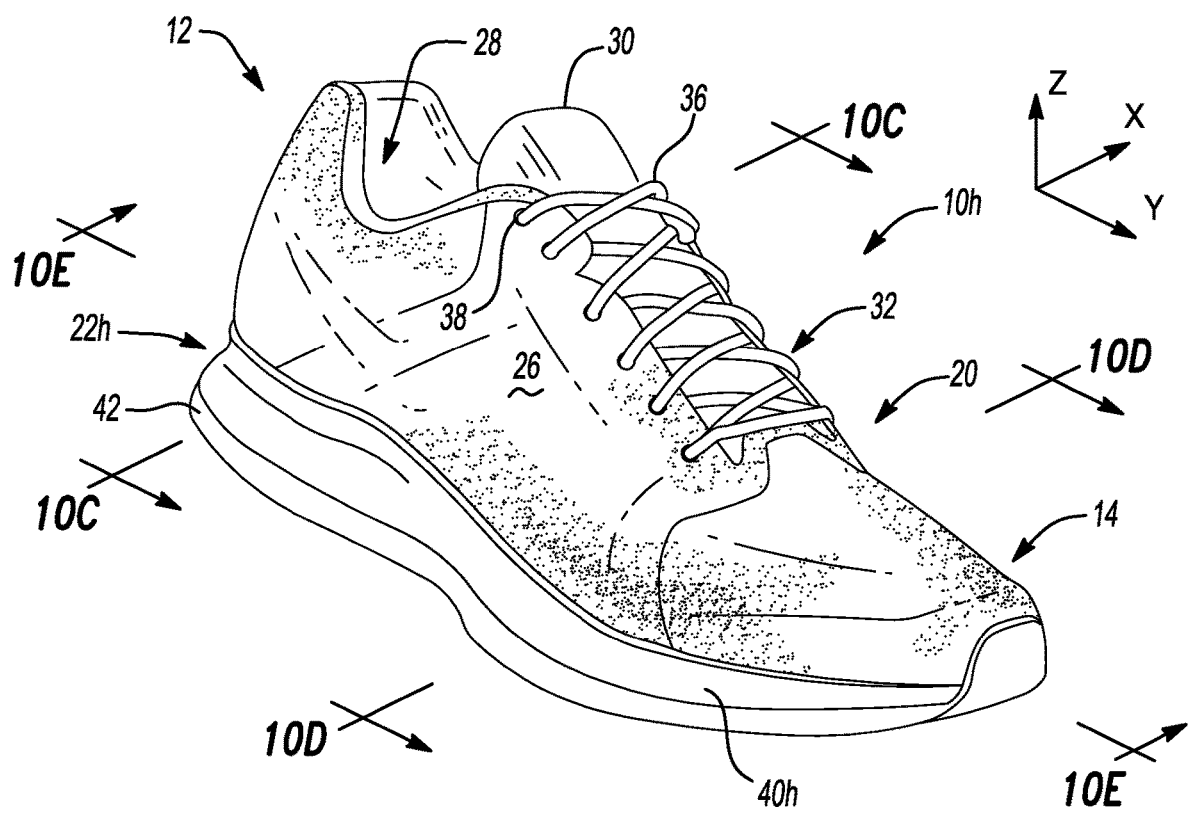
FIG. 10A is a top perspective view of an article of footwear in accordance with principles of the present disclosure.
Figure 10B:
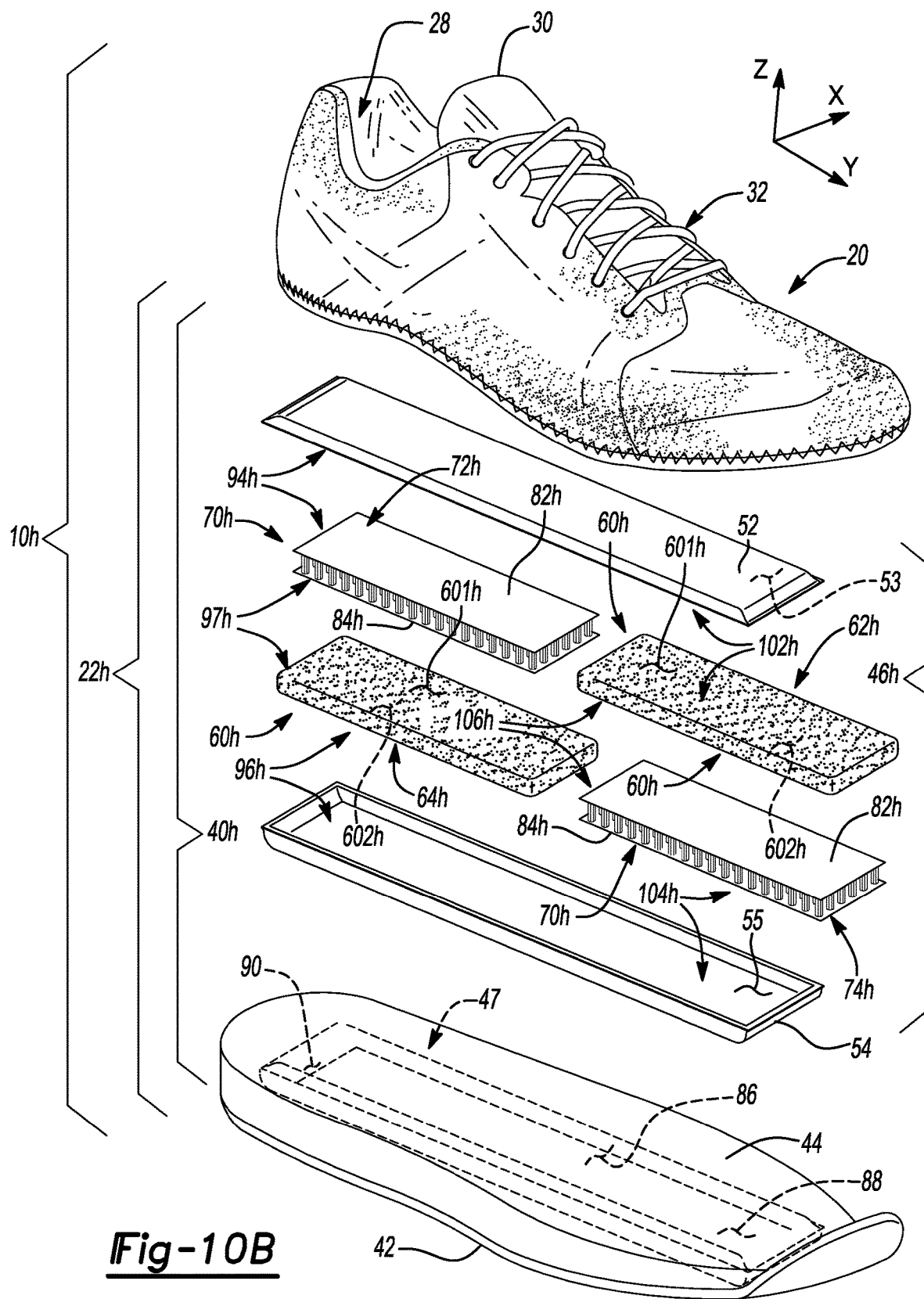
FIG. 10B is an exploded view of the article of footwear of FIG. 10A.
Figure 10C:
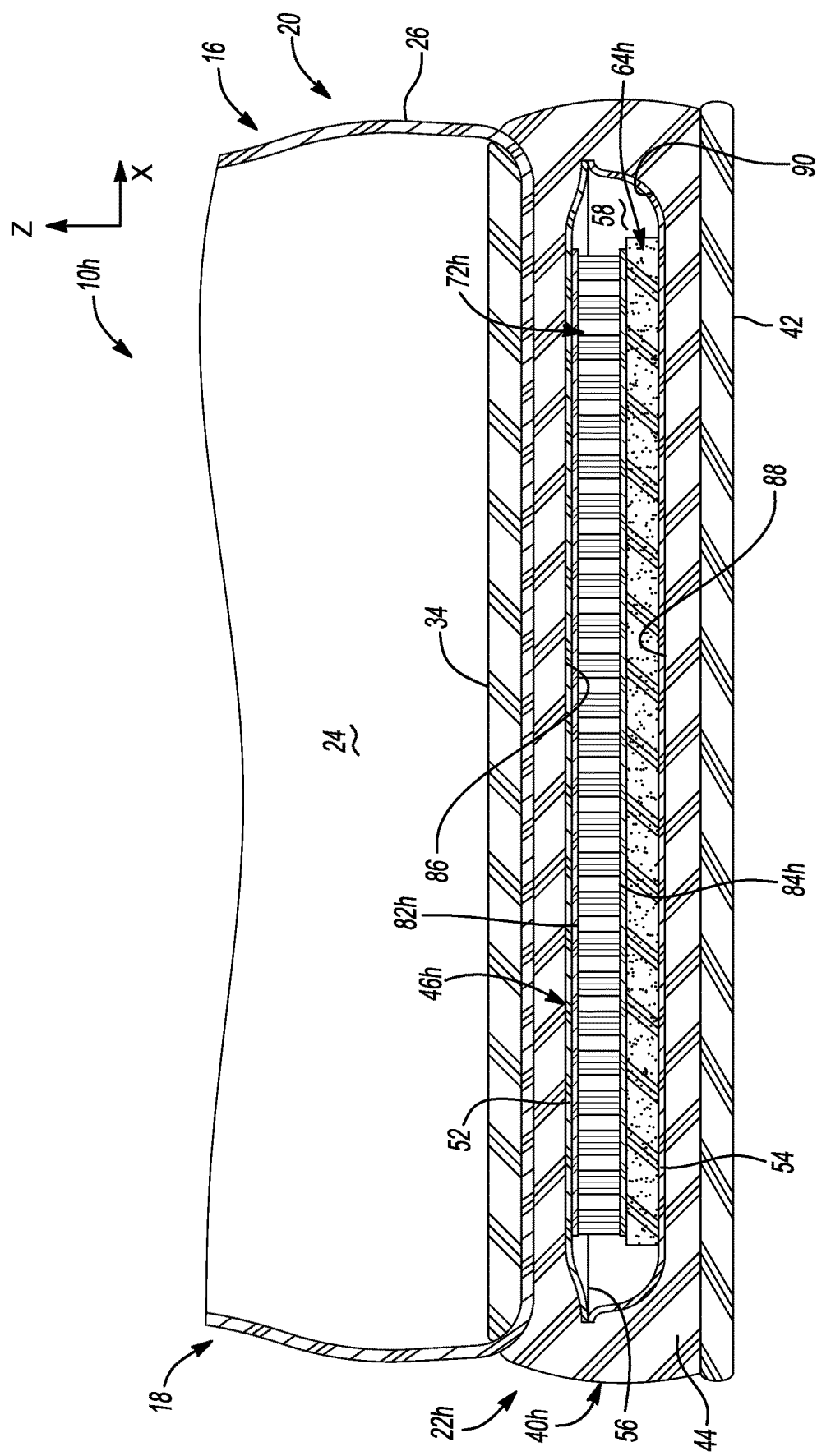
FIG. 10C is a partial cross-sectional view of the article of footwear of FIG. 10A taken along the line 10C-10C of FIG. 10A.
Figure 10E:
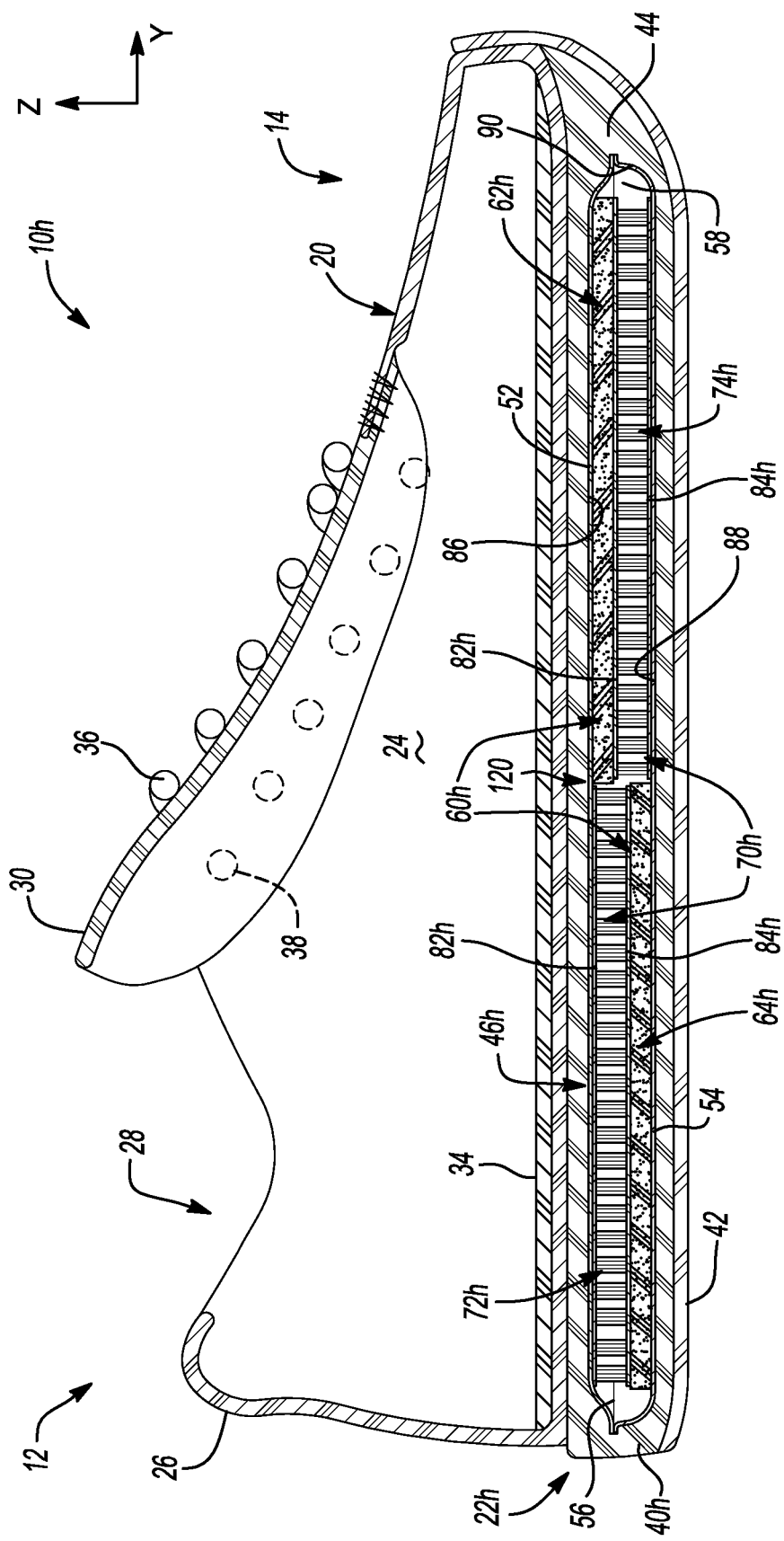
FIG. 10E is a cross-sectional view of the article of footwear of FIG. 10A taken along the line 10E-10E of FIG. 10A.

The fluid-filled chamber 46h may be located within the article of footwear 10h in any of the positions and orientations shown in FIGS. 2A-2D, and may include the first barrier layer 52, the second barrier layer 54, one or more foam structures 60h, and one or more tensile members 70h. First and second foam structures 62h, 64h of the foam structures 60h may be disposed within the interior void 58h of the fluid-filled chamber 46h. As illustrated in FIG. 10E, the first foam structure 62h may be disposed adjacent to the first barrier layer 52 such that a second surface 601h of the first foam structure 62h engages the second surface 53 of the first barrier layer 52 at a fourth attachment 102h. The second foam structure 64h may be disposed adjacent to the second barrier layer 54 such that a first surface 602h of the second foam structure 62h engages the first surface 55 of the second barrier layer 54 at a first attachment 96h.

First and second tensile members 72h, 74h of the tensile members 70h may be disposed within the interior void 58h of the fluid-filled chamber 46h. The first tensile member 72h may be disposed between the second foam structure 64h and the first barrier layer 52 relative to the Z-axis such that (i) the first substrate 82h engages the second surface 53 of the first barrier layer 52 at a second attachment 94h and (ii) the second substrate 84h engages the second surface 601h of the second foam structure 64h at a third attachment 97h. The second tensile member 74h may be disposed between the first foam structure 62h and the first barrier layer 52 relative to the Z-axis such that (i) the second substrate 84 engages the first surface 55 of the second barrier layer 54 at a fifth attachment 104h and (ii) the first substrate 82h engages the first surface 602h of the first foam structure 62h at a sixth attachment 106h.

As illustrated in FIG. 10E, the first foam structure 62h and the second tensile member 74h may extend from the forefoot end 14 to the intermediate location 120 along the Y-axis. The second foam structure 64h and the first tensile member 72h may extend from the heel end 12 to the intermediate location 120 along the Y-axis. Accordingly, as illustrated, the first foam structure 62h may abut and/or oppose the first tensile member 72h at the intermediate location 120, and the second foam structure 64h may abut and/or oppose the second tensile member 74h at the intermediate location 120. If the first foam structure 62h abuts the first tensile member 72h, these elements 62h, 72h may be attached to one another. Similarly, if the second foam structure 64h abuts the second tensile member 74h, these elements 64h, 74h may be attached to one another.

With reference to FIGS. 11A-11F, another article of footwear 10i is shown. Except as otherwise provided herein, the structure and function of the article of footwear 10i may be substantially similar to the structure and function of the article of footwear 10. In view of the substantial similarity in structure and function of the components associated with the article of footwear 10i with respect to the article of footwear 10, like reference numerals are used hereinafter and in the drawings to identify like components, while like reference numerals containing letter extensions are used to identify those components that have been modified.

The article of footwear 10i may include the upper 20 and a sole structure 22i. The sole structure 22i may include a midsole 40i and the outsole 42. The midsole 40i may include a fluid-filled chamber 46i residing within the body 44.

Figure 11A:
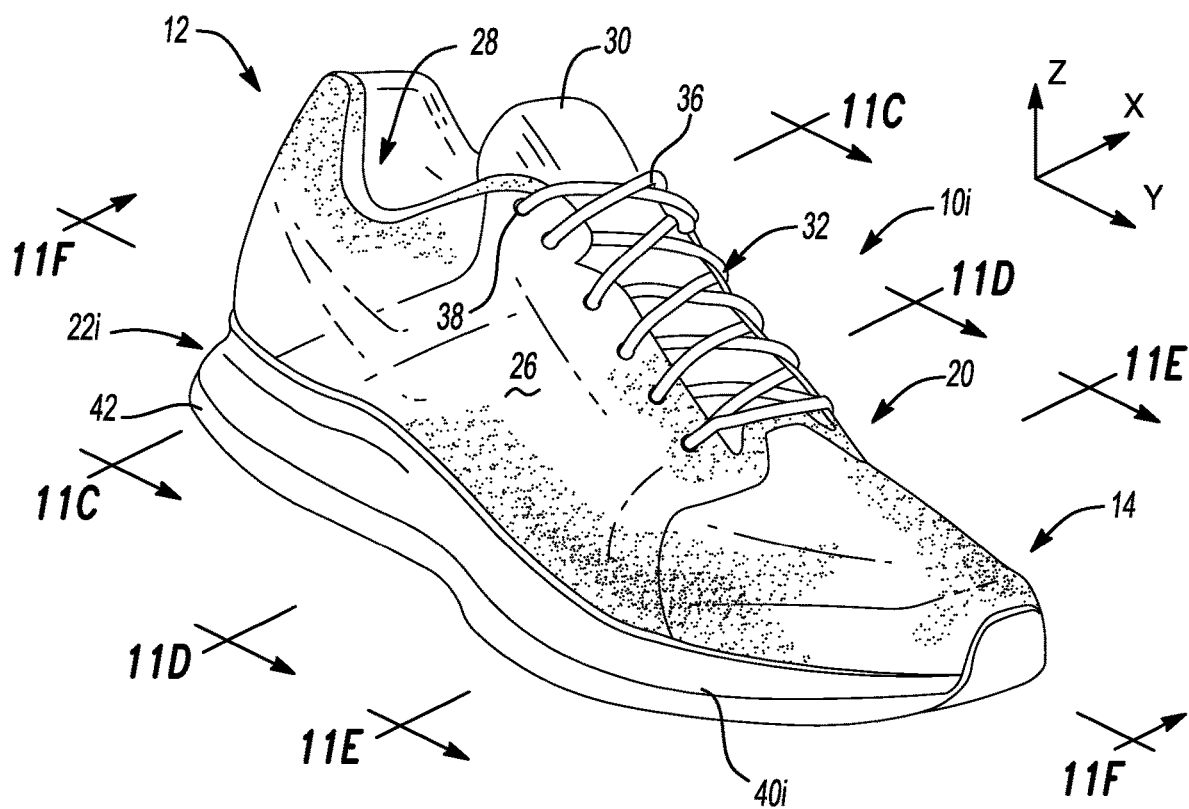
FIG. 11A is a top perspective view of an article of footwear in accordance with principles of the present disclosure.
Figure 11B:
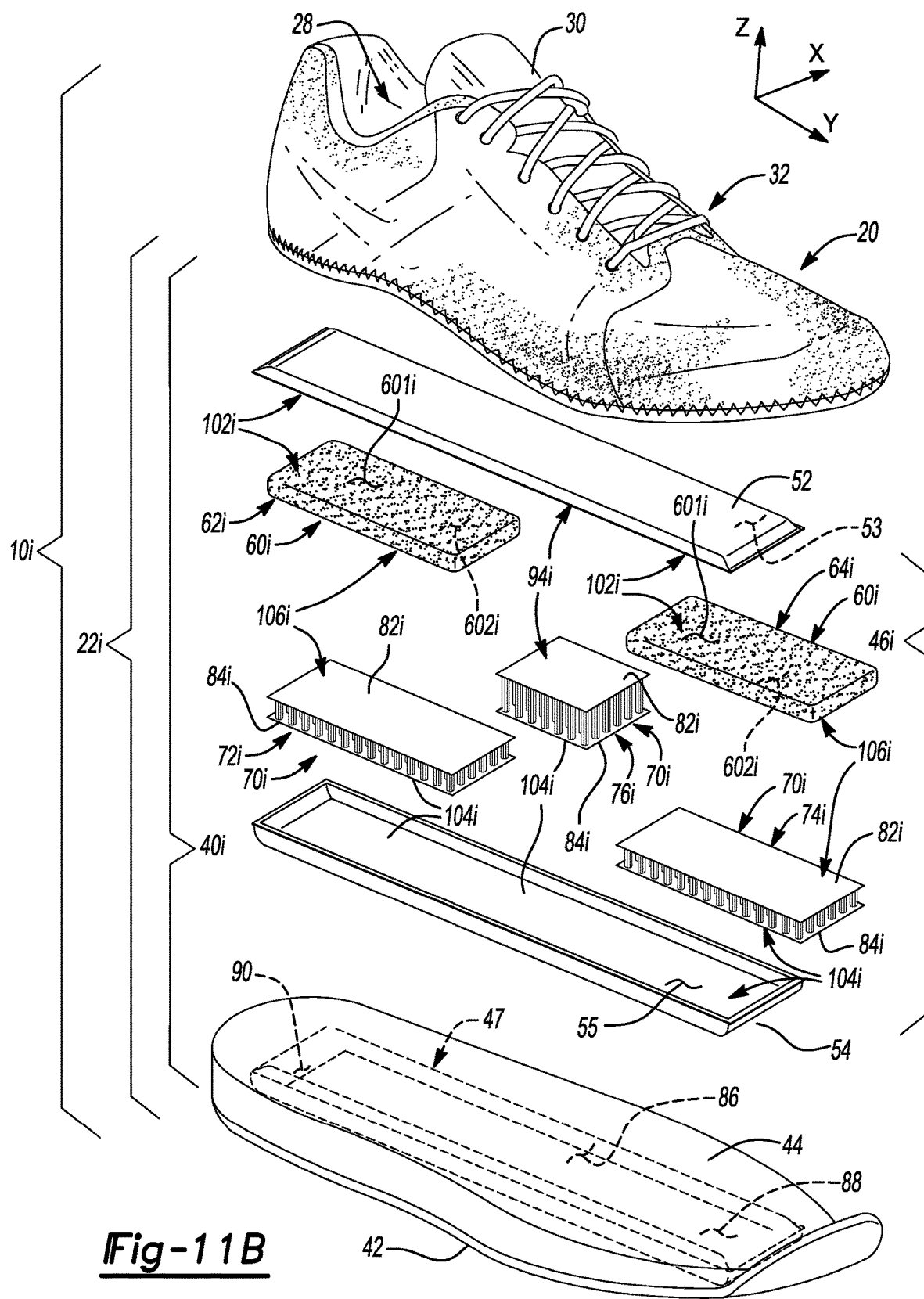
FIG. 11B is an exploded view of the article of footwear of FIG. 11A.
Figure 11D:
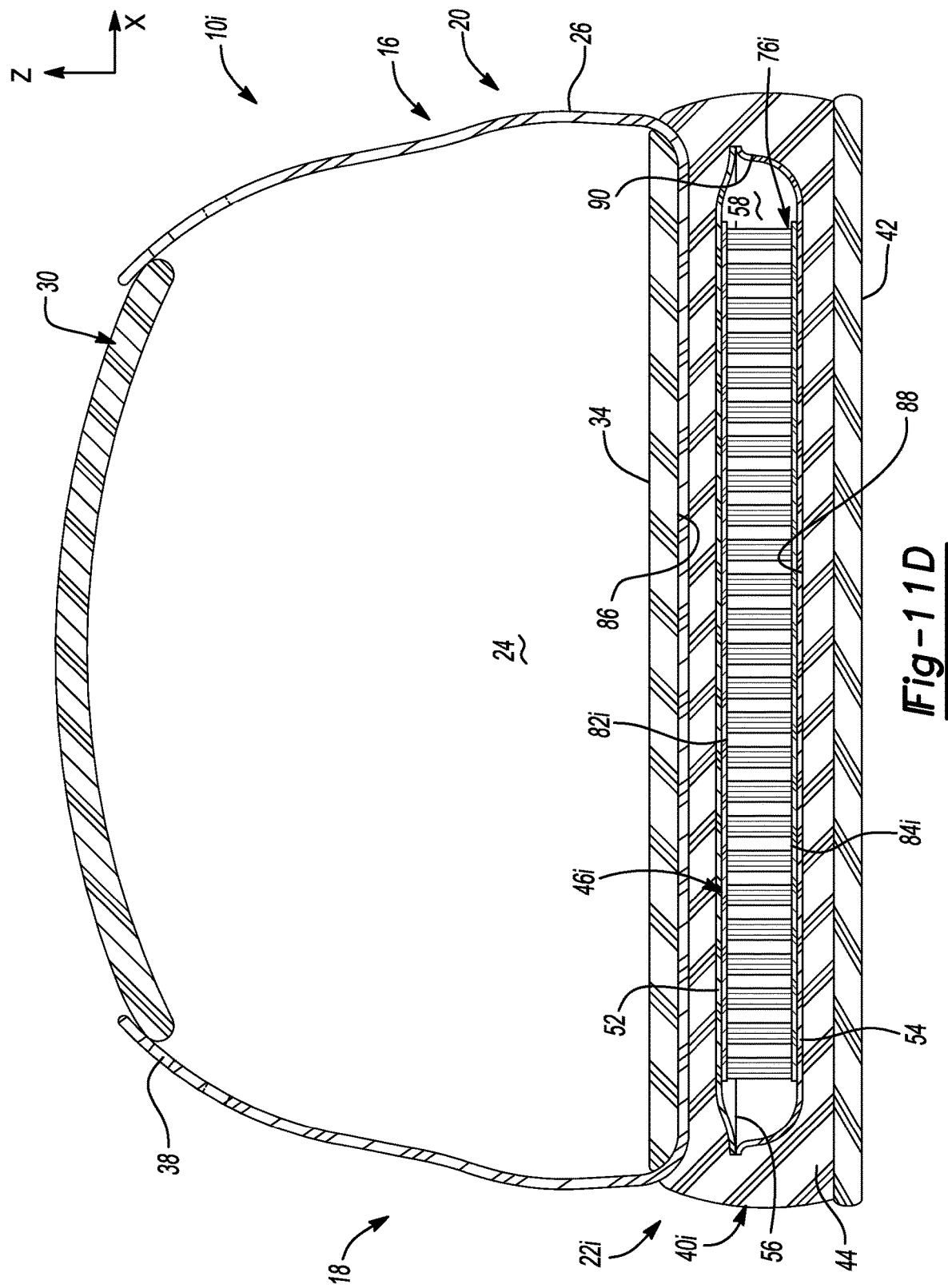
FIG. 11D is a cross-sectional view of the article of footwear of FIG. 11A taken along the line 11D-11D of FIG. 11A.
Figure 11E:
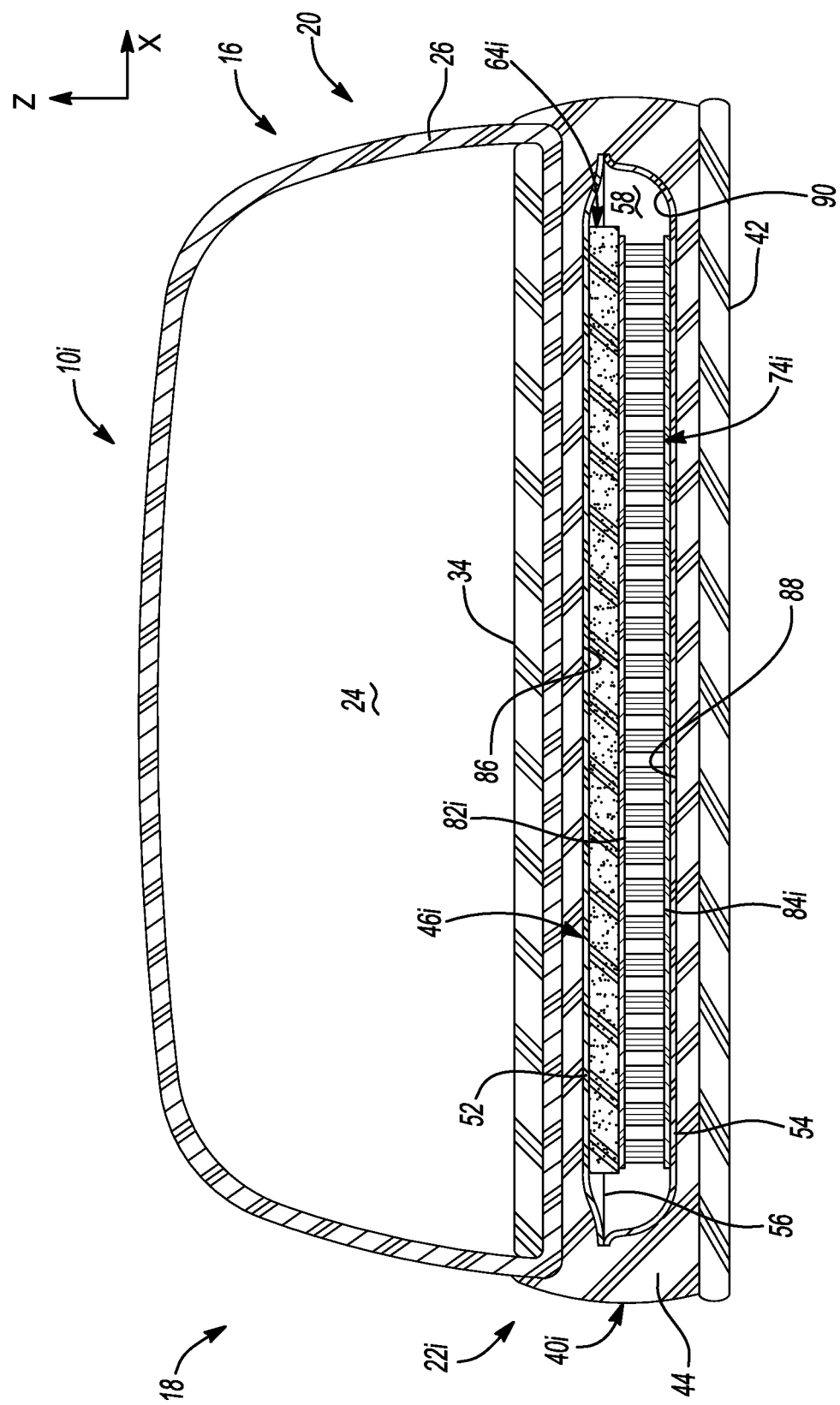
FIG. 11E is a cross-sectional view of the article of footwear of FIG. 11A taken along the line 11E-11E of FIG. 11A.
Figure 11F:
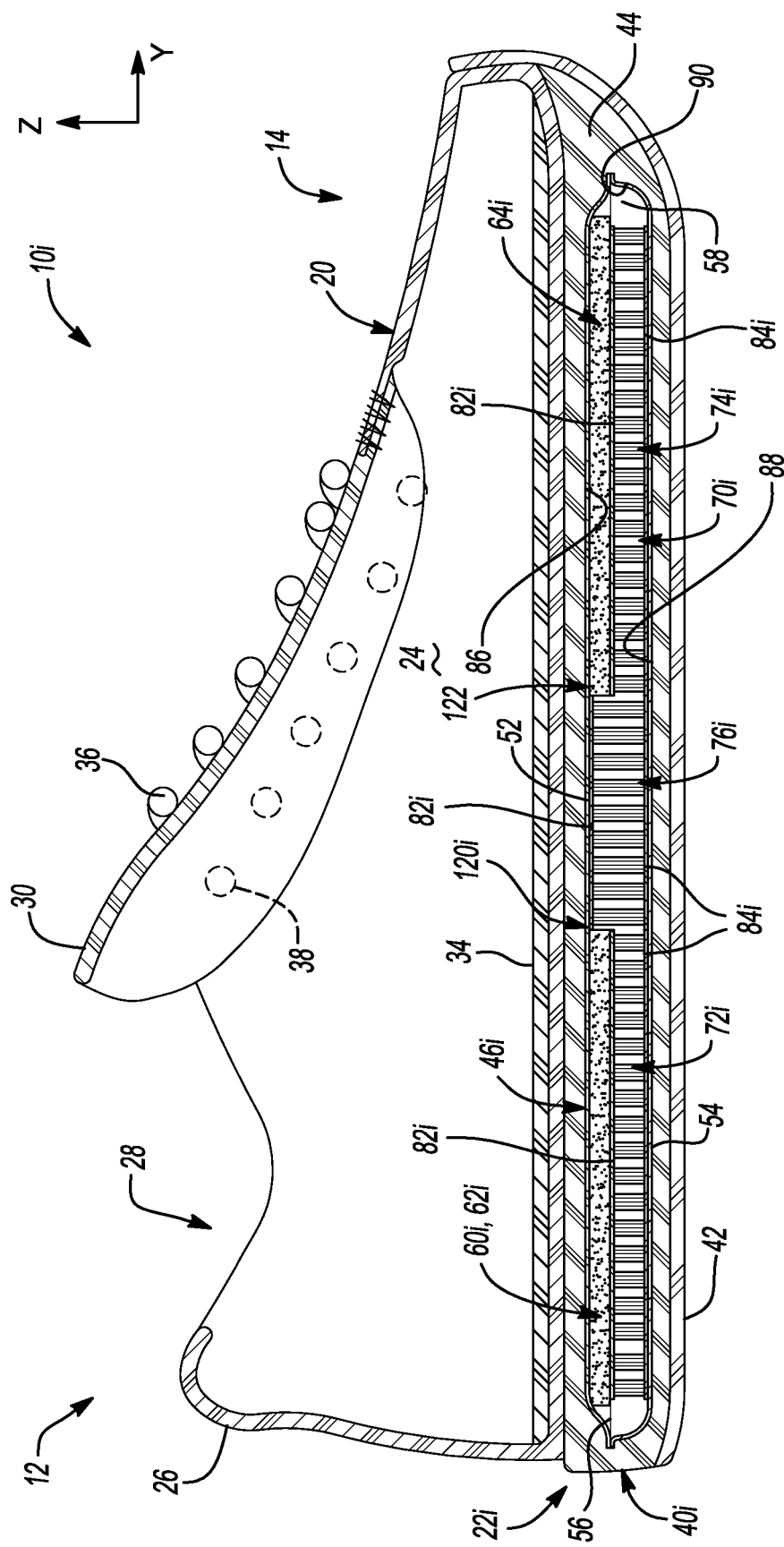
FIG. 11F is a cross-sectional view of the article of footwear of FIG. 11A taken along the line 11F-11F of FIG. 11A.

The fluid-filled chamber 46i may be located within the article of footwear 10i in any of the positions and orientations shown in FIGS. 2A-2D, and may include the first barrier layer 52, the second barrier layer 54, one or more foam structures 60i, and one or more tensile members 70i. First and second foam structures 62i, 64i of the foam structures 60i may be disposed within the interior void 58i of the fluid-filled chamber 46i. As illustrated in FIG. 11F, the first and second foam structures 62i, 64i may be disposed adjacent to the first barrier layer 52 such that a second surface 601i of each of the first and second foam structures 62i, 64i engages the second surface 53 of the first barrier layer 52 at a fourth attachment 102i.

First, second, and third tensile members 72i, 74i, 76i of the tensile members 70i may be disposed within the interior void 58i of the fluid-filled chamber 46i. The first and second tensile members 72i, 74i may be disposed between the first barrier layer 52 and the first and second foam structures 62i, 64i, respectively, relative to the Z-axis such that (i) the second substrate 84 of each of the first and second tensile members 72i, 74i engages the first surface 55 of the second barrier layer 54 at a fifth attachment 104i and (ii) the first substrate 82i of each of the first and second tensile members 72i, 74i engages the first surface 602i of the first foam structure 62i at a sixth attachment 106i. The third tensile member 76i may be disposed between the first and second foam structures 62i, 64i and between the first and second tensile members 72i, 74i along the Y-axis. The first substrate 82i of the third tensile member 76i may engage the second surface 53 of the first barrier layer 52, and the second substrate 84i of the third tensile member 76i may engage the first surface 55 of the second barrier layer 52. In this regard, a height of the third tensile member 76i along the Z-axis may be substantially equal to (i) a combined height of the first foam structure 62i and the first tensile member 72i, and (ii) a combined height of the second foam structure 64i and the second tensile member 74i.

As illustrated in FIG. 11F, the first foam structure 62i and the first tensile member 72i may extend from the heel end 12 to a first intermediate location 120i disposed between the heel and forefoot ends 12, 14, along the Y-axis. The second foam structure 64i and the second tensile member 74i may extend from the forefoot end 14 to a second intermediate location 122 along the Y-axis. The third tensile member 76i may extend from the first intermediate location 120 to the second intermediate location 122. Accordingly, as illustrated, the first foam structure 62i and the first tensile member 72i may abut and/or oppose a proximal end of the third tensile member 76i at the first intermediate location 120, and the second foam structure 64i and the second tensile member 74i may abut and/or oppose the third tensile member 76i at the second intermediate location 122. The first foam structure 62i and the first tensile member 72i may be attached to the third tensile member 76i at the first intermediate location 120, and the second foam structure 64i and the second tensile member 74i may be attached to the third tensile member 76i at the second intermediate location 122.

In some configurations, the first and/or second intermediate locations 120, 122 may be offset from a central portion of the fluid-filled chamber 46i along the Y-axis, such that the third tensile member 76i is disposed at the central portion of the fluid-filled chamber 46i along the Y-axis. In other configurations, one or more of the first and second intermediate locations 120, 122 may alternatively be positioned relative to the central portion of the fluid-filled chamber 46i such that the third tensile member 76i is offset from the central portion of the fluid-filled chamber 46i relative to the Y-axis.

With reference to FIGS. 12A-12D, another article of footwear 10j is shown. Except as otherwise provided herein, the structure and function of the article of footwear 10j may be substantially similar to the structure and function of the article of footwear 10. In view of the substantial similarity in structure and function of the components associated with the article of footwear 10j with respect to the article of footwear 10, like reference numerals are used hereinafter and in the drawings to identify like components, while like reference numerals containing letter extensions are used to identify those components that have been modified.

Figure 12A:
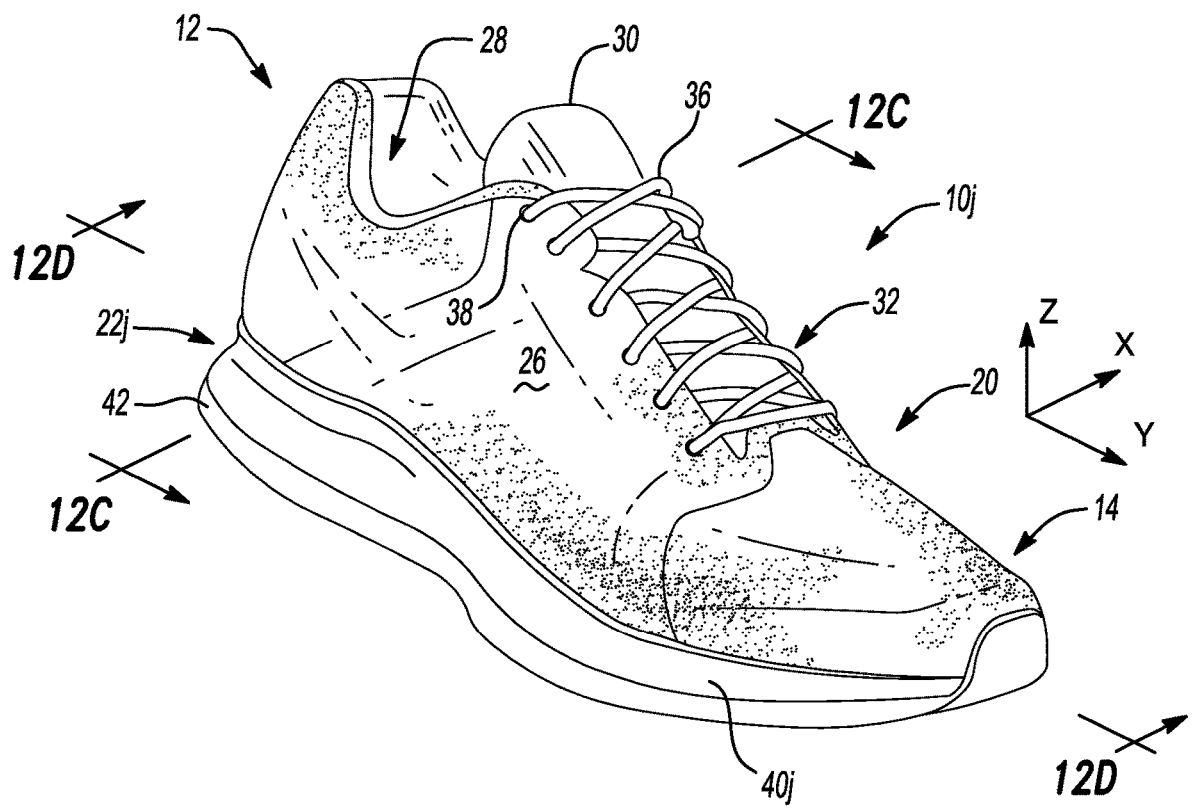
FIG. 12A is a top perspective view of an article of footwear in accordance with principles of the present disclosure.
Figure 12B:
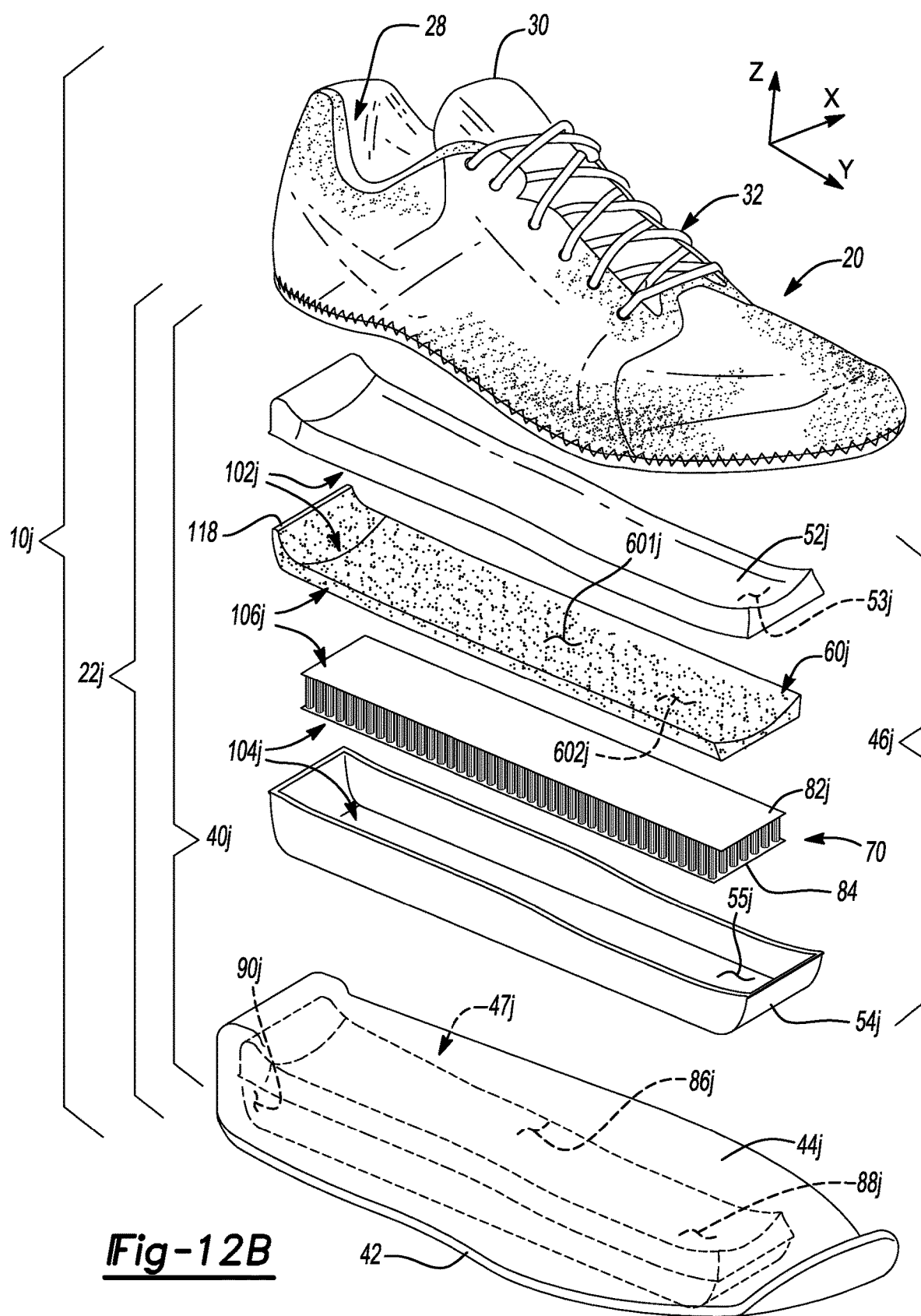
FIG. 12B is an exploded view of the article of footwear of FIG. 12A.
Figure 12C:
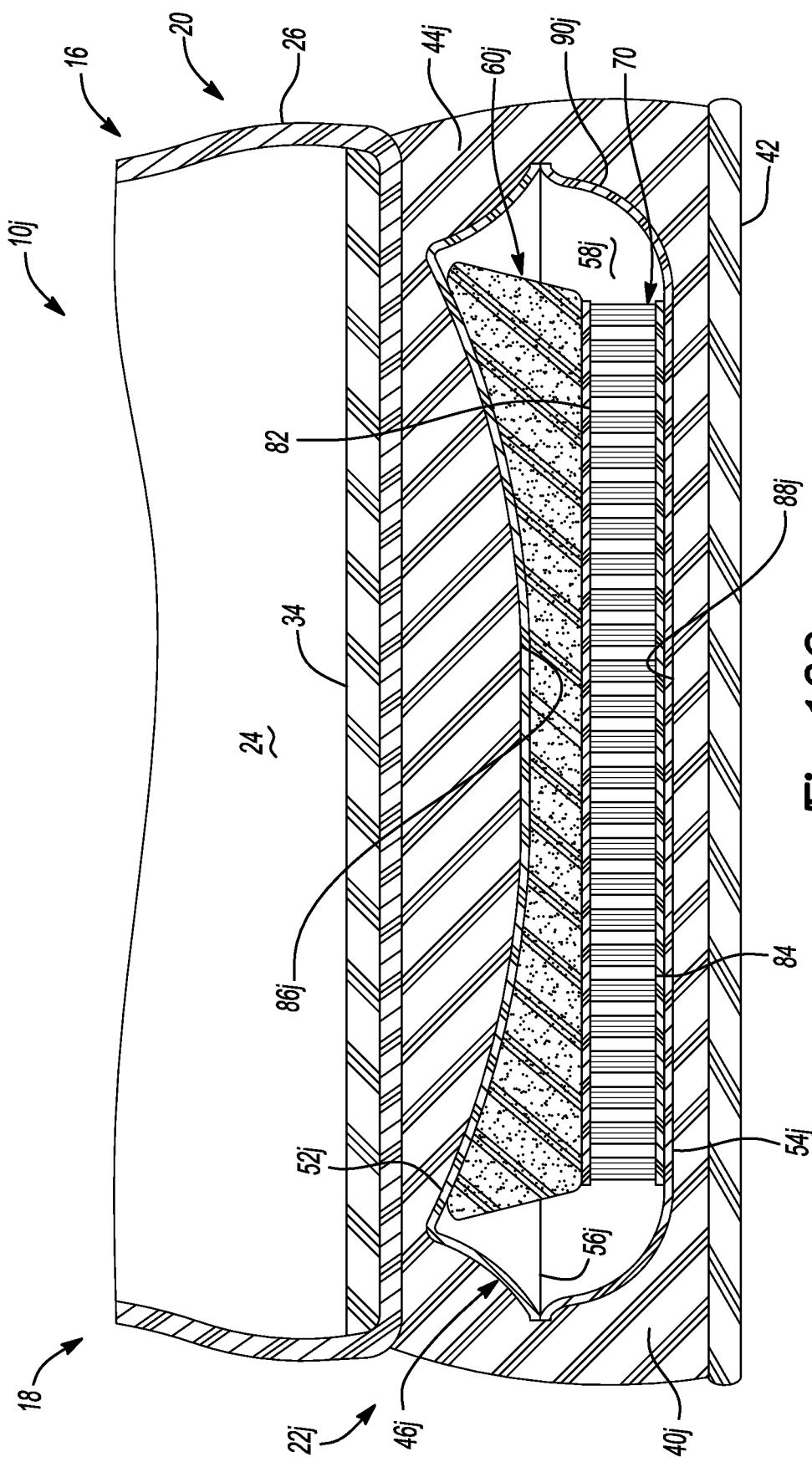
FIG. 12C is a partial cross-sectional view of the article of footwear of FIG. 12A taken along the line 12C-12C of FIG. 12A.
Figure 12D:
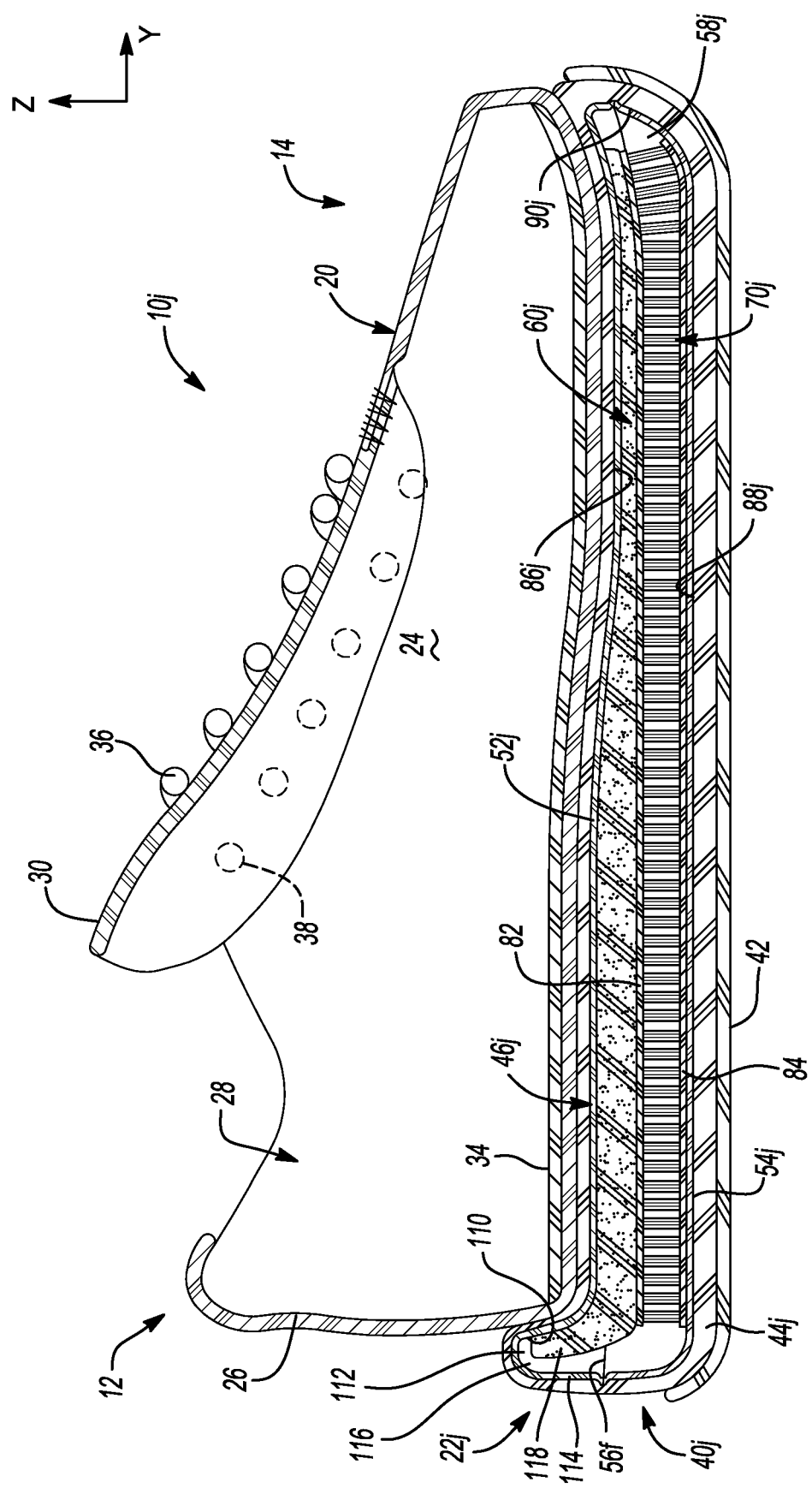
FIG. 12D is a cross-sectional view of the article of footwear of FIG. 12A taken along the line 12D-12D of FIG. 12A.

The article of footwear 10j may include the upper 20 and a sole structure 22j. The sole structure 22j may include a midsole 40j and the outsole 42. The midsole 40j may include a fluid-filled chamber 46j residing within a body 44j. As illustrated in FIG. 12B, the body 44j may include a cavity 47j defined at least in part by a first (e.g., upper) chamber contact surface 86j, a second (e.g., lower) chamber contact surface 88j, and a third (e.g., peripheral) chamber contact surface 90j. The first chamber contact surface 86j may be substantially planar and include a transversely extending portion 110 (FIG. 12D) proximate the heel end 12 of the article of footwear 10j. In some configurations, the first chamber contact surface 86j may extend toward the second chamber contact surface 88j from the heel end 12 to the forefoot end 14 along the Y-axis. For example, in some configurations the first chamber contact surface 86*j* may be inclined toward the second chamber contact surface 88*f*. In other configurations, the first chamber contact surface 86*j* may include a concave shape extending toward the second chamber contact surface 88*f*. As illustrated in FIG. 12D, the transversely extending portion 110 may extend away from the second chamber contact surface 88*j* in a direction generally parallel to the Z-axis. The second chamber contact surface 88*j* may be substantially planar. The third chamber contact surface 90*j* may extend from and between the first and second chamber contact surfaces 86*j*, 88*j*. In this regard, the third chamber contact surface 90*j* may extend away from the second chamber contact surface 88*j* by a greater distance at the heel end 12 than at the forefoot end 14. Accordingly, the third chamber contact surface 90*j* and the transversely extending portion 110 of the first chamber contact surface 86*j* may define a transversely extending portion 112 of the cavity 47*f*.

The fluid-filled chamber 46*j* may be located within the article of footwear 10*j* in any of the positions and orientations shown in FIGS. 2A-2D, and may include a first barrier layer 52*j*, a second barrier layer 54*j*, a foam structure 60*j*, and the tensile member 70. A second surface 53*j* of the first barrier layer 52*j* may include a size and shape that corresponds to, and matches, the size and shape of the first and third chamber contact surfaces 86*j*, 90*j* of the body 44*j*. In this regard, as illustrated in FIG. 12D, the first barrier layer 52*j* may include a U-shaped portion 114 that is disposed within the transversely extending portion 112 of the cavity 47*j* in the assembled configuration, such that the interior void 58*j* includes a transversely extending portion 116.

The foam structure 60*j* may be disposed within the interior void 58*j* of the fluid-filled chamber 46*j*. As illustrated in FIGS. 12B and 12C, in some configurations, the foam structure 60*j* is disposed adjacent to the first barrier layer 52*j* such that a second surface 601*j* of the foam structure 60*j* engages the second surface 53*j* of the first barrier layer 52*j* at a fourth attachment 102*j*. The second surface 601*j* of the foam structure 60*j* may include a size and shape that corresponds to, and matches, the size and shape of the second surface 53*j* of the first barrier layer 52*j*. In this regard, as illustrated in FIGS. 12B and 12D, the second surface 601*j* may extend upwardly along the Z-axis to define in part a flange portion 118 of the foam structure 60*j*. Additionally, with reference to FIG. 12C, the second surface 601*j* of the foam structure 60*j* may be substantially concave in a direction extending alone the X-axis. In this regard, the concavity of the second surface 601*j* may be equal to, and match, the convexity of the second surface 53*j* of the first barrier layer 52*j*. Accordingly, the fourth attachment 102*j* may be such that the entire first surface 601*j* of the foam structure 60*j* contacts the surface 53*j* of the first barrier layer 52*j*. In the assembled configuration, the flange portion 118 may be disposed within the transversely extending portion 116 of the interior void 58*j*. The tensile member 70 may be disposed between the foam structure 60*j* and the second barrier layer 54*j* relative to the Z-axis such that (i) the second substrate 84 engages the first surface 55*j* of the second barrier layer 54*j* at a fifth attachment 104*j* and (ii) the first substrate 82 engages the first surface 602*j* of the foam structure 60*j* at a sixth attachment 106*j*.

With reference to FIGS. 13A-13D, another article of footwear 10*k* is shown. Except as otherwise provided herein, the structure and function of the article of footwear 10*k* may be substantially similar to the structure and function of the article of footwear 10. In view of the substantial similarity in structure and function of the components associated with the article of footwear 10*k* with respect to the article of footwear 10, like reference numerals are used hereinafter and in the drawings to identify like components, while like reference numerals containing letter extensions are used to identify those components that have been modified.

The article of footwear 10*k* may include the upper 20 and a sole structure 22*k*. The sole structure 22*k* may include a midsole 40*k* and the outsole 42. The midsole 40*k* may include a fluid-filled chamber 46*k* residing within the body 44.

The fluid-filled chamber 46*k* may be located within the article of footwear 10*k* in any of the positions and orientations shown in FIGS. 2A-2D, and may include the first barrier layer 52, the second barrier layer 54, a foam structure 60*k*, and one or more tensile members 70*k*.

A first tensile member 72*k* of the tensile members 70*k* may be disposed between the first barrier layer 52 and the second barrier layer 54 relative to the Z-axis such that (i) the second substrate 84*k* engages the first surface 55 of the second barrier layer 54 at a fifth attachment 104*k* and (ii) the first substrate 82*k* engages the second surface 53 of the first barrier layer 52 at a second attachment 94*k*. The first and second substrates 82*k*, 84*k* may include a substantially planar configuration. Accordingly, the attachment 94*k* between the tensile member 72*k* (at the first substrate 82*k*) and the first barrier layer 52, as well as the attachment 104*k* between the tensile member 72*k* (at the second substrate 84*k*) and the second barrier layer 54, may be formed in a manner such that substantially all of the first and second substrates 82*k*, 84*k* contact the first and second surfaces 55, 53, respectively.

The first tensile member 72*k* may include a passage 130 extending from and between the first and second substrates 82*k*, 84*k* along the Z-axis. In this regard, the passage 130 may extend from a first opening 132 formed in the first substrate 82*k* to a second opening 134 formed in the second substrate 84*k*. The first and/or second openings 132, 134 may be centrally located within the first and second substrates 82*k*, 84*k*, relative to the X- and Y-axes, such that the tensile fibers 85 extend about, and partially define, the passage 130.

A second tensile member 74*k* of the tensile members 70*k* may be disposed within the passage 130 adjacent to the second barrier layer 54 such that the second substrate 84*k* of the second tensile member 74*k* engages the first surface 55 of the second barrier layer 54 at a fifth attachment 104*k*. The second substrate 84*k* may include a substantially planar configuration. Accordingly, the attachment 104*k* between the second tensile member 74*k* (at the second substrate 84*k*) and the second barrier layer 54 may be formed in a manner such that substantially all of the second substrate 84*k* contacts the first surface 55 of the second barrier layer 54.

Figure 13A:
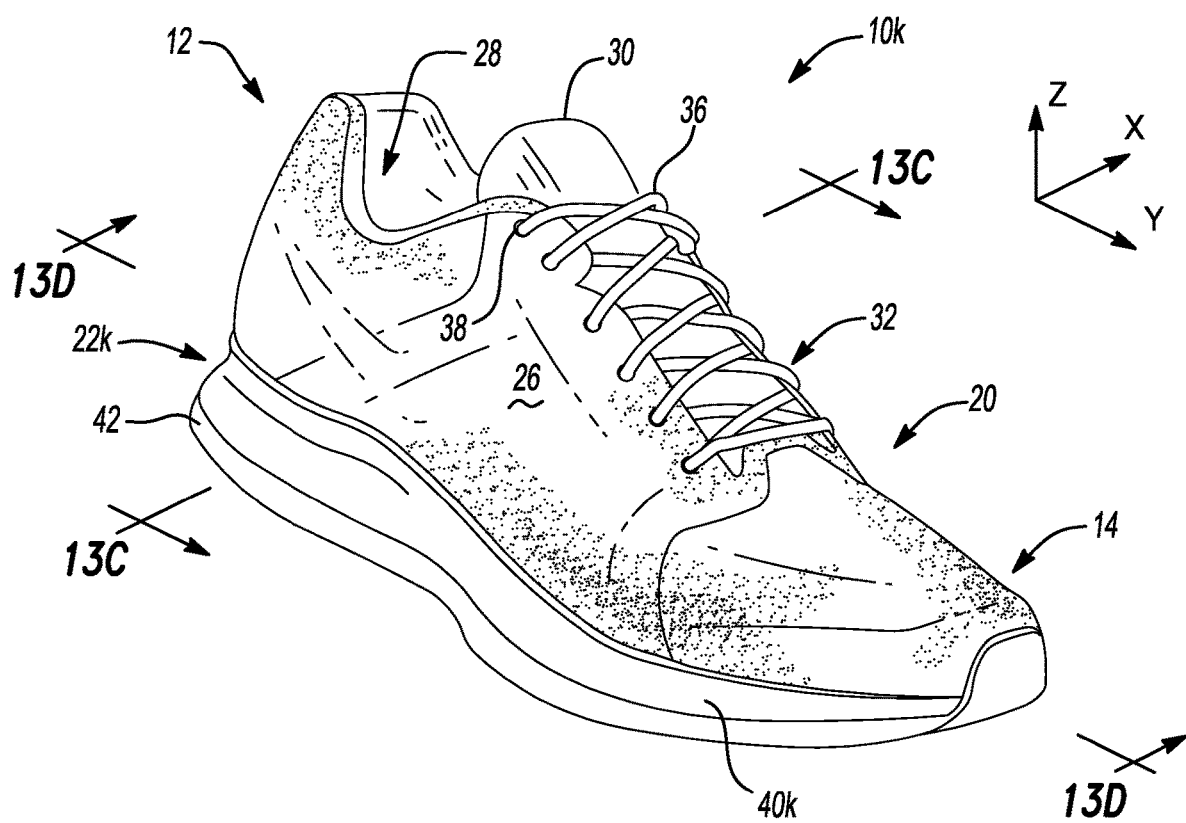
FIG. 13A is a top perspective view of an article of footwear in accordance with principles of the present disclosure.
Figure 13B:
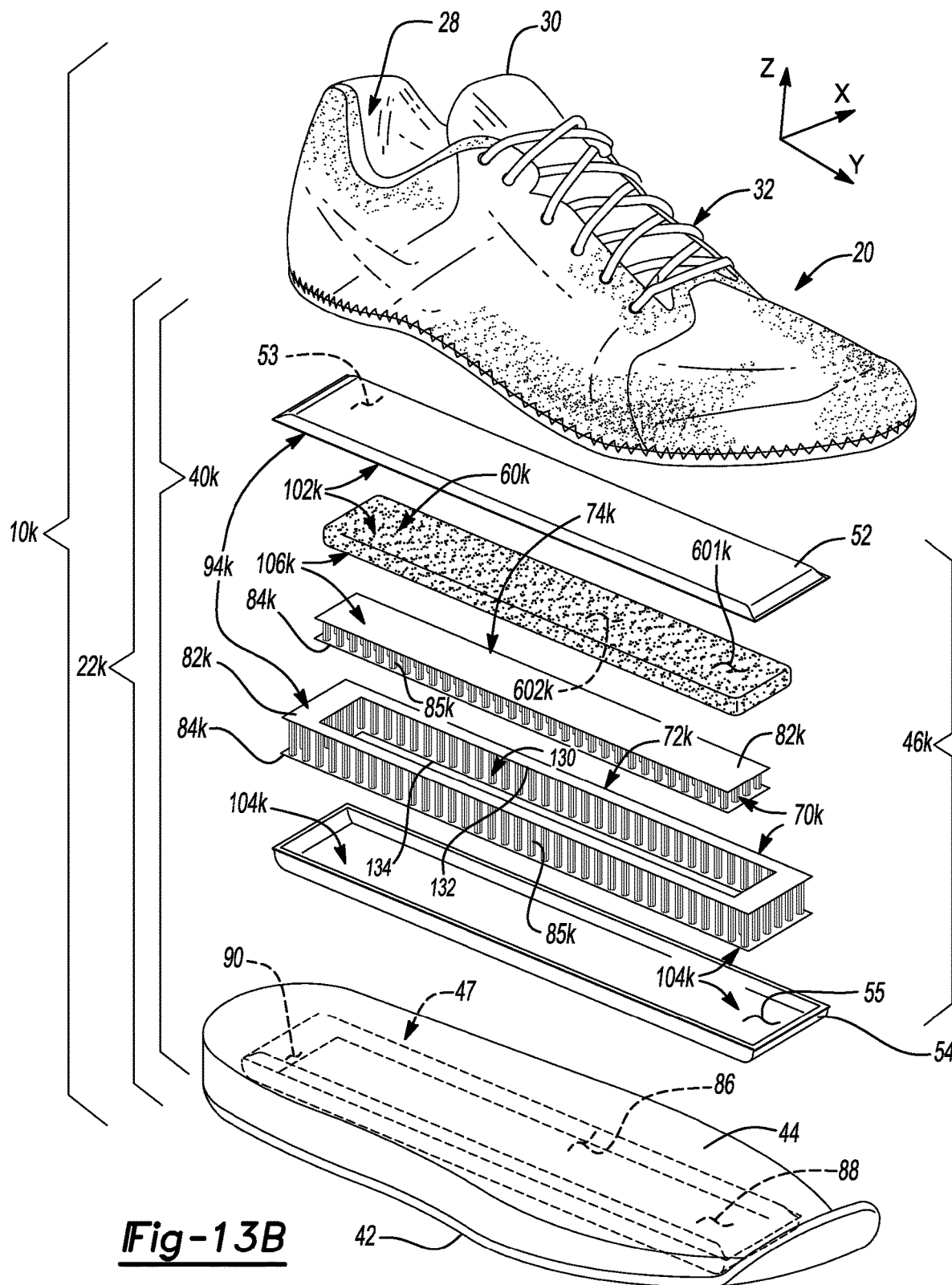
FIG. 13B is an exploded view of the article of footwear of FIG. 13A.
Figure 13D:
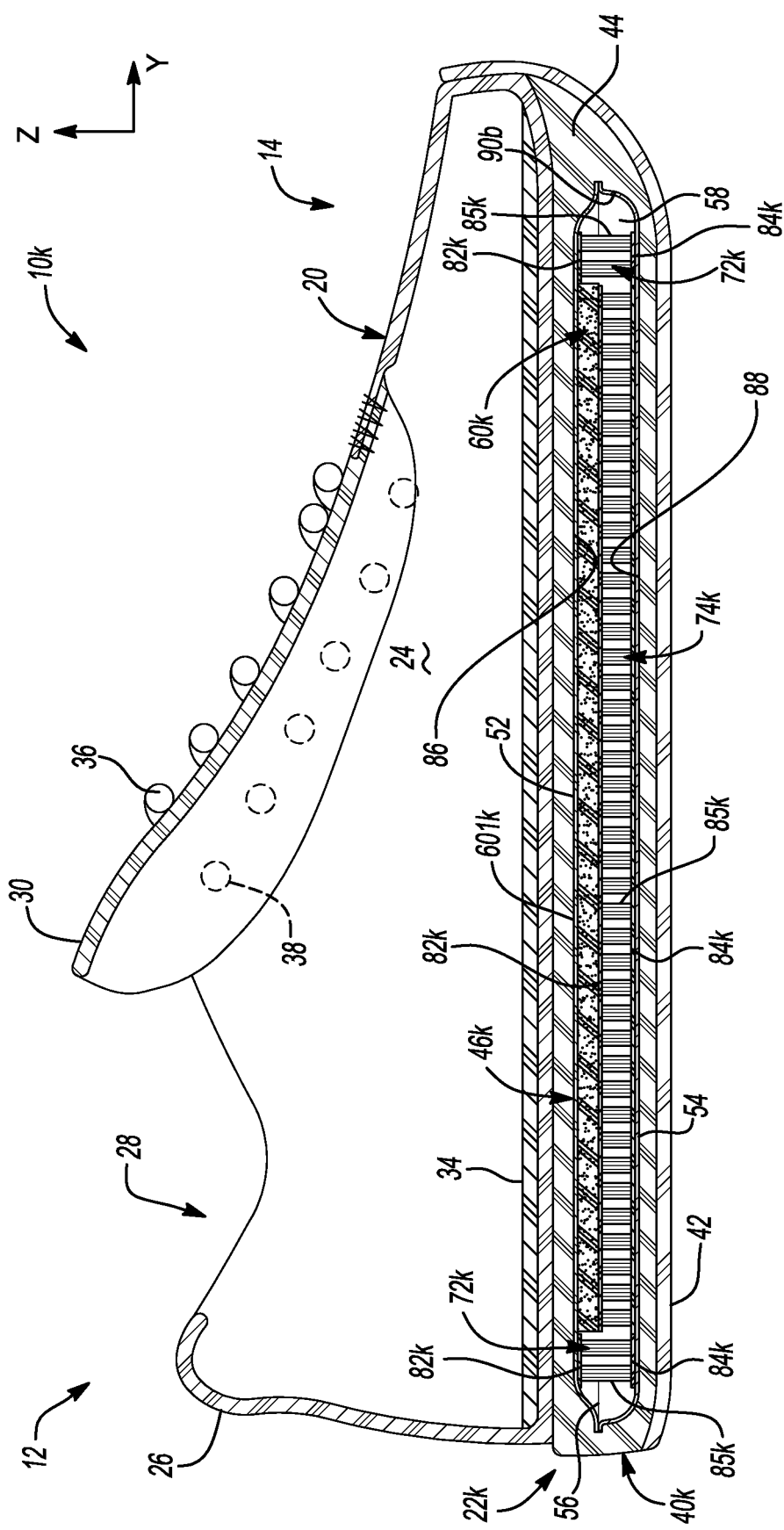
FIG. 13D is a cross-sectional view of the article of footwear of FIG. 13A taken along the line 13D-13D of FIG. 13A.

The foam structure 60*k* may be disposed within the passage 130 between the first barrier layer 52 and the second tensile member 74*k* such that (i) the second surface 601*k* of the foam structure 60*k* engages the second surface 53 of the first barrier layer 52 at a fourth attachment 102*k* and (ii) the first surface 602*k* of the foam structure 60*k* engages the first substrate 82*k* of the second tensile member 74*k* at a sixth attachment 106*k*. Accordingly, as illustrated in FIG. 13D, a distance along the Z-axis between the first and second substrates 82*k*, 84*k* of the first tensile member 72*k* may be substantially equal to a distance along the Z-axis between the second surface 601*k* of the foam structure 60*k* and the second substrate 84*k* of the second tensile member 74*k*. The first substrate 82*k* of the second tensile member 74*k* may include a substantially planar configuration. Accordingly, the attachment 106k between the second tensile member 74k (at the first substrate 82k) and the foam structure 60k may be formed in a manner such that substantially all of the first substrate 82k contacts the first surface 602k of the foam structure 60k. Additionally, the attachment 102k may be such that substantially the entire first surface 601k of the foam structure 60k contacts the surface 53 of the first barrier layer 52.

The resulting structure includes the foam structure 60k and the second tensile member 74k being received within and surrounded by the first tensile member 72k. Further, the first substrate 82k of the first tensile member 72k is substantially flush with the second surface 601k of the foam structure 60k while the second substrate 84k of the first tensile member 72k is substantially flush with the second substrate 84k of the second tensile member 74k.

With reference to FIGS. 14A-14G, another article of footwear 10m is shown. Except as otherwise provided herein, the structure and function of the article of footwear 10m may be substantially similar to the structure and function of the article of footwear 10. In view of the substantial similarity in structure and function of the components associated with the article of footwear 10m with respect to the article of footwear 10, like reference numerals are used hereinafter and in the drawings to identify like components, while like reference numerals containing letter extensions are used to identify those components that have been modified.

The article of footwear 10m may include the upper 20 and a sole structure 22m. The sole structure 22m may include a midsole 40m and the outsole 42. The midsole 40m may include a fluid-filled chamber 46m residing within a cavity 47m of the body 44m. The fluid-filled chamber 46m may be located within the article of footwear 10m in any of the positions and orientations shown in FIGS. 2A-2D, and may include a first barrier layer 52m, a second barrier layer 54m, one or more foam structures 60m, and one or more tensile members 70m. The first and second barrier layers 52m, 54m may define an anatomical shape, such as the bottom of a foot. In this regard, the cavity 47m may also define an anatomical shape, such as the bottom of a foot, and a size that corresponds to the size of the fluid-filled chamber 46m, such that the fluid-filled chamber 46m fits within the cavity 47m.

A first tensile member 72m of the tensile members 70m may be disposed between the first barrier layer 52m and the second barrier layer 54m relative to the Z-axis such that (i) the second substrate 84m of the first tensile member 72m engages the first surface 55m of the second barrier layer 54m at a fifth attachment 104m and (ii) the first substrate 82m engages the second surface 53m of the first barrier layer 52 at a second attachment 94m. The first and second substrates 82m, 84m of the first tensile member 72m may include a substantially planar configuration. Accordingly, the attachment 94m between the tensile member 72m (at the first substrate 82m) and the first barrier layer 52m, as well as the attachment 104m between the tensile member 72m (at the second substrate 84m) and the second barrier layer 54m, may be formed in a manner such that substantially all of the first and second substrates 82m, 84m contact the first and second surfaces 55m, 53m, respectively.

The first tensile member 72m may include one or more passages 130m extending from and between the first and second substrates 82m, 84m along the Z-axis. In this regard, a first passage 130m1 may extend from a first opening 132m1 formed in the first substrate 82m to a second opening 134m1 formed in the second substrate 84m. The first and/or second openings 132m1, 134m1 may be located within the heel end 12 of the first tensile member 72m, such that the tensile fibers 85m extend about, and partially define, the first passage 130m1. A second passage 130m2 may extend from a first opening 132m2 formed in the first substrate 82m to a second opening 134m2 formed in the second substrate 84m. The first and/or second openings 132m2, 134m2 may be located within a central and/or intermediate portion of the first tensile member 72m, such that the tensile fibers 85m extend about, and partially define, the second passage 130m2. In some configurations, the second passage 130m2 may be substantially aligned with the ball of a wearer's foot. A third passage 130m3 may extend from a first opening 132m3 formed in the first substrate 82m to a second opening 134m3 formed in the second substrate 84m. The first and/or second openings 132m3, 134m3 may be located within the forefoot end 14 of the first tensile member 72m, such that the tensile fibers 85m extend about, and partially define, the third passage 130m3.

A second tensile member 74m of the tensile members 70m may be disposed within the first passage 130m1 adjacent to the second barrier layer 54m such that the second substrate 84m of the second tensile member 74m engages the first surface 55m of the second barrier layer 54m at a fifth attachment 104m and is substantially flush with the second substrate 84m of the first tensile member 72m. The second substrate 84m of the second tensile member 74m may include a substantially planar configuration. Accordingly, the attachment 104m between the second tensile member 74m (at the second substrate 84m) and the second barrier layer 54m may be formed in a manner such that substantially all of the second substrate 84m of the second tensile member 74m contacts the first surface 55m of the second barrier layer 54m.

A third tensile member 76m of the tensile members 70m may be disposed within the second passage 130m2 adjacent to the second barrier layer 54m such that the second substrate 84m of the third tensile member 76m engages the first surface 55m of the second barrier layer 54m at a fifth attachment 104m and is substantially flush with the second substrate 84m of the first tensile member 72m. The second substrate 84m of the third tensile member 76m may include a substantially planar configuration. Accordingly, the attachment 104m between the third tensile member 76m (at the second substrate 84m) and the second barrier layer 54m may be formed in a manner such that substantially all of the second substrate 84m of the third tensile member 76m contacts the first surface 55m of the second barrier layer 54m.

A fourth tensile member 78m of the tensile members 70m may be disposed within the third passage 130m3 adjacent to the second barrier layer 54m such that the second substrate 84m of the fourth tensile member 78m engages the first surface 55m of the second barrier layer 54m at a fifth attachment 104m and is substantially flush with the second substrate 84m of the first tensile member 72m. The second substrate 84m of the fourth tensile member 78m may include a substantially planar configuration. Accordingly, the attachment 104m between the fourth tensile member 78m (at the second substrate 84m) and the second barrier layer 54m may be formed in a manner such that substantially all of the second substrate 84m of the fourth tensile member 78m contacts the first surface 55m of the second barrier layer 54m.

Figure 14A:
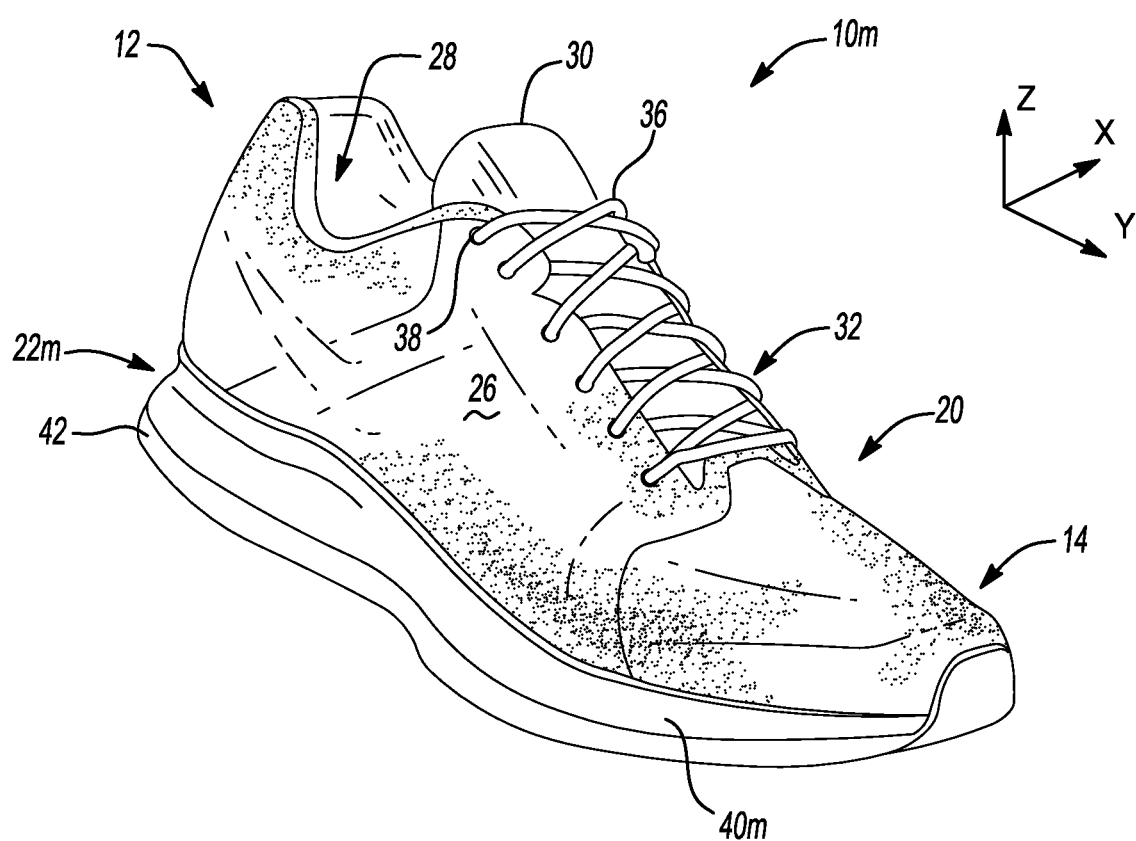
FIG. 14A is a top perspective view of an article of footwear in accordance with principles of the present disclosure.
Figure 14B:
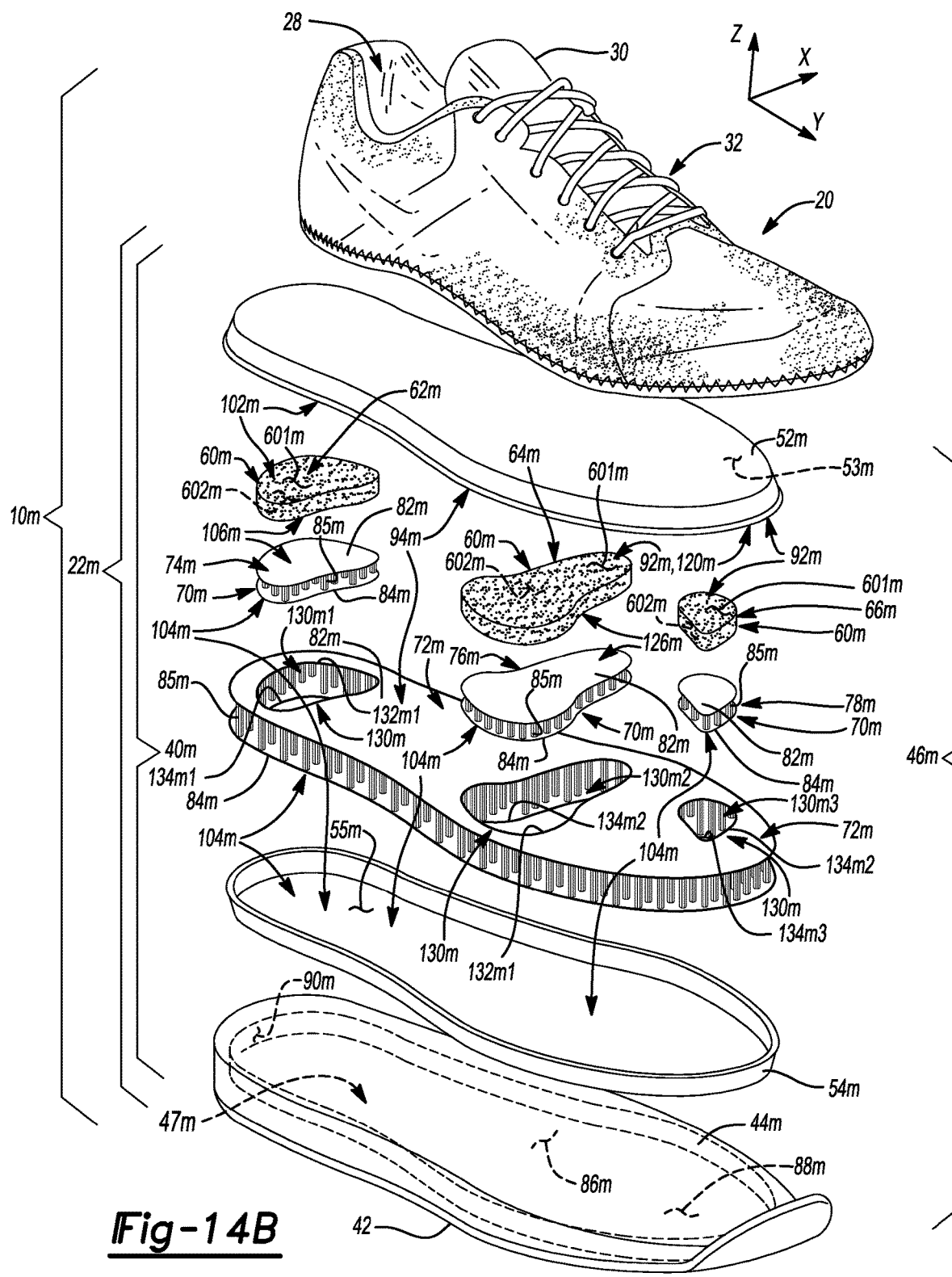
FIG. 14B is an exploded view of the article of footwear of FIG. 14A.
Figure 14C:
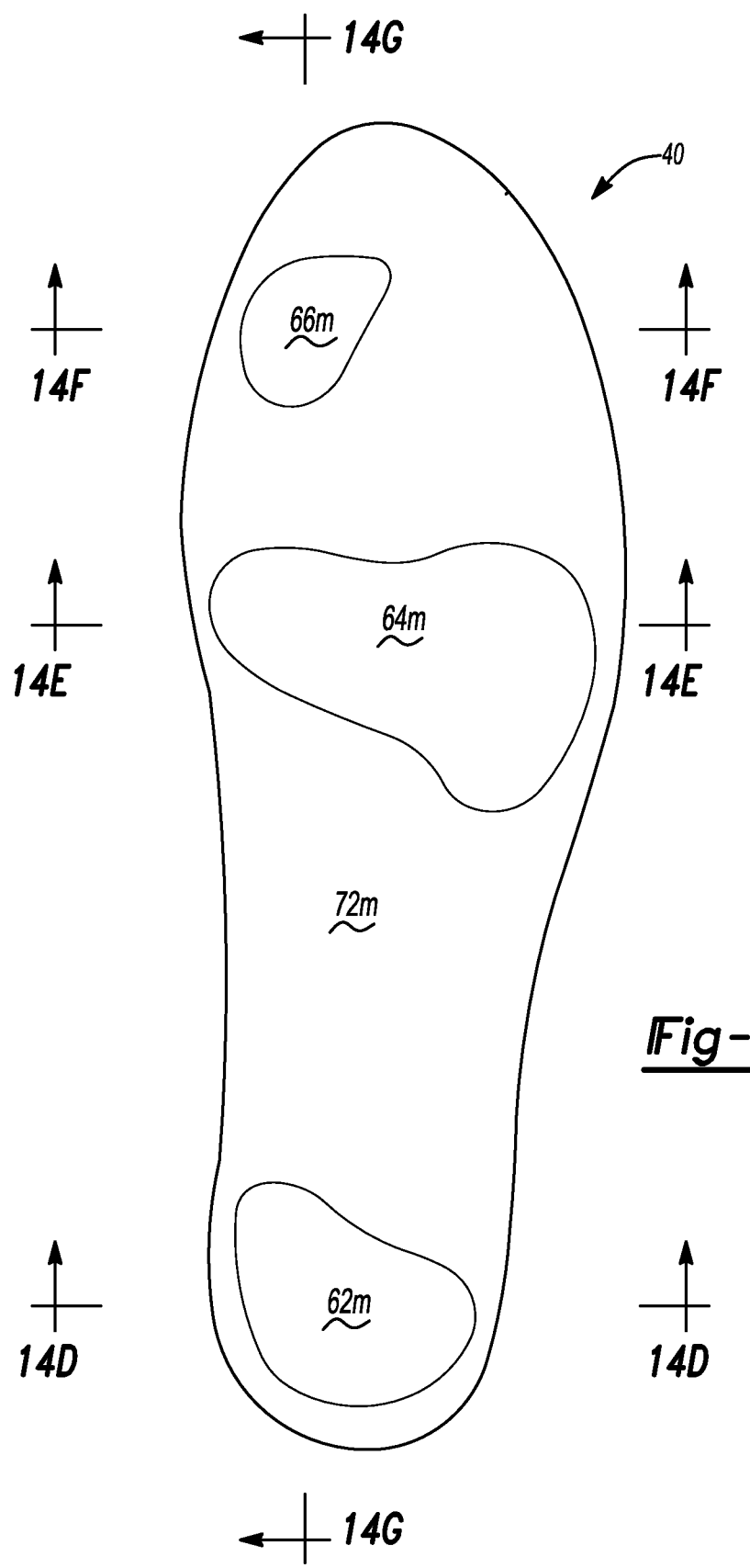
FIG. 14C is a top schematic view of a midsole of the article of footwear of FIG. 14A.
Figure 14D:
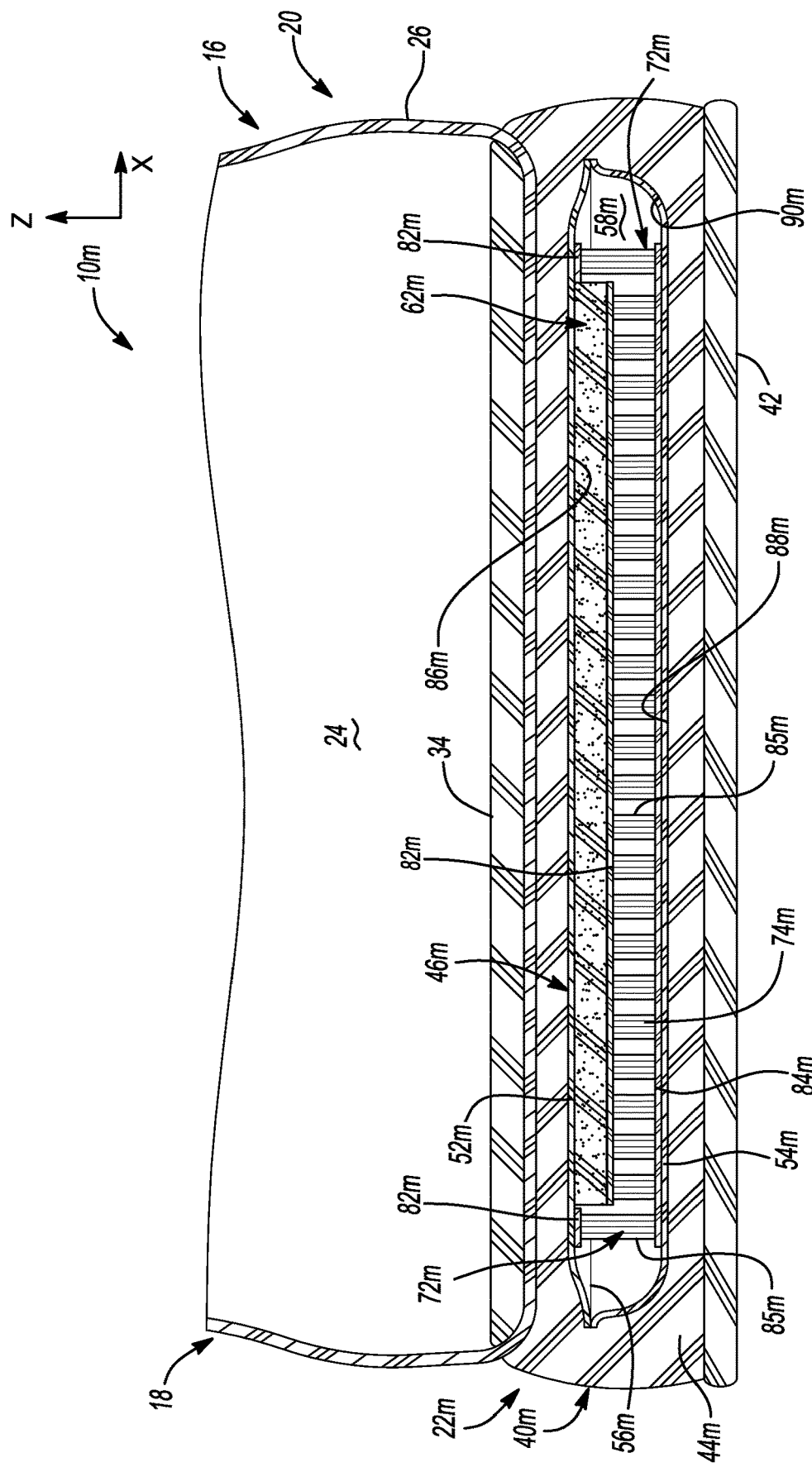
FIG. 14D is a partial cross-sectional view of the article of footwear of FIG. 14A taken along the line 14D-14D of FIG. 14C.
Figure 14E:
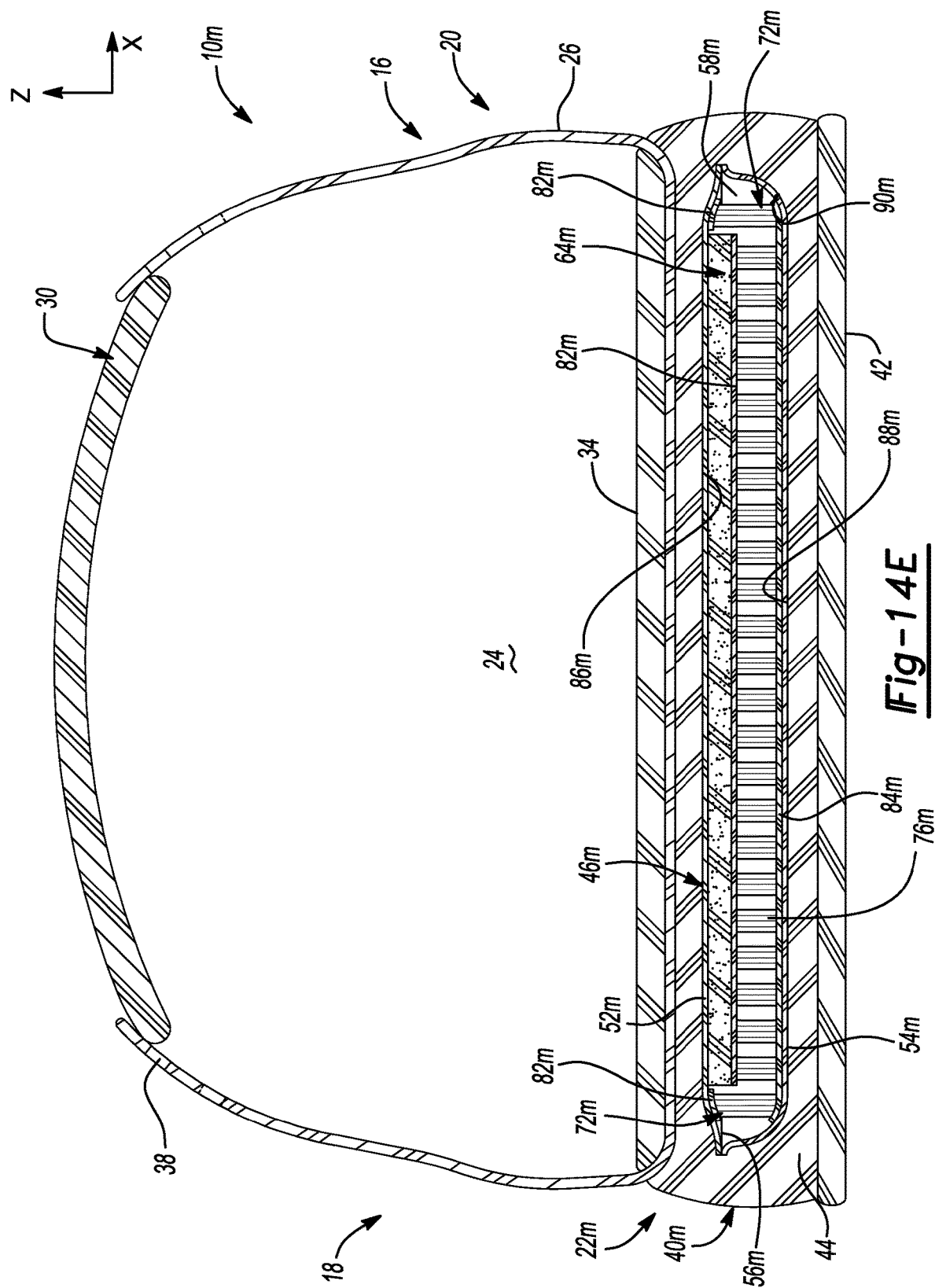
FIG. 14E is a cross-sectional view of the article of footwear of FIG. 14A taken along the line 14E-14E of FIG. 14C.
Figure 14F:
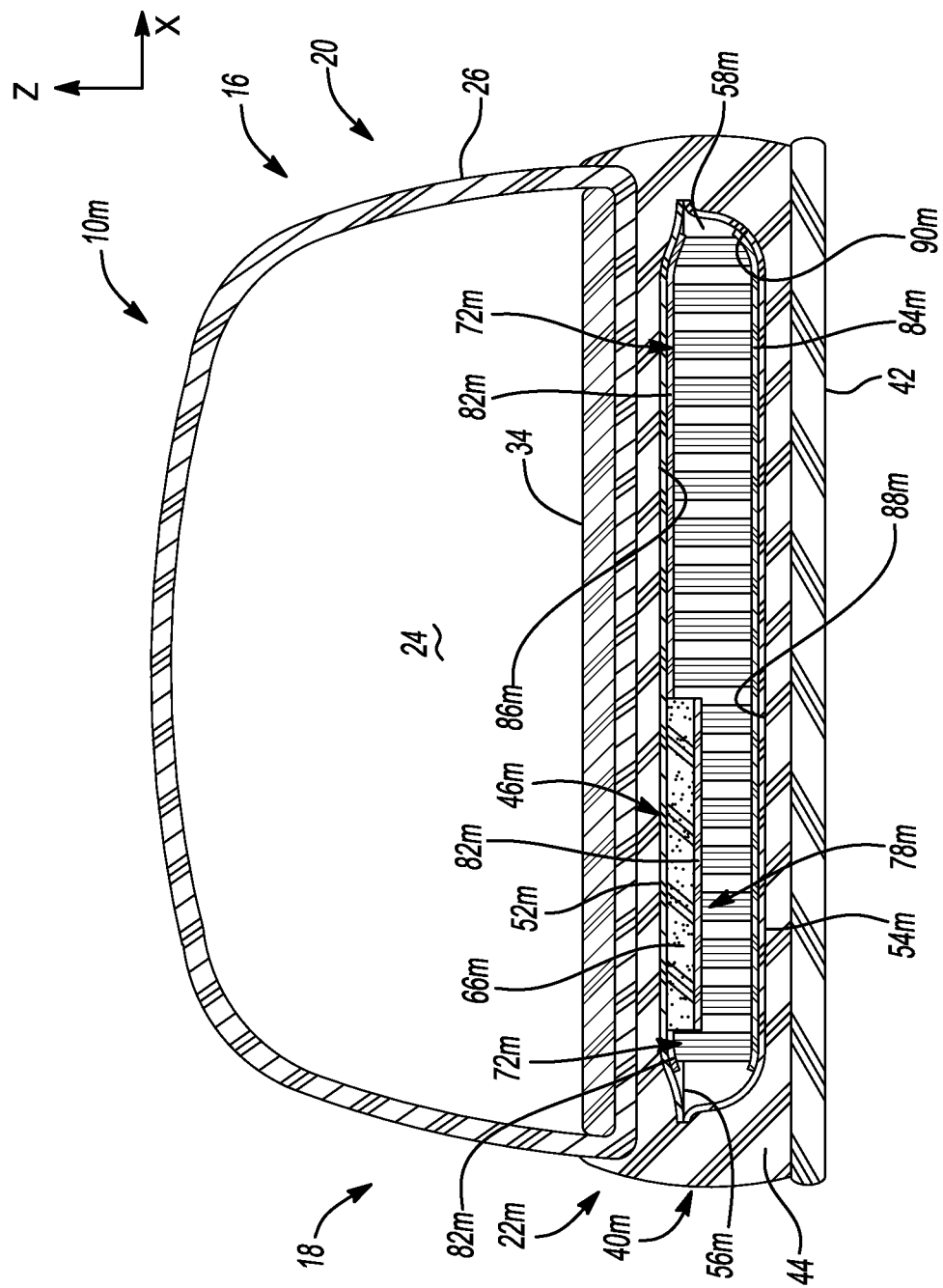
FIG. 14F is a cross-sectional view of the article of footwear of FIG. 14A taken along the line 14F-14F of FIG. 14C.
Figure 14G:
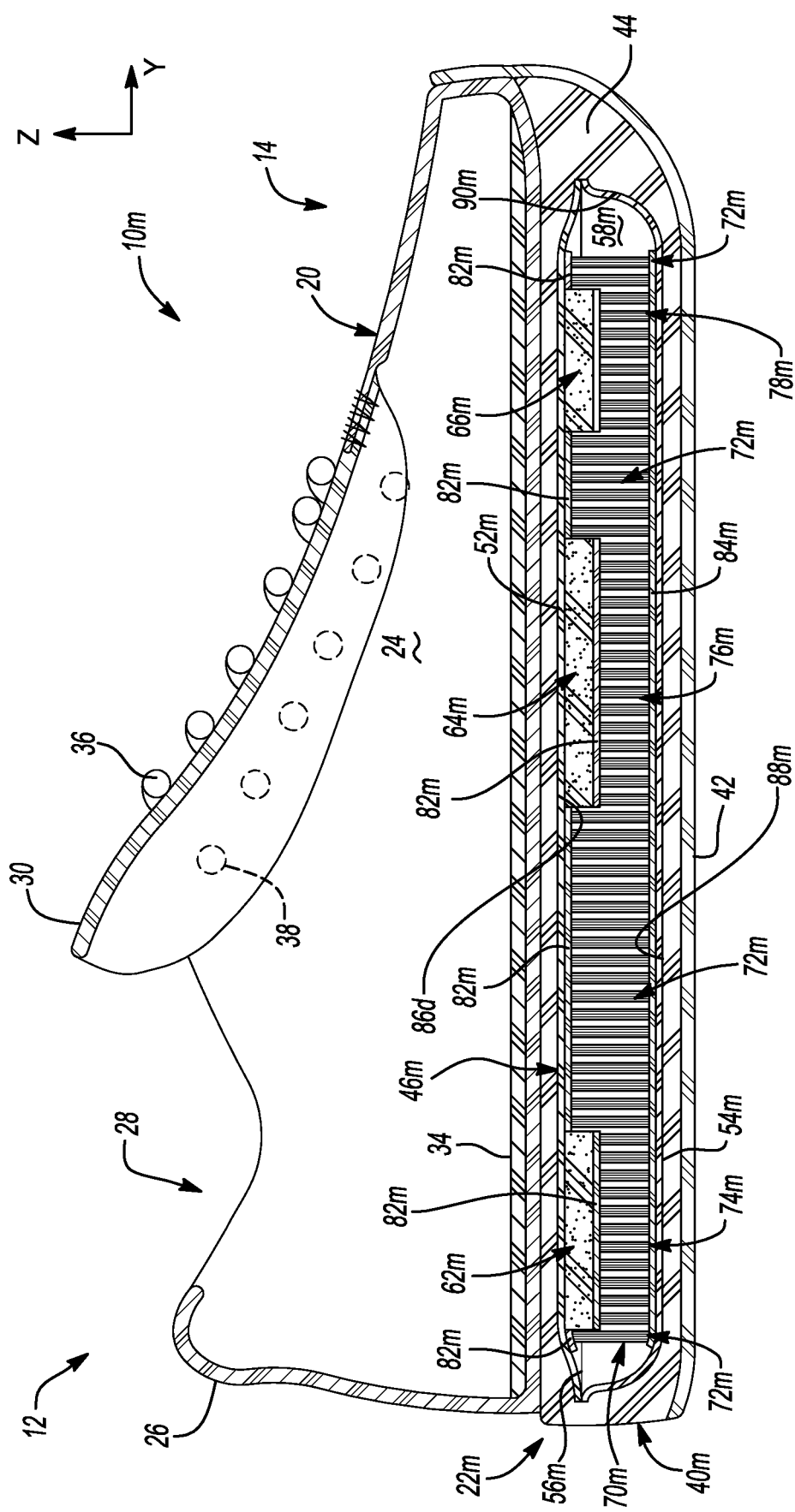
FIG. 14G is a cross-sectional view of the article of footwear of FIG. 14A taken along the line 14G-14G of FIG. 14C.

A first foam structure 62m of the foam structures 60m may be disposed within the first passage 130m1 between the first barrier layer 52*m* and the second tensile member 74*m* such that (i) the second surface 601*m* of the first foam structure 62*m* engages the second surface 53*m* of the first barrier layer 52*m* at a fourth attachment 102*m* and is substantially flush with the first substrate 82*m* of the first tensile member 72*m* and (ii) the first surface 602*m* of the first foam structure 62*m* engages the first substrate 82*m* of the second tensile member 74*m* at a sixth attachment 106*m*. Accordingly, as illustrated in FIGS. 14D and 14G, a distance along the Z-axis between the first and second substrates 82*m*, 84*m* of the first tensile member 72*m* may be substantially equal to a distance along the Z-axis between the second surface 601*m* of the first foam structure 62*m* and the second substrate 84*m* of the second tensile member 74*m*. The first substrate 82*m* of the second tensile member 74*m* may include a substantially planar configuration. Accordingly, the attachment 106*m* between the second tensile member 74*m* (at the first substrate 82*m*) and the first foam structure 62*m* may be formed in a manner such that substantially all of the first substrate 82*m* contacts the first surface 602*m* of the first foam structure 62*m*. Additionally, the attachment 102*m* may be such that substantially the entire first surface 601*m* of the first foam structure 62*m* contacts the surface 53*m* of the first barrier layer 52*m*.

A second foam structure 64*m* of the foam structures 60*m* may be disposed within the second passage 130*m*2 between the first barrier layer 52*m* and the third tensile member 76*m* such that (i) the second surface 601*m* of the second foam structure 64*m* engages the second surface 53*m* of the first barrier layer 52*m* at a fourth attachment 102*m* and is substantially flush with the first substrate 82*m* of the first tensile member 72*m* and (ii) the first surface 602*m* of the second foam structure 64*m* engages the first substrate 82*m* of the third tensile member 76*m* at a sixth attachment 106*m*. Accordingly, as illustrated in FIGS. 14E and 14G, a distance along the Z-axis between the first and second substrates 82*m*, 84*m* of the first tensile member 72*m* may be substantially equal to a distance along the Z-axis between the second surface 601*m* of the second foam structure 64*m* and the second substrate 84*m* of the third tensile member 76*m*. The first substrate 82*m* of the third tensile member 76*m* may include a substantially planar configuration. Accordingly, the attachment 106*m* between the third tensile member 76*m* (at the first substrate 82*m*) and the second foam structure 64*m* may be formed in a manner such that substantially all of the first substrate 82*m* contacts the first surface 602*m* of the second foam structure 64*m*. Additionally, the attachment 102*m* may be such that substantially the entire first surface 601*m* of the second foam structure 64*m* contacts the surface 53*m* of the first barrier layer 52*m*.

A third foam structure 66*m* of the foam structures 60*m* may be disposed within the third passage 130*m*3 between the first barrier layer 52*m* and the fourth tensile member 78*m* such that (i) the second surface 601*m* of the third foam structure 66*m* engages the second surface 53*m* of the first barrier layer 52*m* at a fourth attachment 102*m* and is substantially flush with the first substrate 82*m* of the first tensile member 72*m* and (ii) the first surface 602*m* of the third foam structure 66*m* engages the first substrate 82*m* of the fourth tensile member 78*m* at a sixth attachment 106*m*. Accordingly, as illustrated in FIGS. 14F and 14G, a distance along the Z-axis between the first and second substrates 82*m*, 84*m* of the first tensile member 72*m* may be substantially equal to a distance along the Z-axis between the second surface 601*m* of the third foam structure 66*m* and the second substrate 84*m* of the fourth tensile member 78*m*. The first substrate 82*m* of the fourth tensile member 78*m* may include a substantially planar configuration. Accordingly, the attachment 106*m* between the fourth tensile member 78*m* (at the first substrate 82*m*) and the third foam structure 66*m* may be formed in a manner such that substantially all of the first substrate 82*m* contacts the first surface 602*m* of the third foam structure 66*m*. Additionally, the attachment 102*m* may be such that substantially the entire first surface 601*m* of the third foam structure 66*m* contacts the surface 53*m* of the first barrier layer 52*m*.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A sole structure for an article of footwear having an upper, the sole structure comprising:
   a fluid-filled chamber including (i) a first barrier layer, (ii) a second barrier layer secured to the first barrier layer to define an interior void between the first barrier layer and the second barrier layer, and (iii) a foam structure disposed within the interior void, the foam structure including a first concave surface facing the upper, and a second surface disposed on an opposite side of the foam structure than the first concave surface.

2. The sole structure of claim 1, wherein the first concave surface extends along a longitudinal axis between a forefoot region of the sole structure and a heel region of the sole structure.

3. The sole structure of claim 1, wherein the first concave surface is attached to one of the first barrier layer and the second barrier layer.

4. The sole structure of claim 3, wherein the one of the first barrier layer and the second barrier layer includes a complimentary shape to the first concave surface of the foam structure, the one of the first barrier layer and the second barrier layer defining a second concave surface at the first concave surface of the foam structure.

5. The sole structure of claim 4, further comprising a midsole disposed between the fluid-filled chamber and the upper, the midsole disposed within the second concave surface.

6. The sole structure of claim 5, wherein the midsole is formed from a foamed polymer material.

7. The sole structure of claim 1, further comprising a tensile member disposed within the interior void between the foam structure and one of the first barrier layer and the second barrier layer, the tensile member including a plurality of fibers extending in a first direction between the first barrier layer and the second barrier layer.

8. The sole structure of claim 7, wherein the second surface of the foam structure is a substantially planar surface and the tensile member is attached to the foam structure at the substantially planar surface.

9. The sole structure of claim 8, wherein the tensile member is attached to the one of the first barrier layer and the second barrier layer and the first concave surface is attached to the other of the first barrier layer and the second barrier layer.

10. The sole structure of claim 1, wherein the second surface is a substantially planar surface and the foam structure further includes a pair of sidewalls extending between and connecting the first concave surface and the substantially planar second surface, the pair of sidewalls formed at an angle relative to the substantially planar second surface to cause the foam structure to taper in a direction from the first concave surface to the substantially planar second surface.

11. A sole structure for an article of footwear having an upper, the sole structure comprising:
a fluid-filled chamber including (a) a first barrier layer, (b) a second barrier layer secured to the first barrier layer to define an interior void between the first barrier layer and the second barrier layer, and (c) a foam structure disposed within the interior void, the foam structure including (i) a first concave surface that extends along a length of the foam structure between a first end of the foam structure and a second end of the foam structure and (ii) a second surface disposed on an opposite side of the foam structure than the first concave surface.

12. The sole structure of claim 11, wherein the first concave surface is elongate and extends continuously from the first end to the second end.

13. The sole structure of claim 11, wherein the first concave surface is attached to one of the first barrier layer and the second barrier layer.

14. The sole structure of claim 13, wherein the one of the first barrier layer and the second barrier layer includes a complimentary shape to the first concave surface of the foam structure, the one of the first barrier layer and the second barrier layer defining a second concave surface at the first concave surface of the foam structure.

15. The sole structure of claim 14, further comprising a midsole disposed between the fluid-filled chamber and the upper, the midsole disposed within the second concave surface.

16. The sole structure of claim 15, wherein the midsole is formed from a foamed polymer material.

17. The sole structure of claim 11, further comprising a tensile member disposed within the interior void between the foam structure and one of the first barrier layer and the second barrier layer, the tensile member including a plurality of fibers extending in a first direction between the first barrier layer and the second barrier layer.

18. The sole structure of claim 17, wherein the second surface of the foam structure is a substantially planar surface and the tensile member is attached to the foam structure at the substantially planar surface.

19. The sole structure of claim 18, wherein the tensile member is attached to the one of the first barrier layer and the second barrier layer and the first concave surface is attached to the other of the first barrier layer and the second barrier layer.

20. The sole structure of claim 11, wherein the second surface is a substantially planar surface and the foam structure further includes a pair of sidewalls extending between and connecting the first concave surface and the substantially planar second surface, the pair of sidewalls formed at an angle relative to the substantially planar second surface to cause the foam structure to taper in a direction from the first concave surface to the substantially planar second surface.

* * * * *